(12) United States Patent
Kindler et al.

(10) Patent No.: US 8,038,822 B2
(45) Date of Patent: Oct. 18, 2011

(54) MULTILAYERED SCREENS WITH LIGHT-EMITTING STRIPES FOR SCANNING BEAM DISPLAY SYSTEMS

(75) Inventors: David Kindler, Concord, MA (US);
Roger A. Hajjar, San Jose, CA (US);
David L. Kent, Framingham, MA (US);
John Ritter, Wayland, MA (US); Sergey A. Bukesov, Acton, MA (US); Phillip H. Malyak, Canton, MA (US)

(73) Assignee: Prysm, Inc., San Jose, CA (US)

( * ) Notice: Subject to any disclaimer, the term of this patent is extended or adjusted under 35 U.S.C. 154(b) by 697 days.

(21) Appl. No.: 12/123,418

(22) Filed: May 19, 2008

(65) Prior Publication Data
US 2009/0116107 A1 May 7, 2009

Related U.S. Application Data

(60) Provisional application No. 60/938,690, filed on May 17, 2007.

(51) Int. Cl.
*G03B 21/60* (2006.01)
(52) U.S. Cl. .......... 156/245; 156/272.2; 156/273.3; 156/275.5; 156/297; 264/1.1; 427/162; 359/443
(58) Field of Classification Search .......... 156/245
See application file for complete search history.

(56) References Cited

U.S. PATENT DOCUMENTS

| | | | |
|---|---|---|---|
| 2,439,181 A | 5/1946 | Nicoll | |
| 3,025,161 A | 3/1962 | Thaddeus | |
| 3,556,637 A | 1/1971 | Palmquist | |
| 3,652,956 A | 3/1972 | Pinnow et al. | |
| 3,691,482 A | 9/1972 | Pinnow et al. | |
| 3,750,189 A | 7/1973 | Fleischer | |
| 3,868,167 A | 2/1975 | Schreiber | |
| 4,165,154 A | 8/1979 | Takahashi | |
| 4,166,233 A | 8/1979 | Stanley | |
| 4,295,093 A | 10/1981 | Middleton | |
| 4,305,646 A | 12/1981 | Bechtold | |
| 4,307,320 A | 12/1981 | Kotera et al. | |
| 4,401,362 A | 8/1983 | Maeda | |
| 4,512,911 A | 4/1985 | Kotera et al. | |
| 4,613,201 A | 9/1986 | Shortle et al. | |
| 4,624,528 A | 11/1986 | Brueggemann | |
| 4,661,419 A | 4/1987 | Nakamura | |
| 4,707,093 A | 11/1987 | Testa | |
| 4,713,577 A | 12/1987 | Gualtieri et al. | |

(Continued)

FOREIGN PATENT DOCUMENTS

DE 10044603 4/2001
(Continued)

OTHER PUBLICATIONS

USPTO Final Office action in U.S. Appl. No. 11/335,813, mailed Mar. 15, 2010 (17 pages).

(Continued)

*Primary Examiner* — Joseph Del Sole
*Assistant Examiner* — Vicki Wu
(74) *Attorney, Agent, or Firm* — Fish & RIchardson P.C.

(57) ABSTRACT

Multilayered screens with parallel light-emitting stripes for scanning beam display systems. The light-emitting materials may include phosphor materials and non-phosphor materials.

12 Claims, 32 Drawing Sheets

U.S. PATENT DOCUMENTS

| | | | |
|---|---|---|---|
| 4,737,840 A | 4/1988 | Morishita | |
| 4,799,050 A | 1/1989 | Prince et al. | |
| 4,808,804 A | 2/1989 | Krichever et al. | |
| 4,816,920 A | 3/1989 | Paulsen | |
| 4,872,750 A | 10/1989 | Morishita | |
| 4,897,715 A | 1/1990 | Beamon | |
| 4,923,262 A | 5/1990 | Clay | |
| 4,932,734 A | 6/1990 | Sakuma et al. | |
| 4,978,202 A | 12/1990 | Yang | |
| 4,979,030 A | 12/1990 | Murata | |
| 5,054,866 A | 10/1991 | Tomita et al. | |
| 5,080,467 A | 1/1992 | Kahn et al. | |
| 5,089,907 A | 2/1992 | Yoshikawa et al. | |
| 5,094,788 A | 3/1992 | Schrenk et al. | |
| 5,122,905 A | 6/1992 | Wheatley et al. | |
| 5,136,426 A | 8/1992 | Linden et al. | |
| 5,138,441 A | 8/1992 | Tanaka | |
| 5,140,604 A | 8/1992 | Alablanche et al. | |
| 5,146,355 A | 9/1992 | Prince et al. | |
| 5,166,944 A | 11/1992 | Conemac | |
| 5,170,181 A | 12/1992 | Tamada | |
| 5,175,637 A | 12/1992 | Jones et al. | |
| 5,182,659 A | 1/1993 | Clay et al. | |
| 5,198,679 A | 3/1993 | Katoh et al. | |
| 5,255,113 A | 10/1993 | Yoshikawa et al. | |
| 5,269,995 A | 12/1993 | Ramanathan et al. | |
| 5,270,842 A | 12/1993 | Clay et al. | |
| 5,296,922 A | 3/1994 | Mitani et al. | |
| 5,365,288 A | 11/1994 | Dewald et al. | |
| 5,389,324 A | 2/1995 | Lewis et al. | |
| 5,414,521 A | 5/1995 | Ansley | |
| 5,422,693 A | 6/1995 | Vogeley et al. | |
| 5,442,254 A | 8/1995 | Jaskie | |
| 5,473,396 A | 12/1995 | Okajima et al. | |
| 5,475,524 A | 12/1995 | Harris | |
| 5,477,285 A | 12/1995 | Riddle et al. | |
| 5,477,330 A | 12/1995 | Dorr | |
| 5,491,578 A | 2/1996 | Harris | |
| 5,521,986 A | 5/1996 | Curtin, II et al. | |
| 5,526,166 A | 6/1996 | Genovese | |
| 5,541,731 A | 7/1996 | Freedenberg et al. | |
| 5,550,667 A | 8/1996 | Krimmel et al. | |
| 5,587,818 A | 12/1996 | Lee | |
| 5,594,556 A | 1/1997 | Vronsky et al. | |
| 5,598,292 A | 1/1997 | Yoshikawa et al. | |
| 5,602,445 A | 2/1997 | Solanki et al. | |
| 5,614,961 A | 3/1997 | Gibeau et al. | |
| 5,633,736 A | 5/1997 | Griffith et al. | |
| 5,646,766 A | 7/1997 | Conemac | |
| 5,648,181 A | 7/1997 | Watanabe | |
| 5,666,174 A | 9/1997 | Cupolo, III | |
| 5,668,662 A | 9/1997 | Magocs et al. | |
| 5,670,209 A | 9/1997 | Wyckoff | |
| 5,684,552 A | 11/1997 | Miyamoto et al. | |
| 5,698,857 A | 12/1997 | Lambert et al. | |
| 5,715,021 A | 2/1998 | Hintz et al. | |
| 5,716,118 A | 2/1998 | Sato et al. | |
| 5,870,224 A | 2/1999 | Saitoh et al. | |
| 5,882,774 A | 3/1999 | Jonza et al. | |
| 5,886,354 A * | 3/1999 | Leblans ............... | 250/484.4 |
| 5,907,312 A | 5/1999 | Sato et al. | |
| 5,920,361 A | 7/1999 | Gibeau et al. | |
| 5,959,296 A | 9/1999 | Cyr et al. | |
| 5,973,813 A | 10/1999 | Takeuchi | |
| 5,976,424 A | 11/1999 | Weber et al. | |
| 5,978,142 A | 11/1999 | Blackham et al. | |
| 5,994,722 A | 11/1999 | Averbeck et al. | |
| 5,998,918 A | 12/1999 | Do et al. | |
| 5,998,925 A | 12/1999 | Shimizu et al. | |
| 6,008,925 A | 12/1999 | Conemac | |
| 6,010,751 A | 1/2000 | Shaw et al. | |
| 6,057,953 A | 5/2000 | Ang | |
| 6,064,417 A | 5/2000 | Harrigan et al. | |
| 6,066,861 A | 5/2000 | Hohn et al. | |
| 6,069,599 A | 5/2000 | Py et al. | |
| 6,080,467 A | 6/2000 | Weber et al. | |
| 6,088,163 A | 7/2000 | Gilbert et al. | |
| 6,101,032 A | 8/2000 | Wortman et al. | |
| 6,117,530 A | 9/2000 | Jonza et al. | |
| 6,118,516 A | 9/2000 | Irie et al. | |
| 6,128,131 A | 10/2000 | Tang | |
| 6,134,050 A | 10/2000 | Conemac | |
| 6,154,259 A | 11/2000 | Hargis et al. | |
| 6,156,141 A * | 12/2000 | Shirakawa ............... | 156/67 |
| 6,157,490 A | 12/2000 | Wheatley et al. | |
| 6,172,810 B1 | 1/2001 | Fleming et al. | |
| 6,175,440 B1 | 1/2001 | Conemac | |
| 6,219,168 B1 | 4/2001 | Wang | |
| 6,224,216 B1 | 5/2001 | Parker | |
| 6,226,126 B1 | 5/2001 | Conemac | |
| 6,236,160 B1 | 5/2001 | Komaki et al. | |
| 6,252,254 B1 | 6/2001 | Soules et al. | |
| 6,255,670 B1 | 7/2001 | Srivastava et al. | |
| 6,276,802 B1 | 8/2001 | Naito | |
| 6,288,817 B2 | 9/2001 | Rowe | |
| 6,292,285 B1 | 9/2001 | Wang et al. | |
| 6,329,966 B1 | 12/2001 | Someya et al. | |
| 6,333,724 B1 | 12/2001 | Taira et al. | |
| 6,417,019 B1 | 7/2002 | Mueller et al. | |
| 6,429,583 B1 | 8/2002 | Levinson et al. | |
| 6,429,584 B2 | 8/2002 | Kubota | |
| 6,463,585 B1 | 10/2002 | Hendricks et al. | |
| 6,531,230 B1 | 3/2003 | Weber et al. | |
| 6,576,156 B1 | 6/2003 | Ratna et al. | |
| 6,621,593 B1 | 9/2003 | Wang et al. | |
| 6,621,609 B1 | 9/2003 | Conemac | |
| 6,627,060 B1 | 9/2003 | Yum et al. | |
| 6,628,248 B2 | 9/2003 | Masumoto et al. | |
| 6,678,081 B2 | 1/2004 | Nishihata et al. | |
| 6,717,704 B2 | 4/2004 | Nakai | |
| 6,765,237 B1 | 7/2004 | Doxsee et al. | |
| 6,777,861 B2 | 8/2004 | Russ et al. | |
| 6,785,028 B1 | 8/2004 | Atsuumi et al. | |
| 6,809,347 B2 | 10/2004 | Tasch et al. | |
| 6,809,781 B2 | 10/2004 | Setlur et al. | |
| 6,839,042 B2 | 1/2005 | Conemac et al. | |
| 6,853,131 B2 | 2/2005 | Srivastava et al. | |
| 6,900,916 B2 | 5/2005 | Okazaki et al. | |
| 6,905,220 B2 | 6/2005 | Wortman et al. | |
| 6,937,221 B2 | 8/2005 | Lippert et al. | |
| 6,937,383 B2 | 8/2005 | Morikawa et al. | |
| 6,947,198 B2 | 9/2005 | Morikawa et al. | |
| 6,956,684 B2 | 10/2005 | Orcutt | |
| 6,986,581 B2 | 1/2006 | Sun et al. | |
| 6,987,610 B2 | 1/2006 | Piehl | |
| 7,068,406 B2 | 6/2006 | Shimomura | |
| 7,088,335 B2 | 8/2006 | Hunter et al. | |
| 7,090,355 B2 | 8/2006 | Liu et al. | |
| 7,147,802 B2 | 12/2006 | Sugimoto et al. | |
| 7,181,417 B1 | 2/2007 | Langseth et al. | |
| 7,206,041 B2 | 4/2007 | Kashima | |
| 7,213,923 B2 | 5/2007 | Liu et al. | |
| 7,230,767 B2 | 6/2007 | Walck et al. | |
| 7,239,436 B2 | 7/2007 | Orttinger et al. | |
| 7,283,301 B2 | 10/2007 | Peeters et al. | |
| 7,302,174 B2 | 11/2007 | Tan et al. | |
| 7,474,286 B2 | 1/2009 | Hajjar et al. | |
| 7,697,183 B2 | 4/2010 | Malyak et al. | |
| 7,728,845 B2 | 6/2010 | Holub | |
| 2001/0019240 A1 | 9/2001 | Takahashi | |
| 2001/0024086 A1 | 9/2001 | Fox et al. | |
| 2001/0050371 A1 | 12/2001 | Odaki et al. | |
| 2002/0003233 A1 | 1/2002 | Mueller-Mach et al. | |
| 2002/0008854 A1 | 1/2002 | Leigh Travis | |
| 2002/0024495 A1 | 2/2002 | Lippert et al. | |
| 2002/0050963 A1 | 5/2002 | Conemac et al. | |
| 2002/0122260 A1 | 9/2002 | Okazaki et al. | |
| 2002/0124250 A1 | 9/2002 | Proehl et al. | |
| 2002/0139945 A1 | 10/2002 | Takahashi et al. | |
| 2002/0145685 A1 | 10/2002 | Mueller-Mach et al. | |
| 2002/0163702 A1 | 11/2002 | Hori et al. | |
| 2002/0185965 A1 | 12/2002 | Collins et al. | |
| 2003/0015692 A1 | 1/2003 | Teng et al. | |
| 2003/0094893 A1 | 5/2003 | Ellens et al. | |
| 2003/0184209 A1 | 10/2003 | Russ et al. | |
| 2003/0184531 A1 | 10/2003 | Morikawa et al. | |
| 2003/0184613 A1 | 10/2003 | Nakamura et al. | |

| | | |
|---|---|---|
| 2003/0184842 A1 | 10/2003 | Morikawa et al. |
| 2003/0231161 A1 | 12/2003 | Yamaguchi |
| 2004/0027465 A1 | 2/2004 | Smith et al. |
| 2004/0070551 A1 | 4/2004 | Walck et al. |
| 2004/0136204 A1 | 7/2004 | Asao |
| 2004/0141220 A1 | 7/2004 | Hama et al. |
| 2004/0145312 A1 | 7/2004 | Ouderkirk et al. |
| 2004/0156079 A1 | 8/2004 | Marshall et al. |
| 2004/0160516 A1 | 8/2004 | Ford |
| 2004/0164927 A1 | 8/2004 | Suyama et al. |
| 2004/0165642 A1 | 8/2004 | Lamont |
| 2004/0184123 A1 | 9/2004 | Morikawa et al. |
| 2004/0223100 A1 | 11/2004 | Kotchick et al. |
| 2004/0227465 A1 | 11/2004 | Menkara et al. |
| 2004/0263074 A1 | 12/2004 | Baroky et al. |
| 2005/0001225 A1 | 1/2005 | Yoshimura et al. |
| 2005/0012446 A1 | 1/2005 | Jermann et al. |
| 2005/0023962 A1 | 2/2005 | Menkara et al. |
| 2005/0023963 A1 | 2/2005 | Menkara et al. |
| 2005/0051790 A1 | 3/2005 | Ueda |
| 2005/0093818 A1 | 5/2005 | Hatam-Tabrizi et al. |
| 2005/0094266 A1 | 5/2005 | Liu et al. |
| 2006/0050015 A1 | 3/2006 | Kusunoki et al. |
| 2006/0066508 A1 | 3/2006 | Walck et al. |
| 2006/0081793 A1 | 4/2006 | Nestorovic et al. |
| 2006/0082873 A1 | 4/2006 | Allen et al. |
| 2006/0088951 A1 | 4/2006 | Hayashi et al. |
| 2006/0132021 A1 | 6/2006 | Naberhuis et al. |
| 2006/0139580 A1 | 6/2006 | Conner |
| 2006/0197922 A1 | 9/2006 | Liu et al. |
| 2006/0221021 A1 | 10/2006 | Hajjar et al. |
| 2006/0221022 A1 | 10/2006 | Hajjar |
| 2006/0227087 A1 | 10/2006 | Hajjar et al. |
| 2006/0262243 A1 | 11/2006 | Lester et al. |
| 2006/0266958 A1 | 11/2006 | Shimizu et al. |
| 2006/0290898 A1 | 12/2006 | Liu et al. |
| 2007/0014318 A1 | 1/2007 | Hajjar et al. |
| 2007/0081239 A1 | 4/2007 | May et al. |
| 2007/0085977 A1 | 4/2007 | Fricke et al. |
| 2007/0183466 A1 | 8/2007 | Son et al. |
| 2007/0187580 A1 | 8/2007 | Kykta et al. |
| 2007/0187616 A1 | 8/2007 | Burroughs et al. |
| 2007/0188417 A1 | 8/2007 | Hajjar et al. |
| 2007/0206258 A1 | 9/2007 | Malyak et al. |
| 2007/0228927 A1 | 10/2007 | Kindler et al. |
| 2007/0229946 A1 | 10/2007 | Okada et al. |
| 2008/0018558 A1 | 1/2008 | Kykta et al. |
| 2008/0066107 A1 | 3/2008 | Moonka et al. |
| 2008/0068295 A1 | 3/2008 | Hajjar |
| 2008/0235749 A1 | 9/2008 | Jain et al. |
| 2008/0247020 A1 | 10/2008 | Malyak et al. |
| 2008/0291140 A1 | 11/2008 | Kent et al. |
| 2009/0001272 A1 | 1/2009 | Hajjar |
| 2009/0021461 A1 | 1/2009 | Hu et al. |
| 2009/0153582 A1 | 6/2009 | Hajjar et al. |
| 2009/0174632 A1 | 7/2009 | Hajjar et al. |
| 2010/0020377 A1 | 1/2010 | Borchers et al. |
| 2010/0097678 A1 | 4/2010 | Hajjar et al. |

FOREIGN PATENT DOCUMENTS

| | | |
|---|---|---|
| EP | 0196862 | 10/1986 |
| EP | 0271650 | 6/1988 |
| EP | 0618472 | 10/1994 |
| EP | 1150361 | 10/2001 |
| JP | 56164826 | 12/1981 |
| JP | 58-093147 | 6/1983 |
| JP | 58093147 A * | 6/1983 |
| JP | 59-155826 | 9/1984 |
| JP | 02-157790 | 6/1990 |
| JP | 2-199975 | 8/1990 |
| JP | 5232583 | 9/1993 |
| JP | 6-46461 | 2/1994 |
| JP | 2000-49380 | 2/2000 |
| JP | 2001-210122 | 8/2001 |
| JP | 2001-316664 | 11/2001 |
| JP | 2002-83549 | 3/2002 |
| JP | 2006-323391 | 11/2006 |
| JP | 2008-509067 | 3/2008 |
| KR | 10-2001-0097415 | 11/2001 |
| KR | 2002-0024425 | 3/2002 |
| KR | 2003-0068589 | 8/2003 |
| KR | 2004-0037267 | 5/2004 |
| WO | WO 90/12387 | 10/1990 |
| WO | WO 92/22109 | 12/1992 |
| WO | WO 00/20912 | 4/2000 |
| WO | WO 00/33389 | 6/2000 |
| WO | WO 01/24229 | 4/2001 |
| WO | WO 01/88609 | 11/2001 |
| WO | WO 02/11173 | 2/2002 |
| WO | WO 02/23962 | 3/2002 |
| WO | WO 02/29772 A2 | 4/2002 |
| WO | WO 02/33970 | 4/2002 |
| WO | WO 02/057838 | 7/2002 |
| WO | WO 02/059693 A1 | 8/2002 |
| WO | WO 02/071148 | 9/2002 |
| WO | WO 2005/043232 A2 | 5/2005 |
| WO | WO 2005/119797 | 12/2005 |
| WO | WO 2006/097876 | 9/2006 |
| WO | WO 2006/107720 | 10/2006 |
| WO | WO 2007/050662 | 5/2007 |
| WO | WO 2007/095329 | 8/2007 |
| WO | WO 2007/114918 | 10/2007 |
| WO | WO 2007/131195 | 11/2007 |
| WO | WO 2007/134329 | 11/2007 |
| WO | WO 2008/116123 | 9/2008 |
| WO | WO 2008/124707 | 10/2008 |
| WO | WO 2008/144673 | 11/2008 |
| WO | WO 2009/003192 | 12/2008 |

OTHER PUBLICATIONS

International Search Report and Written Opinion dated Jan. 28, 2010 for PCT/US2009/051878, now WO 2010/012003, 11 pages.
Extended European Search Report for Application No. EP 07783797, dated Dec. 10, 2009, 5 pages.
Supplementary European Search Report and Search Opinion for Application No. EP 07750816, dated Mar. 1, 2011, 10 pages.
Official Action for Application No. 2009146834, dated Apr. 12, 2011, 7 pages.
Supplementary European Search Report dated Jul. 29, 2009 for European Patent Application No. 06836510.5 (6 pages).
Supplementary European Search Report dated Mar. 25, 2009 for European Patent Application No. 06740108.3 (7 pages).
The Korean Intellectual Property Office, Office Action dated Mar. 31, 2009 for Korean Patent Application No. Oct. 2007-7025455 (4 pages).
English language translation of the Korean Intellectual Property Office, Office Action dated Mar. 31, 2009 for Korean Patent Application No. 10-2007-7025455 (5 pages).
International Search Report and Written Opinion dated Nov. 24, 2008 for PCT/US07/68989, now WO 2007/134329, published on Nov. 22, 2007 and entitled: "Multilayered Fluorescent Screens for Scanning Beam Display Systems" 9 pages.
International Search Report and Written Opinion dated Nov. 28, 2008 for PCT/US2008/064169, now WO 2008/144673, published on Nov. 27, 2007 and entitled: "Multilayered Screens with Light-Emitting Stripes for Scanning Beam Display Systems" 9 pages.
International Search Report and Written Opinion dated Nov. 26, 2008 for PCT/US2008/068679, now WO 2009/003192, published on Dec. 31, 2008 and entitled: "Servo Feedback Control Based on Designated Scanning Servo Beam in Scanning Beam Display Systems With Light-Emitting Screens" 11 pages.
"Fuji Film Color Mosaic Excellent for Image Sensor CM-EXIS," http://www.fuji-filmffem.com/downloads/Product%20Spotlight%20Color%Mosaic.pdf (1 page) [accessed May 27, 2008].
"Quantum Dots Explained," http://www.evidenttech.com/quantum-dots-explained.html (1 page) [accessed May 27, 2008].
"Reflection and retroreflection," Delta Technical Note—RS 101 http://www.delta.dk/C1256ED600446B80/sysOakFil/roadsensors%20techn%20info%20RS101/$File/RS101.pdf, revised: Jul. 10, 2004, 7 pages [accessed Oct. 23, 2008].
Collins et al., "Process Control of the Chlorobenzene Single-Step Liftoff Process with a Diazo-Type Resist," IBM J. Res. Develop. 26(5): 596-604 (Sep. 1982).

Cusano, D.A., "Cathodo-, Photo-, and D.C. -Electroluminescence in Zinc Sulfide Layers," Luminescence of Organic and Inorganic Materials, Kallman, H.P. And G.M. Spruch (Eds.), New York University, pp. 494-522 (1962).

Daud, A. et al., "Transparent Y2O2S:Eu3+ phosphor thin films grown by reactive evaporation and their luminescent properties," Journal of the Society for Information Display (SID), vol. 4, No. 3, pp. 193-196 (1996).

Donofrio, R.L. and C.H. Rehkopf, "Screen Weight Optimization," Journal of the Electrochemical Society, vol. 126, No. 9, pp. 1563-1567 (Sep. 1979).

Greer, J.A. et al., "38.4: P-53 Thin Film Phosphors Prepared by Pulsed—Laser Deposition," 1994 SID International Symposium Digest of Technical Papers (SID '94 Digest) vol. XXV, pp. 827-830 (May 1994).

Hopkinson, R. G., "An Examination of Cathode-Ray-Tube Characteristics," The Journal of the Institute of Electrical Engineers, vol. 93, Part IIIa (Radioloaction), No. 5, pp. 779-794 (1946).

International Search Report and Written Opinion dated Aug. 29, 2008, for PCT/US2008/059603, filed Apr. 7, 2008, entitled: "Post-Objective Scanning Beam Systems".

International Search Report and Written Opinion dated Jul. 20, 2006 and International Preliminary Report on Patenability for dated Oct. 3, 2007 for PCT/US2006/11757, now WO 2006/107720, publised on Oct. 12, 2006, entitled: "Display Systems and Devices Having Screens with Optical Fluorescent Materials".

International Search Report and Written Opinion dated Jun. 27, 2008 for PCT/US2008/057763, filed Mar. 20, 2008, entitled: "Delivering and Displaying Advertisement or Other Application Data to Display Systems".

International Search Report and Written Opinion dated Mar. 13, 2008 and International Preliminary Report on Patentability for dated Aug. 19, 2008 for PCT/US2007/004004, now WO 2007/095329, published on Aug. 23, 2007, entitled: "Servo-Assisted Scanning Beam Display Systems Using Fluorescent Screens".

International Search Report and Written Opinion dated May 28, 2008 for PCT/US06/41584, now WO 2007/050662, published on May 3, 2007, entitled: "Optical Designs for Scanning Beam Display Systems Using Fluorescent Screens," 9 pages.

Kalkhoran, n. M. et al., "LP-E: *Late News Poster*: Luminescence Study of Ion-Implanted ZnGa2O4 Thin Films on Flexible Organic Substrates," 1997 SID International Symposium Digest of Technical Papers (SID '97 Digest), vol. XXVIII, pp. 623-626 (May 1997)

Kim, J.M. et al. "6.3: Development of 4-in. Full Color FED, Devices," 1997 SID International Symposium Digest of Technical Papers ( SID '97 Digest), vol. XVIII, pp. 56-59 (May 1997).

Kramer, C.J., "Hologon deflectors for graphic arts applications: an overview," SPIE Proceedings on Beam Deflection and Scanning Technologies 1454: 68-100 (1991).

Kramer, C.J., "Hologon deflectors incorporating dispersive optical elements for scan line bow correction," SPIE Proceedings on Holographic Optics: Design and Applications, 883: 230-244 (1988).

Loewen, E.G. et al., "Grating efficiency theory as it applies to blazed and holographic gratings," Applied Optics, vol. 16, No. 10, pg. 2711-2721 (Oct. 1977).

McDonald, L. W. and A. C. Lowe (Eds.), *Display Systems, Design Applications*, John Wiley & Sons: Chichester, England, pp. 195-196 (1997).

Mezner, L.Z. et al., "P-23: Centrifugal Settling of High Resolution 1-in CRT Screens," 1994 SID International Symposium Digest of Technical Papers (SID '94 Digest), vol. XXV, pp. 520-522 (May 1994).

Morikawa, M. et al., "S11-3 Study to Improve the Flood-Beam CRT for Giant Screen Display," Proceedings of the Twelfth International Display Research Conference, Japan Display '92, Oct. 12-14, 1992, International Conference Center, Hiroshima, Japan pp. 385-388.

Mueller-Mach, R. et al., "High-Power Phosphor-Converted Light Emitting Diodes Based on III-Nitrides," IEEE Journal on Selected Topics in Quantum Electronics 8(2): 339-345 (Mar./Apr. 2002).

Nonogaki, S. et al., "Dry Process for Phosphor Screen Fabrication of Multicolored Cathode Ray Tubes," Research & Development in Japan, pp. 50-55 (1984).

Oki, K. and L. Ozawa, "A phosphor screen for high-resolution CRTs," Journal of the SID, vol. 3, No. 2, pp. 51-57 (Sep. 1995).

Pringsheim, P. And M. Vogel, *Luminescence of Liquids and Solids and its Practical Applications*, Interscience Publishers, Inc.: New York, N.Y., pp. 144-145 (1946).

Rowe, D.M., "Developments in holographic-based scanner designs," Proc. SPIE, Optical Scanning Systems: Design and Applications, Leo Beiser and Stephen F. Sagan, Eds. vol. 3131: 52-58 (1997).

Rynearson, R.L. et al., "Low-cost, mechanically rigid, high-aspect-ratio mirrors," SPIE Proceedings on Design, Fabrication, and Applications of Precision Plastic Optics 2600: 137-143 (1995).

Schermerhorn, J.D. et al., "15.5: A Grooved Structure for a Large High-Resolution Color ACPDP," 1997 SID International Symposium Digest of Technical Papers ( SID '97 Digest), vol. XVII, pp. 229-232 (May 1997).

Schlesinger et al., "Screening," Design, Development, and Fabrication of Ultra-HighResolution Cathode Ray tube. Technical Report ECOM-00476, pp. 64-72, Feb. 1969.

Smith, D.C. et. al., "32.5: Late-News Paper: Crystalline-As-Deposited CaGa2S4:Ce via Low Temperature Metal Organic Chemical Vapor Deposition," 1995 SID International Symposium Digest of Technical Papers (SID '95 Digest), vol. XXVI, pp. 728-731 (May 1995).

Smith, W.J., "Scanner/f-0 and Laser Disk Collimator Lenses," Chapter 22 in Modern Lens Design: A Resource Manual, pp. 411-430, Boston, Mass.: McGraw-Hill, Inc., 1992.

Withnall et al., "Studies of UV stimulated luminesence from phosphors of commerical importance," Central Laser Facility Annual Report 2004/2005 http://www.clf.rl.ac.uk/Reports/2004-2005/pdf/64.pdf [accessed on May 23, 2008], 2 pages.

Yocom, P. N., "Future requirements of display phosphors from an historical perspective," Journal of the Society for Information Display (SID), Special Section: Papers from the First International Conference on the Science and Technology of Display Phosphors, vol. 4, No. 3, pp. 149-152 (Oct. 1996).

Yocom, P. N., "New green phosphors for plasma displays," Journal of the Society for Information Display (SID), Special Section: Papers from the First International Conference on the Science and Technology of Display Phosphors, vol. 4, No. 3, pp. 169-172 (Oct. 1996).

Zupanc-Mežnar, L. and M. Žumer, "26.4:Preparation of P43 Suspension and Screen-Quality Evaluation in 1—in. CRTs", 1997 SID International Symposium Digest of Technical Papers ( SID '97 Digest), vol. XVIII, pp. 440-443 (May 1997).

* cited by examiner

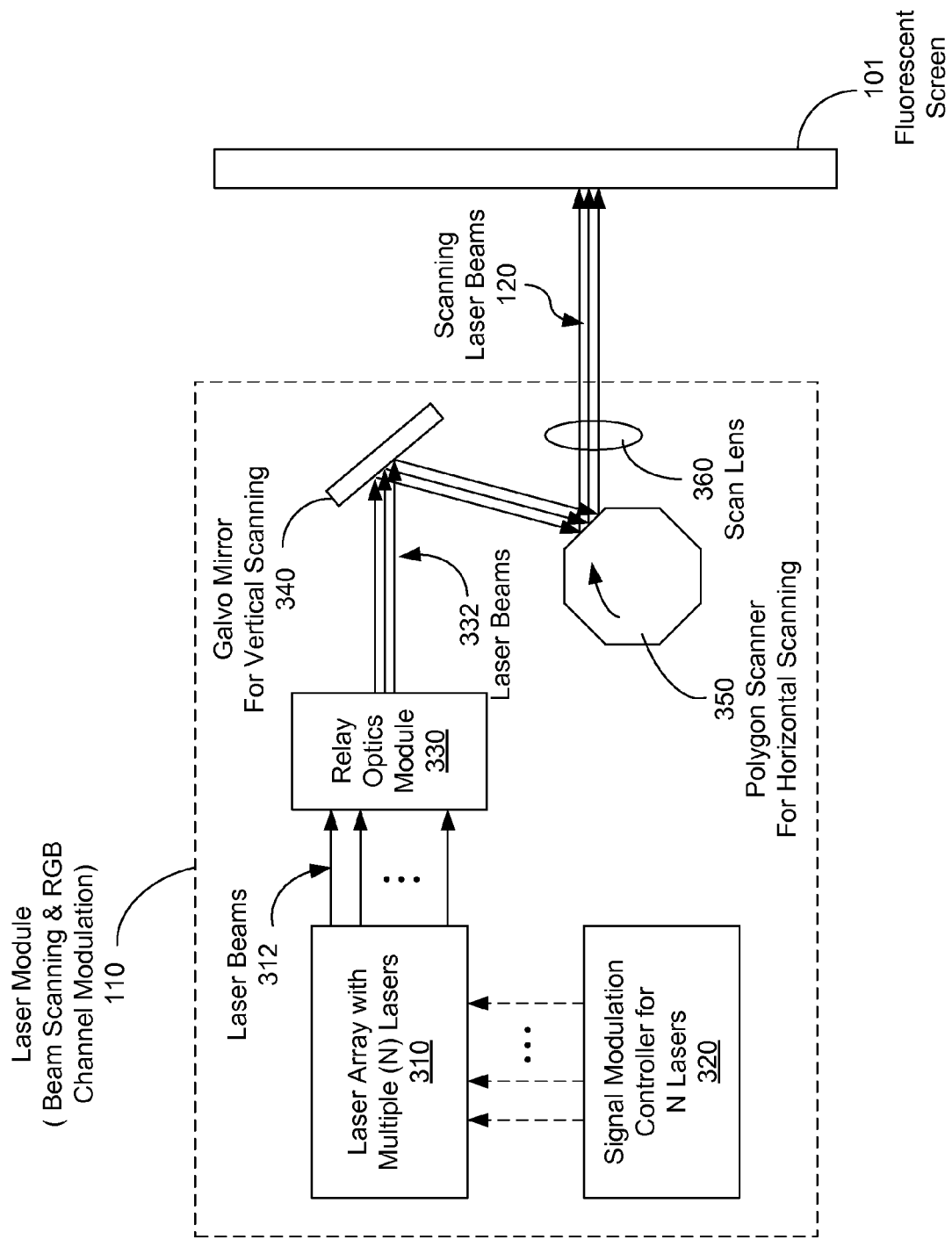

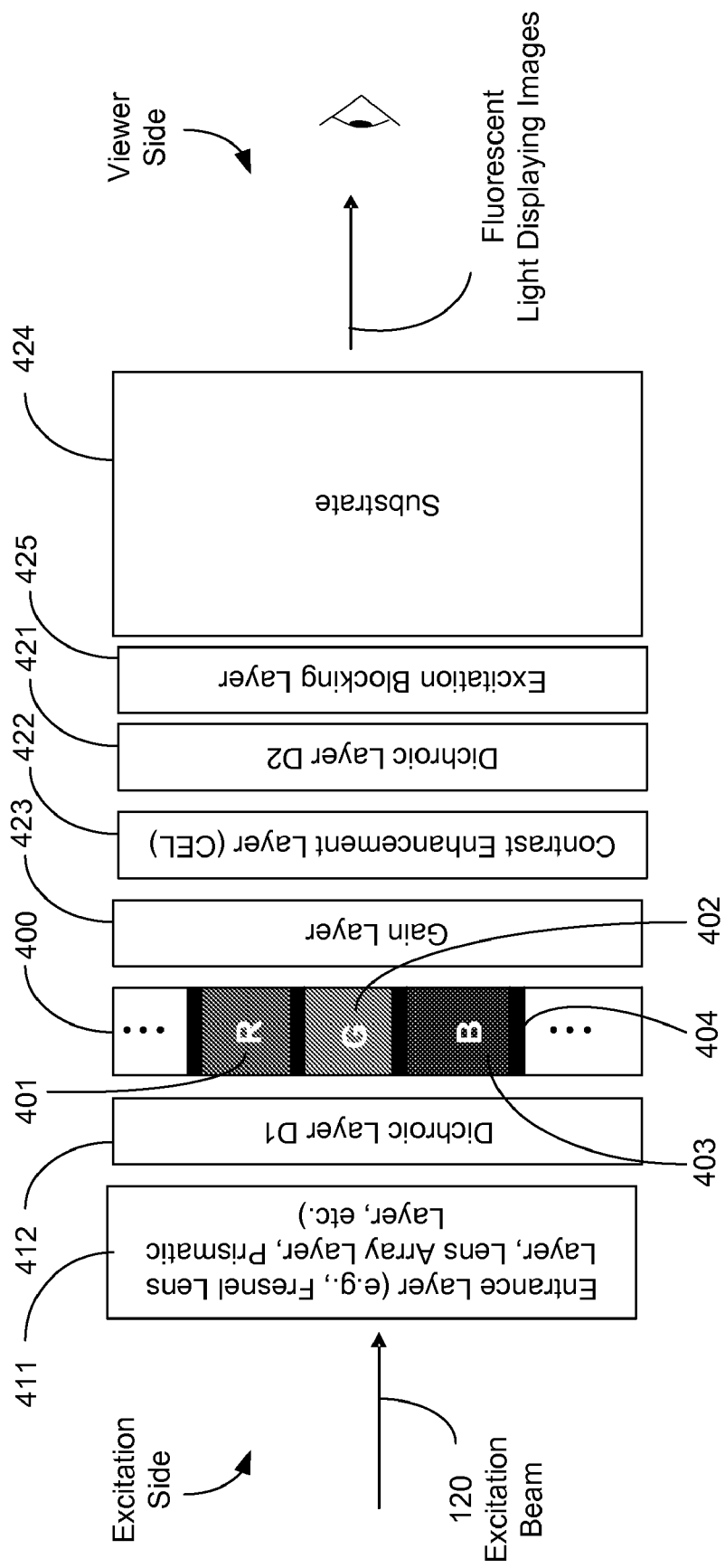

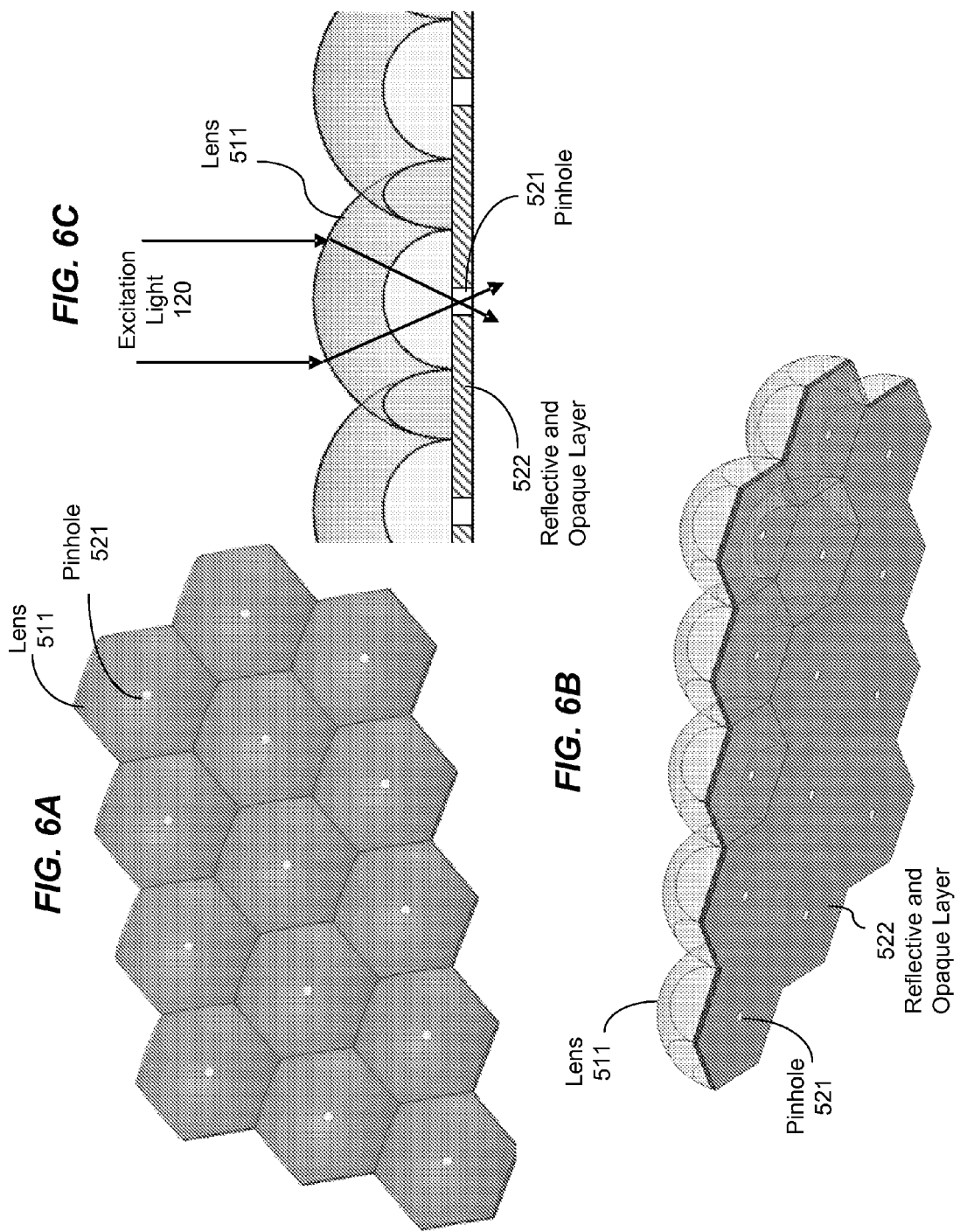

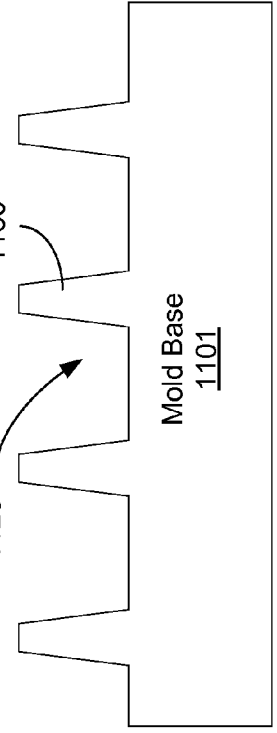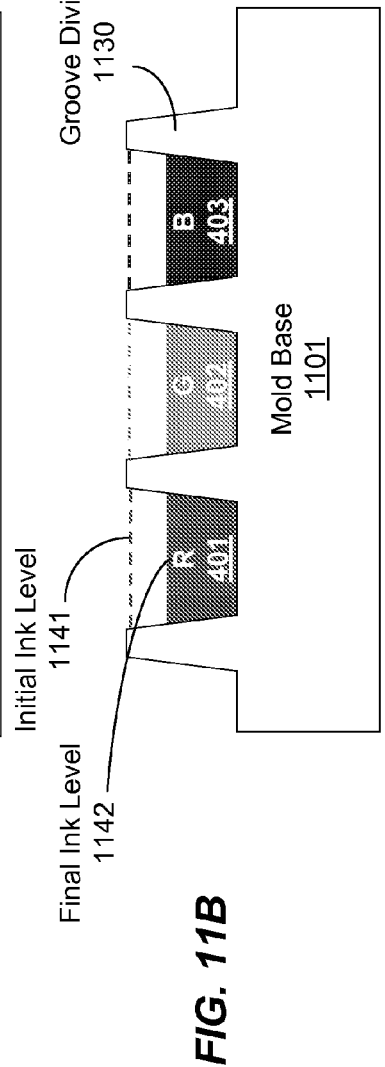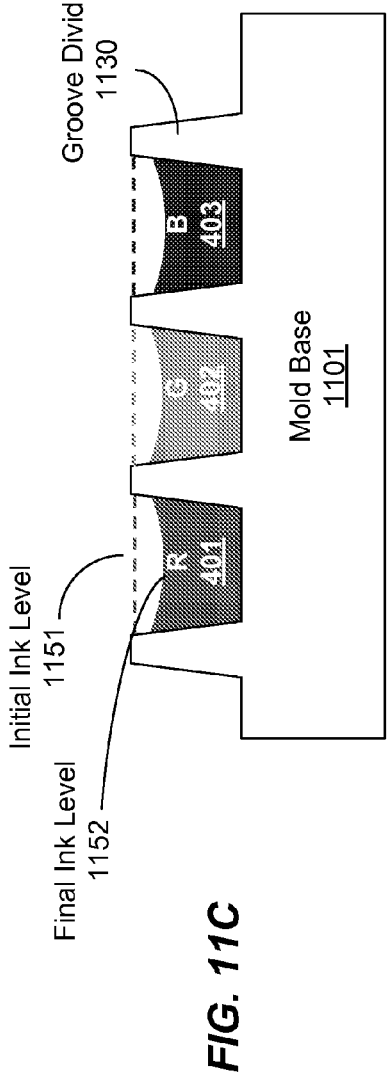

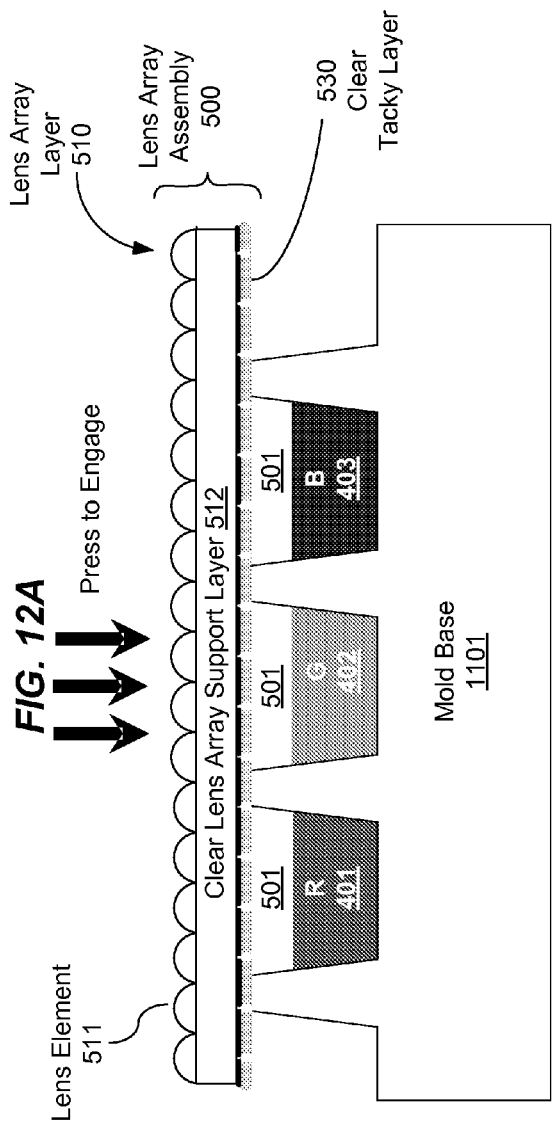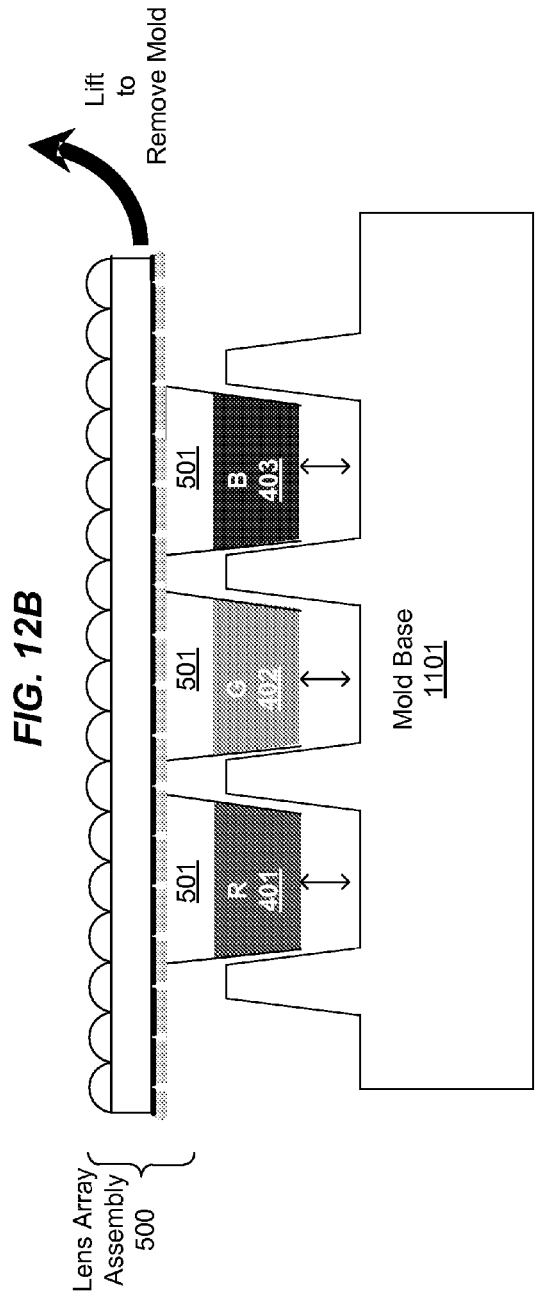

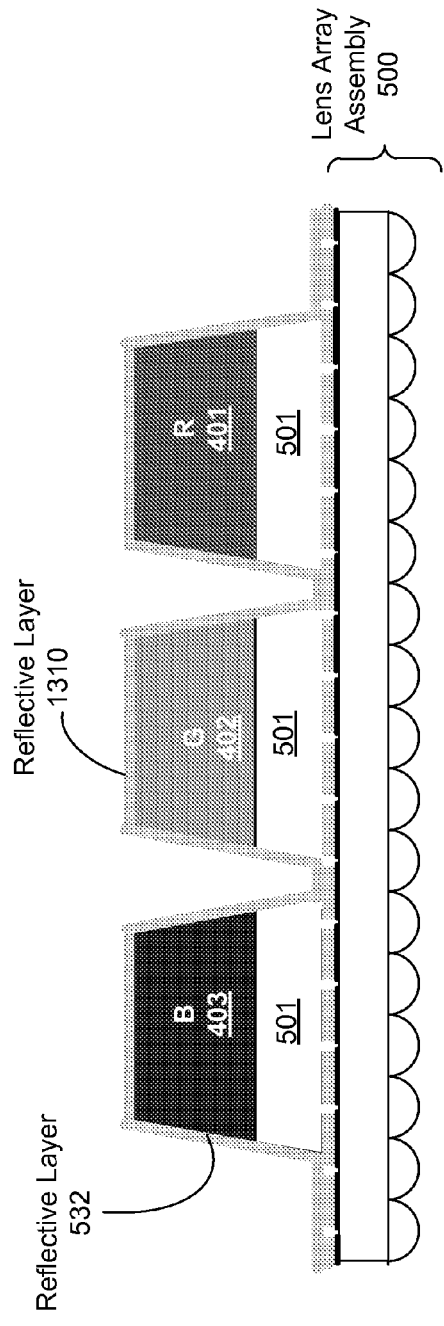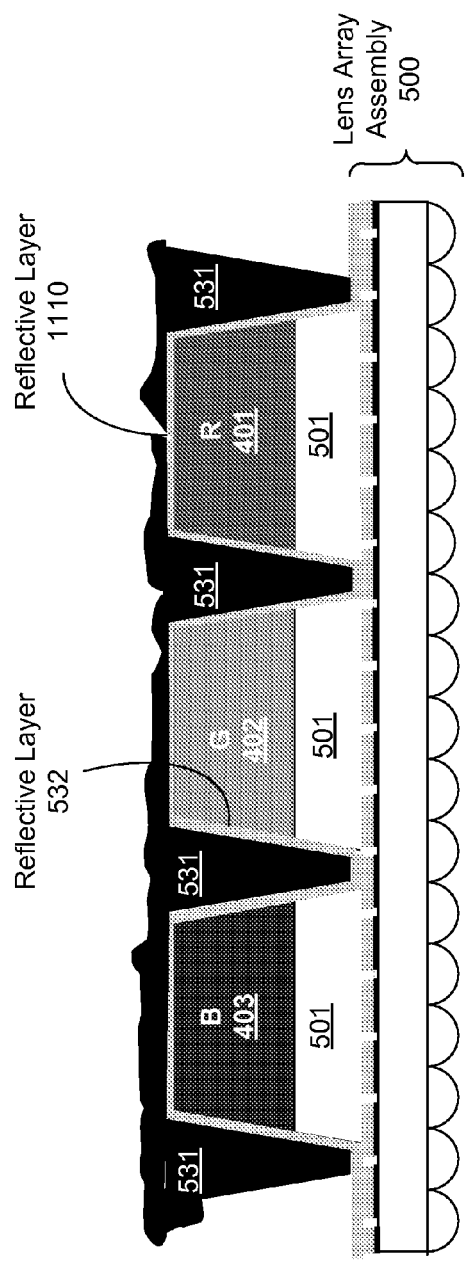

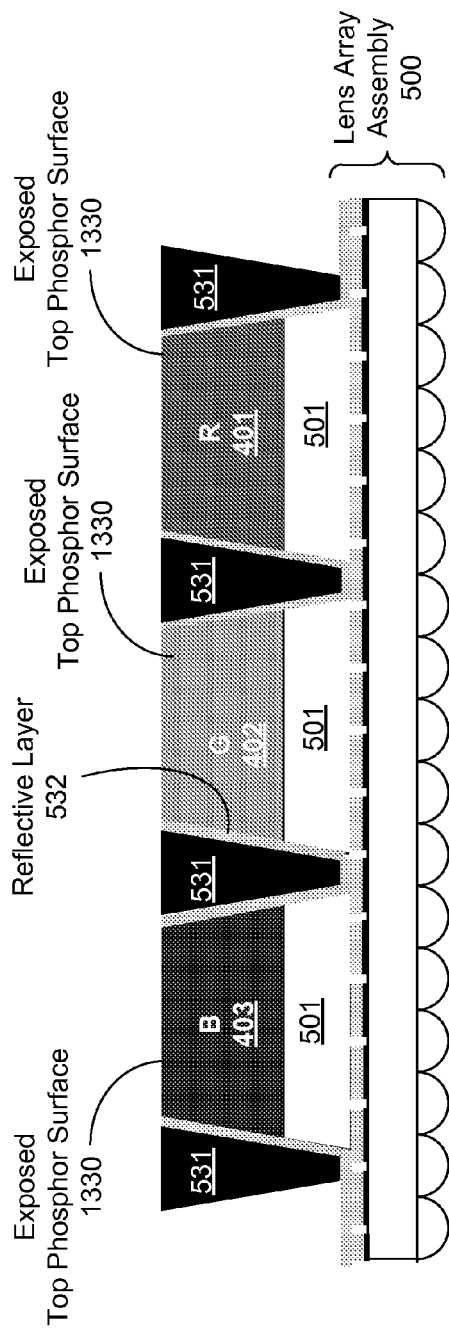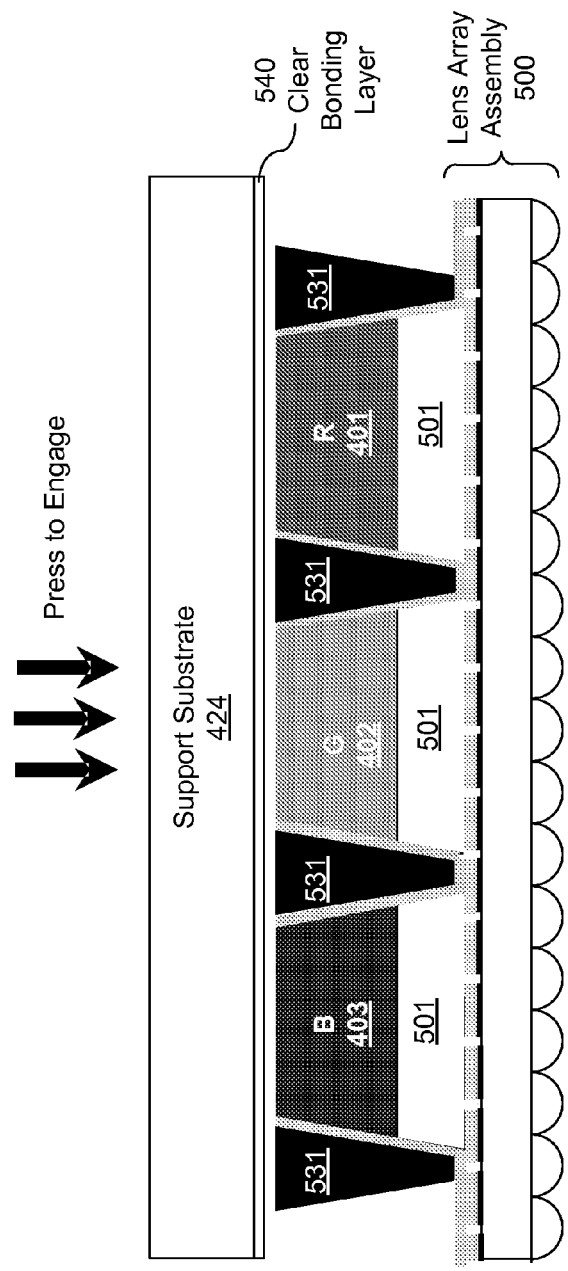

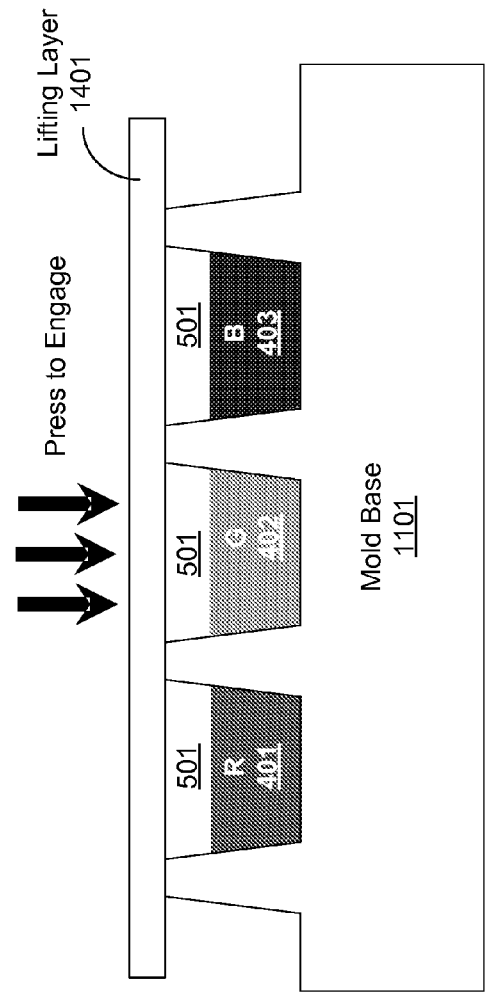
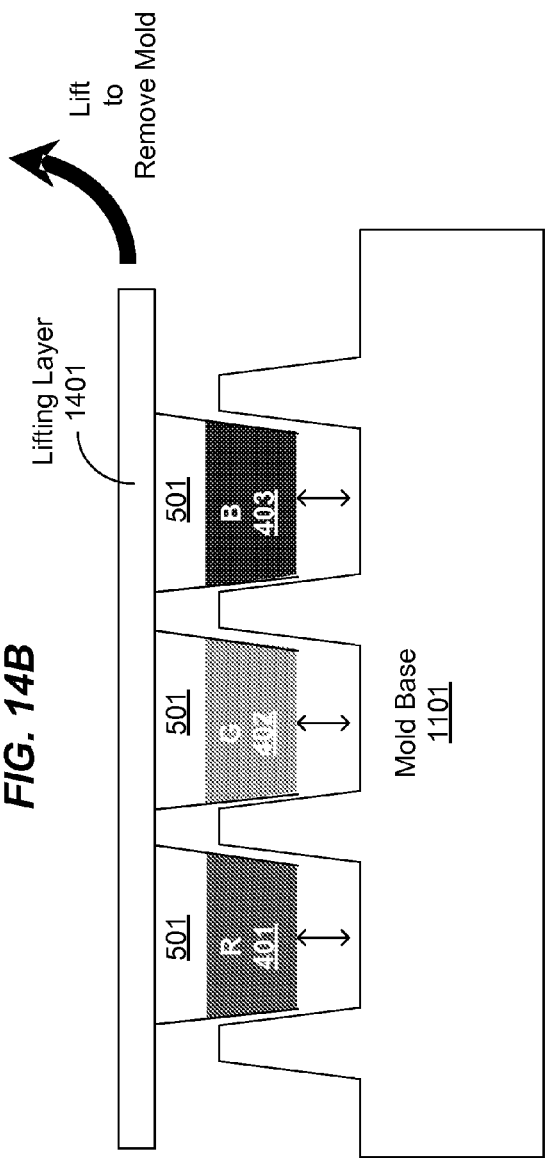

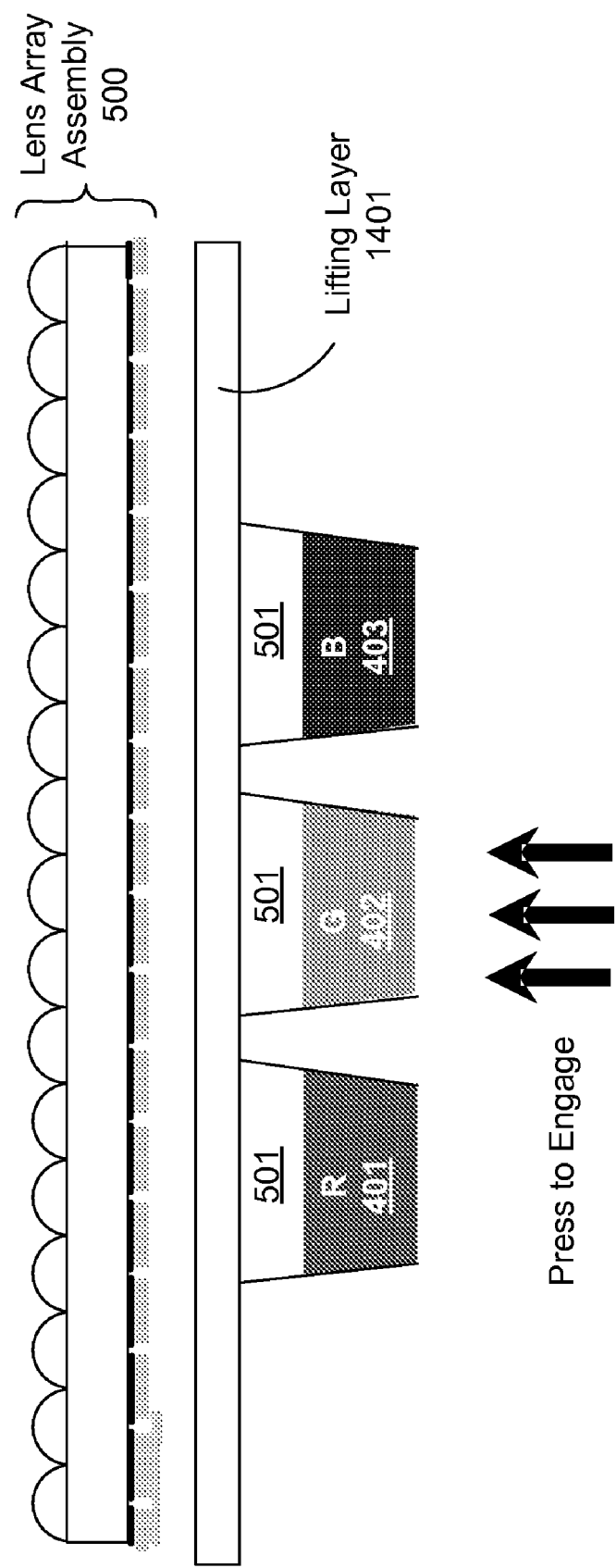

FIG. 15A
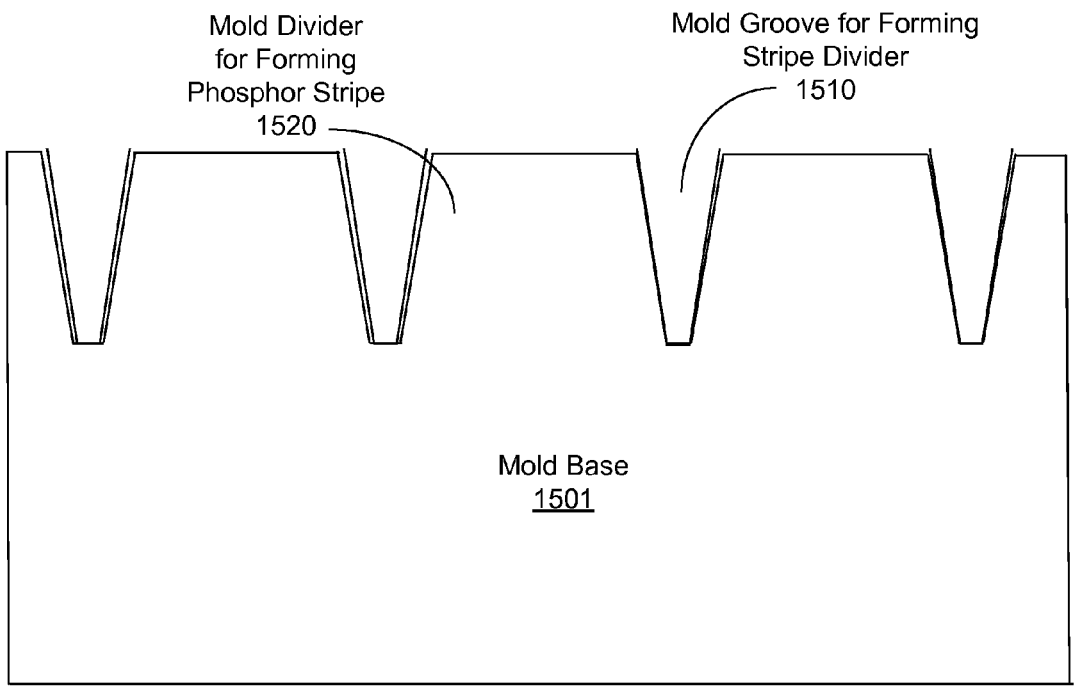
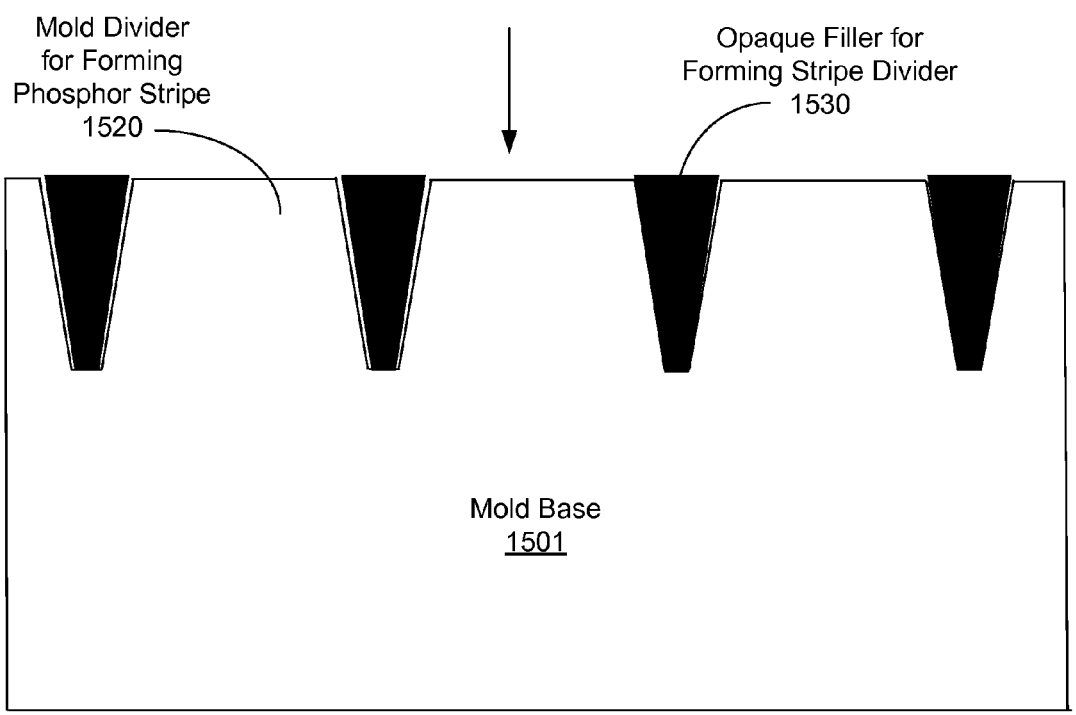

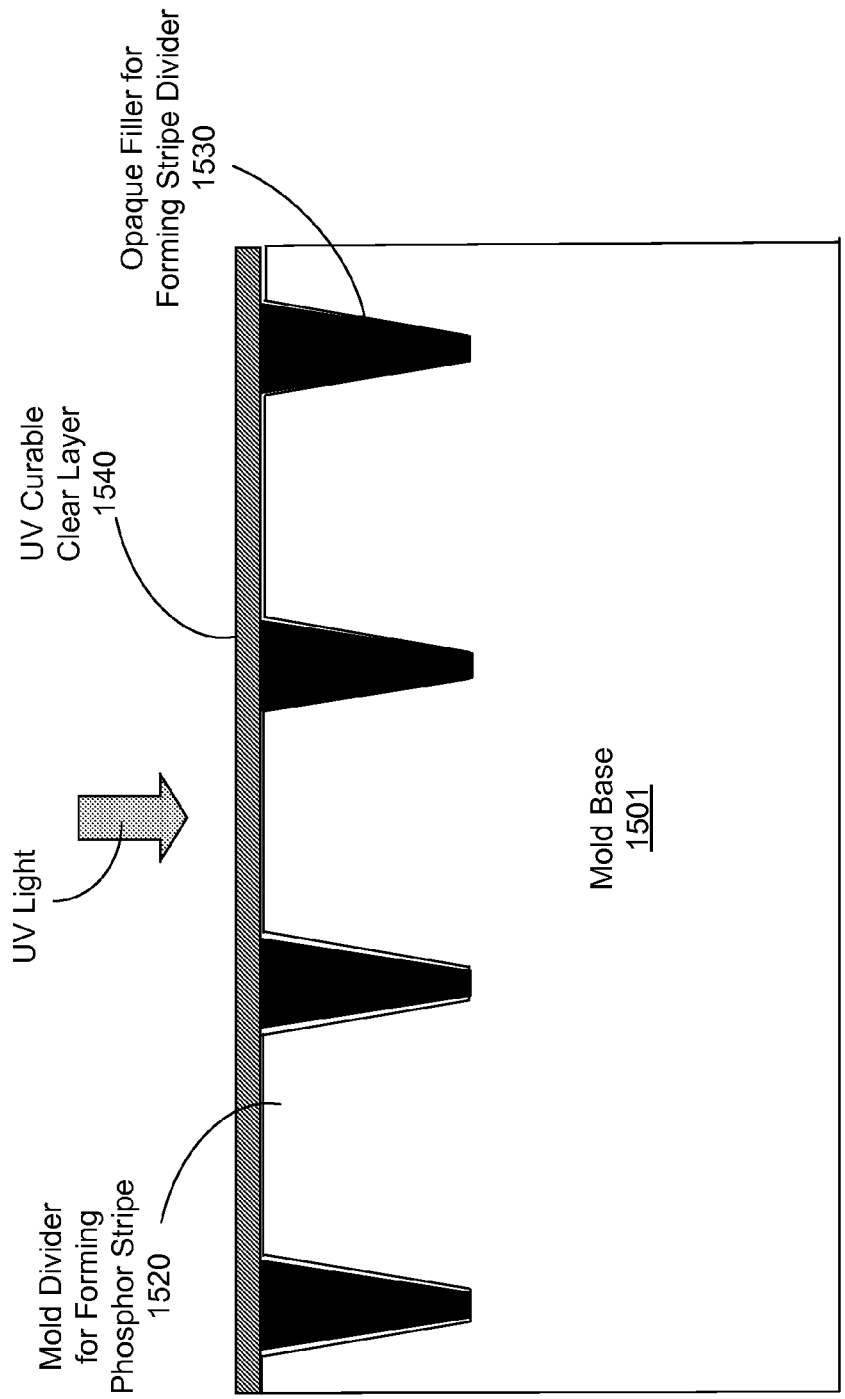

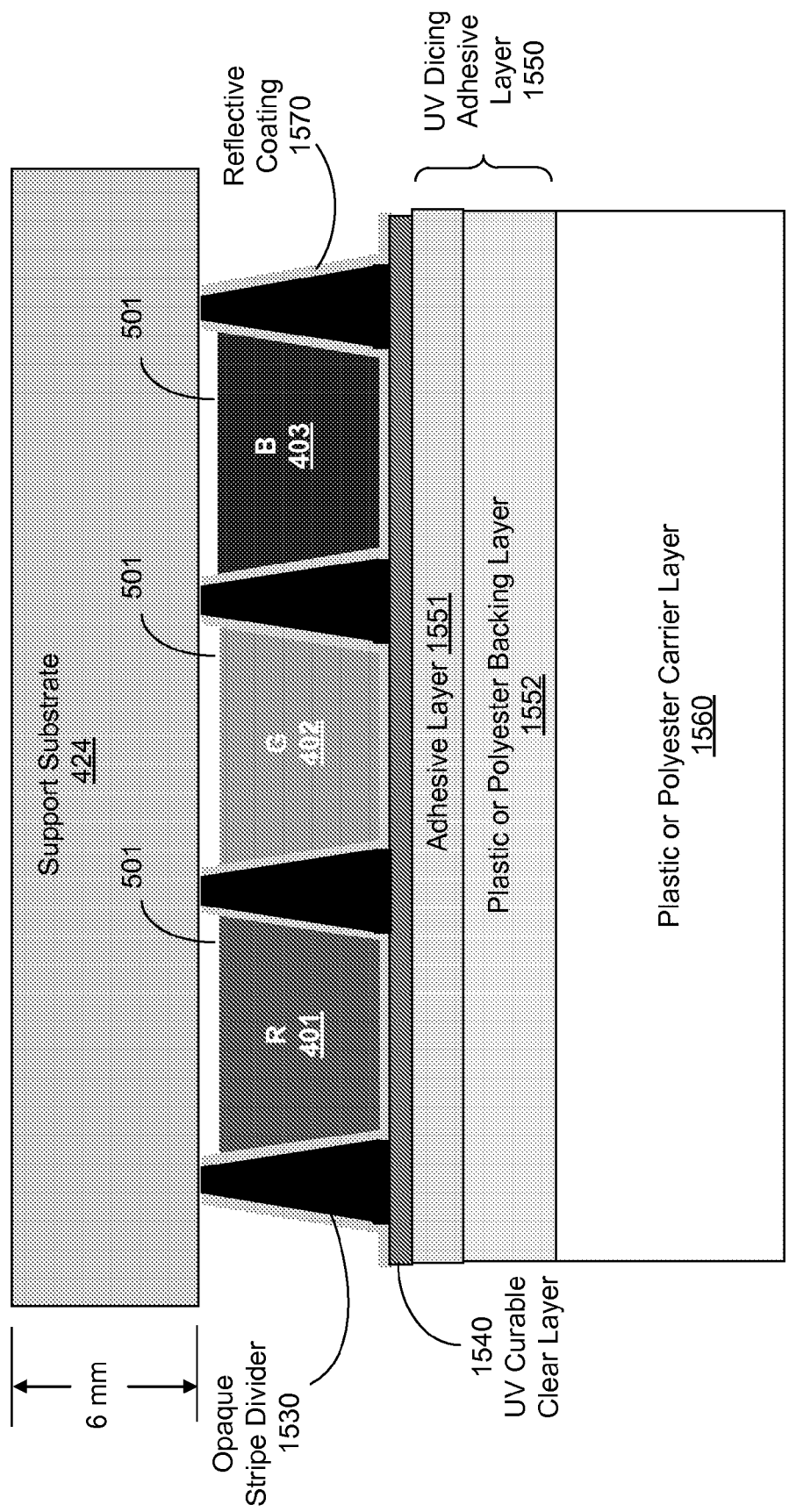

MULTILAYERED SCREENS WITH LIGHT-EMITTING STRIPES FOR SCANNING BEAM DISPLAY SYSTEMS

PRIORITY CLAIM

This application claims the benefit of U.S. Provisional Application No. 60/938,690 entitled "Multilayered Screens with Light-Emitting Stripes for Scanning Beam Display Systems" and filed on May 17, 2007, the entire disclosure of which is incorporated by reference as part of the specification of this application.

BACKGROUND

This application relates to display systems that use screens with fluorescent materials to emit colored light under optical excitation, such as laser-based image and video displays and screen designs for such displays.

Image and video displays can be designed to directly produce light of different colors that carry color images and to project the color images on a screen, where the screen makes the color images visible to a viewer by reflection, diffusion or scattering of the received light and does not emit light. Examples of such displays include digital light processing (DLP) displays, liquid crystal on silicon (LCoS) displays, and grating light valve (GLV) displays. Some other image and video displays use a light-emitting screen that produces light of different colors to form color images. Examples of such display systems include cathode-ray tube (CRT) displays, plasma displays, liquid crystal displays (LCDs), light-emitting-diode (LED) displays (e.g., organic LED displays), and field-emission displays (FEDs).

SUMMARY

The specification of this application describes, among others, light-emitting screens under optical excitation, and display systems and devices based on such screens using at least one excitation optical beam to excite one or more light-emitting materials on a screen which emit light to form images. The fluorescent materials may include phosphor materials and non-phosphor materials such as quantum dots.

In one example, a display screen includes a light-emitting layer comprising parallel and separated light-emitting stripes each absorbing excitation light at an excitation wavelength to emit visible light at a visible wavelength different from the excitation wavelength; and a lens array layer over the light-emitting layer to direct the excitation light to the light-emitting layer and comprising a two-dimensional array of lenses. Each lens has a dimension less than a width of each light-emitting stripe and there are multiple lenses within the width of each light-emitting stripe. A pinhole array layer is located between the lens array layer and the light-emitting layer and includes a reflective and opaque layer that overlays the lens array layer and is patterned with a two-dimensional array of pinholes that spatially correspond to the lenses, respectively, to transmit excitation light from the lenses to the light-emitting layer.

In another example, a display screen includes a light-emitting layer comprising parallel and separated light-emitting stripes each absorbing excitation light at an excitation wavelength to emit visible light at a visible wavelength different from the excitation wavelength, and parallel and optically reflective stripe dividers interleaved with the light-emitting stripes with each stripe divider located between two adjacent light-emitting stripes This screen also includes a dichroic layer formed over the light-emitting layer to receive and transmit the excitation light while reflecting the visible light emitted by the light-emitting layer. This screen further includes a Fresnel lens layer located to direct the excitation light to the dichroic layer. The dichroic layer is between the Fresnel lens layer and the light-emitting layer.

In another example, a display screen includes a light-emitting layer comprising parallel and separated light-emitting stripes each absorbing excitation light at an excitation wavelength to emit visible light at a visible wavelength different from the excitation wavelength, and parallel stripe dividers interleaved with the light-emitting stripes with each stripe divider located between two adjacent light-emitting stripes. Each stripe divider is optically reflective.

In another example, a method for making a display screen includes: applying light-emitting materials, that absorb excitation light at an excitation wavelength to emit visible light at wavelengths different from the excitation wavelength, into parallel grooves of a mold so that two adjacent grooves are applied with two different light-emitting materials that emit at two different wavelengths; controlling a volume of each light-emitting material in each respective groove during the process of applying the light-emitting materials into the mold to partially fill each groove; applying a liquid material in each groove on top of a respective light-emitting material to fill the groove; transforming the liquid material into a transparent solid material that attaches to each light-emitting material in each groove; placing a screen layer on the mold to be in contact with and to engage to the transparent solid material; lifting the screen layer to lift a stripe formed by the transparent solid material and each light-emitting material out of the mold to form a light-emitting layer of parallel light-emitting stripes; and applying one or more additional screen layers to the light-emitting layer to form a display screen.

In another example, a method for making a display screen includes applying a stripe divider material that optically opaque to light into parallel grooves of a mold that define an array of parallel stripe dividers of the display screen; applying a clear layer of a UV curable clear material on exposed surfaces of the mode between the parallel groves and on top surfaces of the stripe divider material in the parallel grooves; directing UV light to the UV curable clear material to cure the material to bond with the stripe divider material; applying a UV dicing adhesive layer to adhere to the cured clear layer; attaching a carrier layer to the UV dicing adhesive layer; lifting the carrier layer, the UV dicing adhesive layer and the cured clear layer to remove the array of stripe dividers attached to the cured clear layer out of the parallel grooves of the mode; filling groves between the stripe dividers over the cured clear layer with light-emitting materials, that absorb excitation light at an excitation wavelength to emit visible light at wavelengths different from the excitation wavelength so that two adjacent grooves separated by a stripe divider are applied with two different light-emitting materials that emit at two different wavelengths; controlling a volume of each light-emitting material in each respective groove during the process of applying the light-emitting materials to partially fill each groove and to form parallel light-emitting stripes that are spatially interleaved with and separated by the stripe dividers; placing one or more screen layers in contact with and to engage to top of the stripe dividers; directing UV light to the UV dicing adhesive layer to separate the UV dicing adhesive layer along with the carrier layer from the cured clear layer; removing the cured clear layer from the stripe dividers and the light-emitting stripes; and forming a light receiving layer to replace the removed cured clear layer to receive and direct excitation light into the light-emitting stripes.

In yet another example, a method for making a display screen includes forming a metal layer on a flat surface of a lens array layer of a two-dimensional array of lenses; scanning an ablation laser beam to the array of lenses to focus the ablation laser beam on the metal layer through each lens to remove the metal at a location of the focused ablation laser beam to form a pinhole, thus forming a two-dimensional array of pinholes in the metal layer; and engaging a light-emitting layer to the metal layer having the two-dimensional array of pinholes. The light-emitting layer includes parallel and separated light-emitting stripes each absorbing excitation light at an excitation wavelength to emit visible light at a visible wavelength different from the excitation wavelength and each lens has a dimension less than a width of each light-emitting stripe so that there are multiple lenses within the width of each light-emitting stripe. This method also includes engaging the light-emitting layer and the lens array layer to a support substrate to form a display screen.

These and other examples and implementations are described in detail in the drawings, the detailed description, and the claims.

BRIEF DESCRIPTION OF THE DRAWINGS

FIG. 3A shows an example implementation of the laser module in FIG. 1 having multiple lasers that direct multiple laser beams on the screen.

FIG. 4 illustrates an example screen having a fluorescent stripe layer with fluorescent stripes for emitting red, green and blue colors under optical excitation of the scanning excitation light.

FIGS. 6A, 6B and 6C show additional details of a lens array assembly based on the design in FIG. 5.

FIGS. 11A, 11B, 11C and 11D illustrate an example of a molding process in forming a light-emitting layer with parallel light-emitting stripes.

FIGS. 12A and 12B illustrate lifting the light-emitting layer by using a lens array assembly shown in FIG. 5.

FIGS. 13A through 13D illustrate additional steps in a process for making the screen in FIG. 5.

FIGS. 14A, 14B and 14C show a use of a lifting layer to remove a molded light-emitting layer out of a mold and to engage to another screen layer such as a lens array assembly.

FIGS. 15A through 15J illustrate a molding process different from the process in FIG. 11A through FIG. 11C.

DETAILED DESCRIPTION

Figure 1:
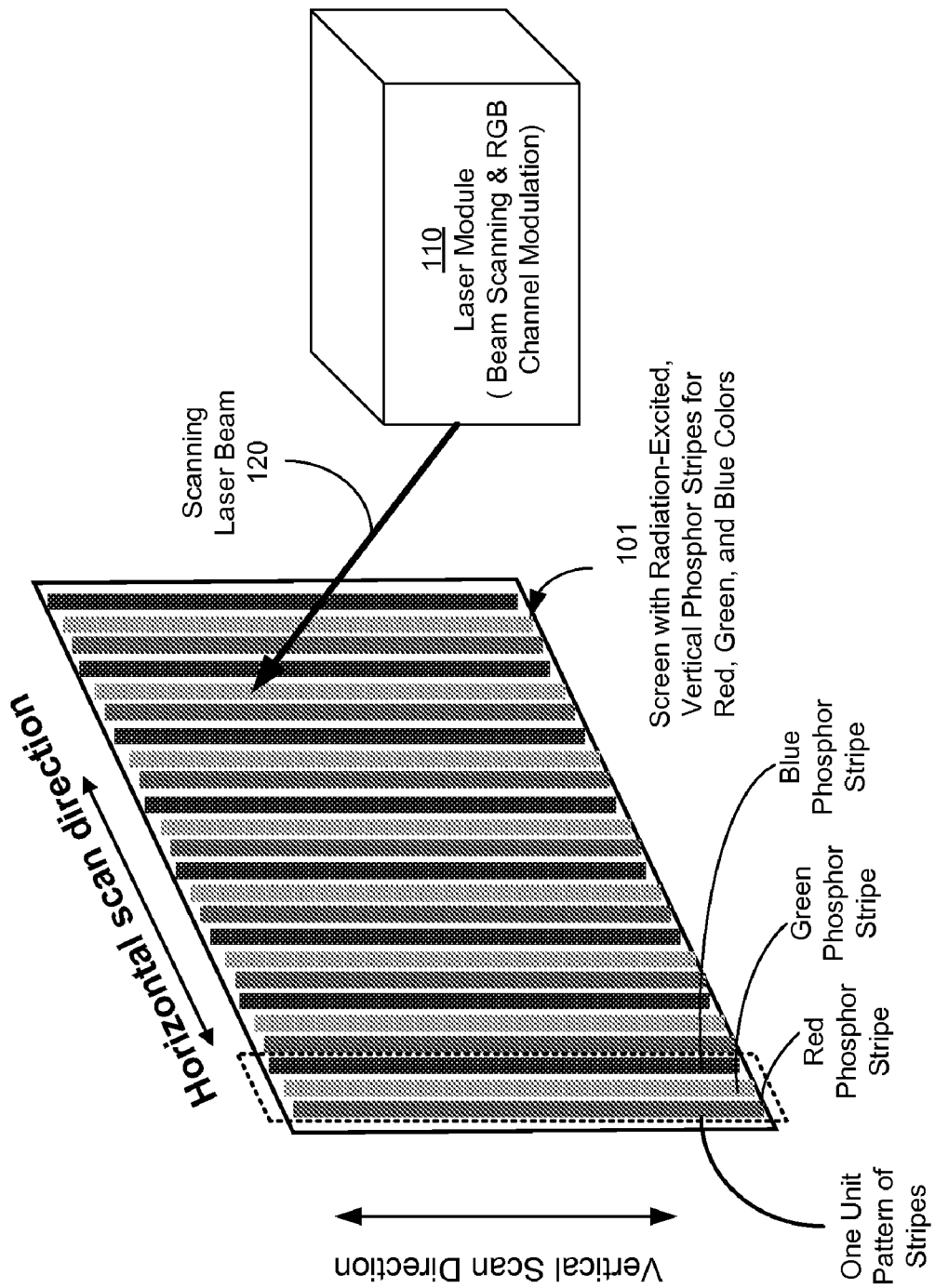
FIG. 1 shows an example scanning laser display system having a fluorescent screen made of laser-excitable fluorescent materials (e.g., phosphors) emitting colored lights under excitation of a scanning laser beam that carries the image information to be displayed.

This application describes implementations of scanning beam display systems including laser video display systems and laser HDTV sets that use screens with light-emitting materials, such as phosphor and fluorescent materials, to emit light under optical excitation to produce images. Various examples of screen designs with light-emitting or fluorescent materials are described. Screens with phosphor materials under excitation of one or more scanning excitation laser beams are described in detail and are used as specific implementation examples of optically excited fluorescent materials in various system and device examples in this application.

In one implementation, for example, three different color phosphors that are optically excitable by the laser beam to respectively produce light in red, green, and blue colors suitable for forming color images may be formed on the screen as pixel dots or repetitive red, green and blue phosphor stripes in parallel. Various examples described in this application use screens with parallel color phosphor stripes for emitting light in red, green, and blue to illustrate various features of the laser-based displays.

Phosphor materials are one type of light-emitting materials. Various described systems, devices and features in the examples that use phosphors as the fluorescent materials are applicable to displays with screens made of other optically excitable, light-emitting, non-phosphor fluorescent materials. For example, quantum dot materials emit light under proper optical excitation and thus can be used as the fluorescent materials for systems and devices in this application. More specifically, semiconductor compounds such as, among others, CdSe and PbS, can be fabricated in form of particles with a diameter on the order of the exciton Bohr radius of the compounds as quantum dot materials to emit light. To produce light of different colors, different quantum dot materials with different energy band gap structures may be used to emit different colors under the same excitation light. Some quantum dots are between 2 and 10 nanometers in size and include approximately tens of atoms such between 10 to 50 atoms. Quantum dots may be dispersed and mixed in various materials to form liquid solutions, powders, jelly-like matrix materials and solids (e.g., solid solutions). Quantum dot films or film stripes may be formed on a substrate as a screen for a system or device in this application. In one implementation, for example, three different quantum dot materials can be designed and engineered to be optically excited by the scanning laser beam as the optical pump to produce light in red, green, and blue colors suitable for forming color images. Such quantum dots may be formed on the screen as pixel dots arranged in parallel lines (e.g., repetitive sequential red pixel dot line, green pixel dot line and blue pixel dot line).

Examples of scanning beam display systems described here use at least one scanning laser beam to excite color light-emitting materials deposited on a screen to produce color images. The scanning laser beam is modulated to carry images in red, green and blue colors or in other visible colors and is controlled in such a way that the laser beam excites the color light-emitting materials in red, green and blue colors with images in red, green and blue colors, respectively. Hence, the scanning laser beam carries the images but does not directly produce the visible light seen by a viewer. Instead, the color light-emitting fluorescent materials on the screen absorb the energy of the scanning laser beam and emit visible light in red, green and blue or other colors to generate actual color images seen by the viewer.

Laser excitation of the fluorescent materials using one or more laser beams with energy sufficient to cause the fluorescent materials to emit light or to luminesce is one of various forms of optical excitation. In other implementations, the optical excitation may be generated by a non-laser light source that is sufficiently energetic to excite the fluorescent materials used in the screen. Examples of non-laser excitation light sources include various light-emitting diodes (LEDs), light lamps and other light sources that produce light at a wavelength or a spectral band to excite a fluorescent material that converts the light of a higher energy into light of lower energy in the visible range. The excitation optical beam that excites a fluorescent material on the screen can be at a frequency or in a spectral range that is higher in frequency than the frequency of the emitted visible light by the fluorescent material. Accordingly, the excitation optical beam may be in the violet spectral range and the ultra violet (UV) spectral range, e.g., wavelengths under 420 nm. In the examples described below, UV light or a UV laser beam is used as an example of the excitation light for a phosphor material or other fluorescent material and may be light at other wavelength.

FIG. 1 illustrates an example of a laser-based display system using a screen having color phosphor stripes. Alternatively, color phosphor dots may also be used to define the image pixels on the screen. The system includes a laser module 110 to produce and project at least one scanning laser beam 120 onto a screen 101. The screen 101 has parallel color phosphor stripes in the vertical direction and two adjacent phosphor stripes are made of different phosphor materials that emit light in different colors. In the illustrated example, red phosphor absorbs the laser light to emit light in red, green phosphor absorbs the laser light to emit light in green and blue phosphor absorbs the laser light to emit light in blue. Adjacent three color phosphor stripes are in three different colors. One particular spatial color sequence of the stripes is shown in FIG. 1 as red, green and blue. Other color sequences may also be used. The laser beam 120 is at the wavelength within the optical absorption bandwidth of the color phosphors and is usually at a wavelength shorter than the visible blue and the green and red colors for the color images. As an example, the color phosphors may be phosphors that absorb UV light in the spectral range from about 380 nm to about 420 nm to produce desired red, green and blue light. The laser module 110 can include one or more lasers such as UV diode lasers to produce the beam 120, a beam scanning mechanism to scan the beam 120 horizontally and vertically to render one image frame at a time on the screen 101, and a signal modulation mechanism to modulate the beam 120 to carry the information for image channels for red, green and blue colors. Such display systems may be configured as rear projection systems where the viewer and the laser module 110 are on the opposite sides of the screen 101. Alternatively, such display systems may be configured as front projection systems where the viewer and laser module 110 are on the same side of the screen 101.

Figure 2A:
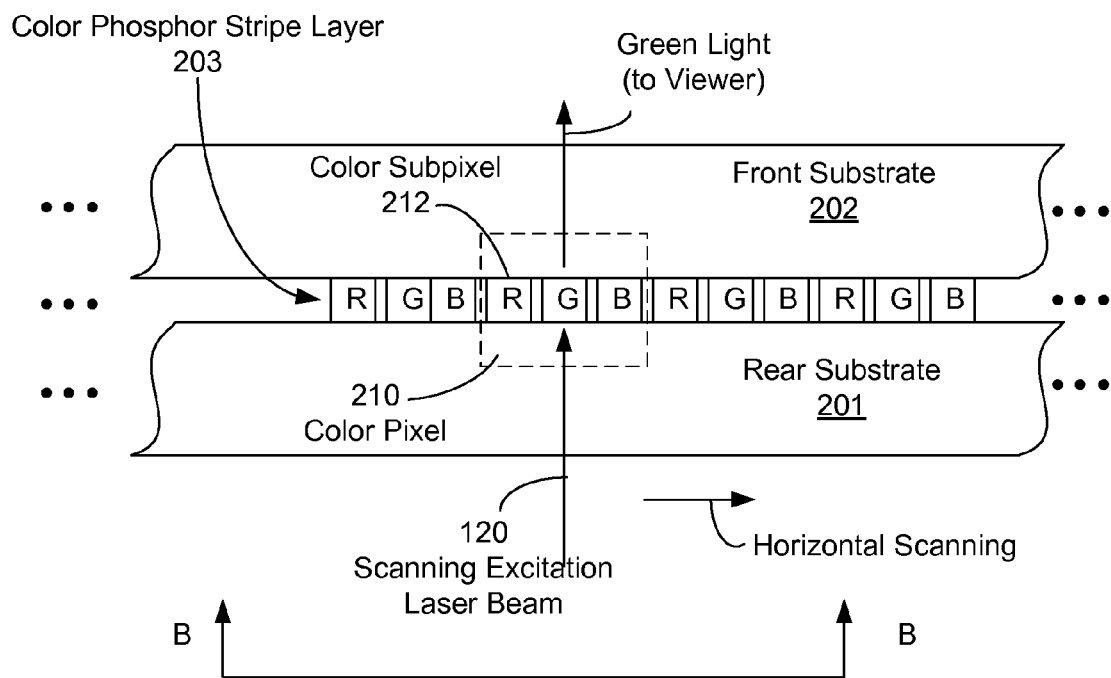
FIGS. 2A and 2B show one example screen structure and the structure of color pixels on the screen in FIG. 1.

FIG. 2A shows an exemplary design of the screen 101 in FIG. 1. The screen 101 may include a rear substrate 201 which is transparent to the scanning laser beam 120 and faces the laser module 110 to receive the scanning laser beam 120. A second front substrate 202, is fixed relative to the rear substrate 201 and faces the viewer in a rear projection configuration. A color phosphor stripe layer 203 is placed between the substrates 201 and 202 and includes phosphor stripes. The color phosphor stripes for emitting red, green and blue colors are represented by "R", "G" and "B," respectively. The front substrate 202 is transparent to the red, green and blue colors emitted by the phosphor stripes. The substrates 201 and 202 may be made of various materials, including glass or plastic panels. Each color pixel includes portions of three adjacent color phosphor stripes in the horizontal direction and its vertical dimension is defined by the beam spread of the laser beam 120 in the vertical direction. As such, each color pixel includes three subpixels of three different colors (e.g., the red, green and blue). The laser module 110 scans the laser beam 120 one horizontal line at a time, e.g., from left to right and from top to bottom to fill the screen 101. The laser module 110 is fixed in position relative to the screen 101 so that the scanning of the beam 120 can be controlled in a predetermined manner to ensure proper alignment between the laser beam 120 and each pixel position on the screen 101.

Figure 2B:
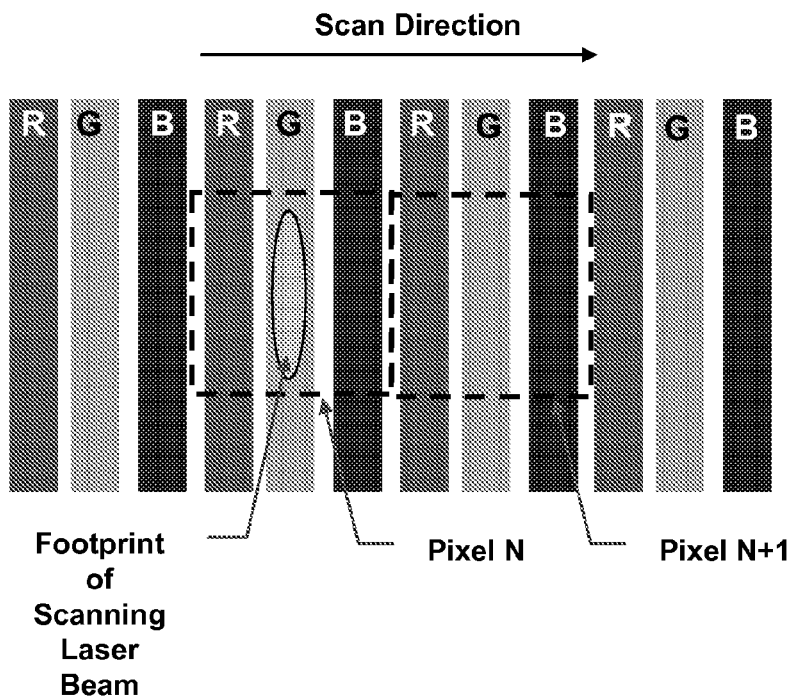

In FIG. 2A, the scanning laser beam 120 is directed at the green phosphor stripe within a pixel to produce green light for that pixel. FIG. 2B further shows the operation of the screen 101 in a view along the direction B-B perpendicular to the surface of the screen 101. Since each color stripe is longitudinal in shape, the cross section of the beam 120 may be shaped to be elongated along the direction of the stripe to maximize the fill factor of the beam within each color stripe for a pixel. This may be achieved by using a beam shaping optical element in the laser module 110. A laser source that is used to produce a scanning laser beam that excites a phosphor material on the screen may be a single mode laser or a multimode laser. The laser may also be a single mode along the direction perpendicular to the elongated direction phosphor stripes to have a small beam spread that is confined by the width of each phosphor stripe. Along the elongated direction of the phosphor stripes, this laser beam may have multiple modes to spread over a larger area than the beam spread in the direction across the phosphor stripe. This use of a laser beam with a single mode in one direction to have a small beam footprint on the screen and multiple modes in the perpendicular direction to have a larger footprint on the screen allows the beam to be shaped to fit the elongated color subpixel on the screen and to provide sufficient laser power in the beam via the multimodes to ensure sufficient brightness of the screen.

Referring now to FIG. 3A, an example implementation of the laser module 110 in FIG. 1 is illustrated. A laser array 310 with multiple lasers is used to generate multiple laser beams 312 to simultaneously scan the screen 101 for enhanced display brightness. A signal modulation controller 320 is provided to control and modulate the lasers in the laser array 310 so that the laser beams 312 are modulated to carry the image to be displayed on the screen 101. The signal modulation controller 320 can include a digital image processor that generates digital image signals for the three different color channels and laser driver circuits that produce laser control signals carrying the digital image signals. The laser control signals are then applied to modulate the lasers, e.g., the currents for laser diodes, in the laser array 310.

The beam scanning can be achieved by using a scanning mirror 340 such as a galvo mirror for the vertical scanning and a multi-facet polygon scanner 350 for the horizontal scanning. A scan lens 360 can be used to project the scanning beams form the polygon scanner 350 onto the screen 101. The scan lens 360 is designed to image each laser in the laser array 310 onto the screen 101. Each of the different reflective facets of the polygon scanner 350 simultaneously scans N horizontal lines where N is the number of lasers. In the illustrated example, the laser beams are first directed to the galvo mirror 340 and then from the galvo mirror 340 to the polygon scanner 350. The output scanning beams 120 are then projected onto the screen 101. A relay optics module 330 is placed in the optical path of the laser beams 312 to modify the spatial property of the laser beams 312 and to produce a closely packed bundle of beams 332 for scanning by the galvo mirror 340 and the polygon scanner 350 as the scanning beams 120 projected onto the screen 101 to excite the phosphors and to generate the images by colored light emitted by the phosphors.

The laser beams 120 are scanned spatially across the screen 101 to hit different color pixels at different times. Accordingly, each of the modulated beams 120 carries the image signals for the red, green and blue colors for each pixel at different times and for different pixels at different times. Hence, the beams 120 are coded with image information for different pixels at different times by the signal modulation controller 320. The beam scanning thus maps the time-domain coded image signals in the beams 120 onto the spatial pixels on the screen 101. For example, the modulated laser beams 120 can have each color pixel time equally divided into three sequential time slots for the three color subpixels for the three different color channels. The modulation of the beams 120 may use pulse modulation techniques to produce desired grey scales in each color, a proper color combination in each pixel, and desired image brightness.

In one implementation, the multiple beams 120 are directed onto the screen 101 at different and adjacent vertical positions with two adjacent beams being spaced from each other on the screen 101 by one horizontal line of the screen 101 along the vertical direction. For a given position of the galvo mirror 340 and a given position of the polygon scanner 350, the beams 120 may not be aligned with each other along the vertical direction on the screen 101 and may be at different positions on the screen 101 along the horizontal direction. The beams 120 can only cover one portion of the screen 101. At a fixed angular position of the galvo mirror 340, the spinning of the polygon scanner 350 causes the beams 120 from N lasers in the laser array 310 to scan one screen segment of N adjacent horizontal lines on the screen 101. At end of each horizontal scan over one screen segment, the galvo mirror 340 is adjusted to a different fixed angular position so that the vertical positions of all N beams 120 are adjusted to scan the next adjacent screen segment of N horizontal lines. This process iterates until the entire screen 101 is scanned to produce a full screen display.

In the above example of a scanning beam display system shown in FIG. 3A, the scan lens 360 is located downstream from the beam scanning devices 340 and 350 and focuses the one or more scanning excitation beams 120 onto the screen 101. This optical configuration is referred to as a "pre-objective" scanning system. In such a pre-objective design, a scanning beam directed into the scan lens 360 is scanned along two orthogonal directions. Therefore, the scan lens 360 is designed to focus the scanning beam onto the screen 101 along two orthogonal directions. In order to achieve the proper focusing in both orthogonal directions, the scan lens 360 can be complex and, often, are made of multiples lens elements. In one implementation, for example, the scan lens 360 can be a two-dimensional f-theta lens that is designed to have a linear relation between the location of the focal spot on the screen and the input scan angle (theta) when the input beam is scanned around each of two orthogonal axes perpendicular to the optic axis of the scan lens. In such a f-theta lens, the location of the focal spot on the screen is a proportional to the input scan angle (theta).

The two-dimensional scan lens 360 such as a f-theta lens in the pre-objective configuration can exhibit optical distortions along the two orthogonal scanning directions which cause beam positions on the screen 101 to trace a curved line. Hence, an intended straight horizontal scanning line on the screen 101 becomes a curved line. The distortions caused by the 2-dimensional scan lens 360 can be visible on the screen 101 and thus degrade the displayed image quality. One way to mitigate the bow distortion problem is to design the scan lens 360 with a complex lens configuration with multiple lens elements to reduce the bow distortions. The complex multiple lens elements can cause the final lens assembly to depart from desired f-theta conditions and thus can compromise the optical scanning performance. The number of lens elements in the assembly usually increases as the tolerance for the distortions decreases. However, such a scan lens with complex multiple lens elements can be expensive to fabricate.

To avoid the above distortion issues associated with a two-dimensional scan lens in a pre-objective scanning beam system, the following sections describe examples of a post-objective scanning beam display system, which can be implemented to replace the two-dimensional scan lens 360 with a simpler, less expensive 1-dimensional scan lens. U.S. patent application Ser. No. 11/742,014 entitled "POST-OBJECTIVE SCANNING BEAM SYSTEMS" and filed on Apr. 30, 2007 (U.S. Pat. Publication No. 2008/0247020) describes examples of post-objective scanning beam systems suitable for use with phosphor screens described in this application and is incorporated by reference as part of the specification of this application. The screen designs described in this application can be used in both post-objective and pre-objective scanning beam display systems.

Figure 3B:
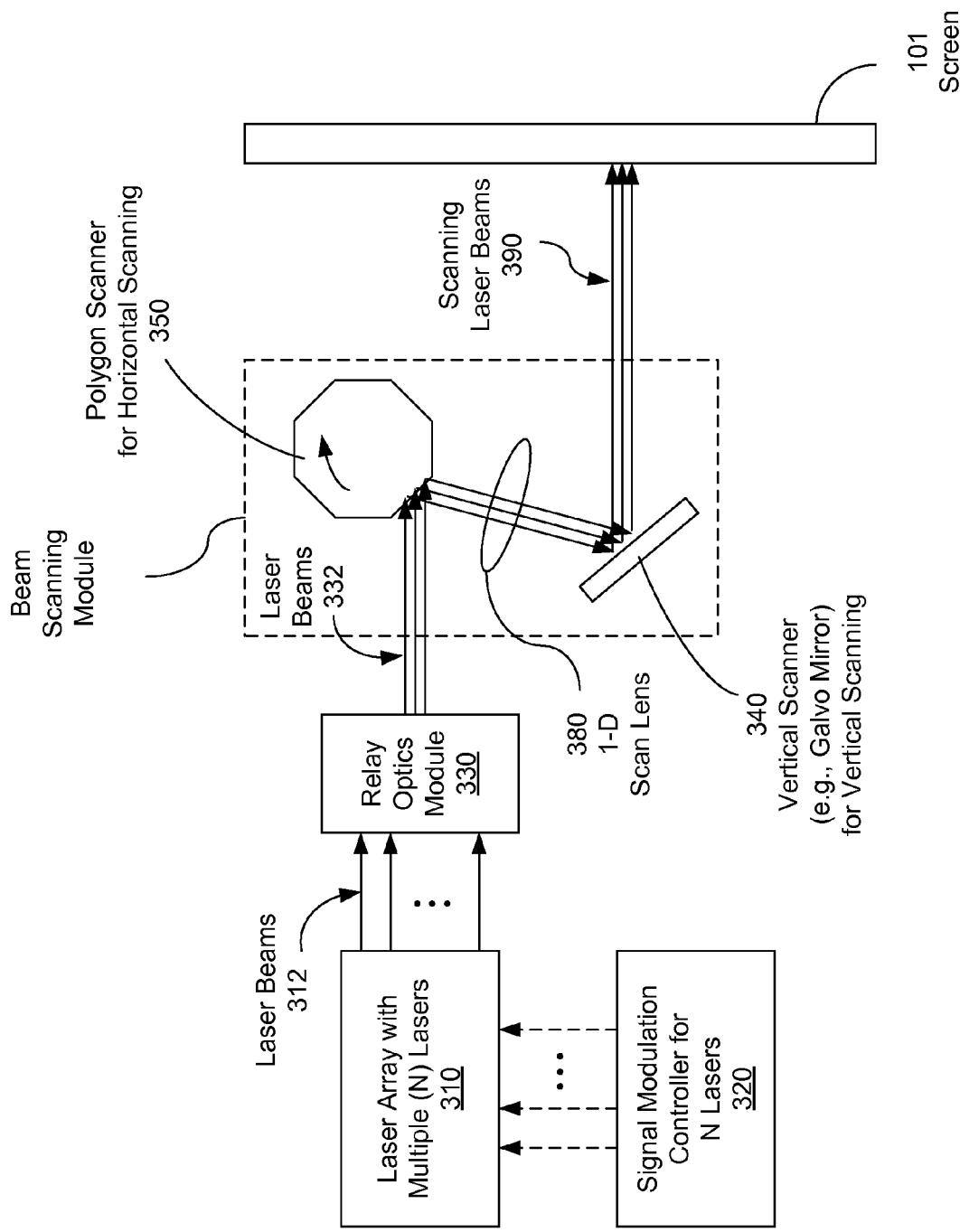
FIGS. 3B and 3C show two examples of a post-objective scanning beam display system.

FIG. 3B shows an example implementation of a post-objective scanning beam display system based on the system design in FIG. 1. A laser array 310 with multiple lasers is used to generate multiple laser beams 312 to simultaneously scan a screen 101 for enhanced display brightness. A signal modulation controller 320 is provided to control and modulate the lasers in the laser array 310 so that the laser beams 312 are modulated to carry the image to be displayed on the screen 101. The beam scanning is based on a two-scanner design with a horizontal scanner such as a polygon scanner 350 and a vertical scanner such as a galvanometer scanner 340. Each of the different reflective facets of the polygon scanner 350 simultaneously scans N horizontal lines where N is the number of lasers. A relay optics module 330 reduces the spacing of laser beams 312 to form a compact set of laser beams 332 that spread within the facet dimension of the polygon scanner 350 for the horizontal scanning. Downstream from the polygon scanner 350, there is a 1-D horizontal scan lens 380 followed by a vertical scanner 340 (e.g., a galvo mirror) that receives each horizontally scanned beam 332 from the polygon scanner 350 through the 1-D scan lens 380 and provides the vertical scan on each horizontally scanned beam 332 at the end of each horizontal scan prior to the next horizontal scan by the next facet of the polygon scanner 350. The vertical scanner 340 directs the 2-D scanning beams 390 to the screen 101.

Under this optical design of the horizontal and vertical scanning, the 1-D scan lens 380 is placed downstream from the polygon scanner 140 and upstream from the vertical scanner 340 to focus each horizontal scanned beam on the screen 101 and minimizes the horizontal bow distortion to displayed images on the screen 101 within an acceptable range, thus producing a visually "straight" horizontal scan line on the screen 101. Such a 1-D scan lens 380 capable of producing a straight horizontal scan line is relatively simpler and less expensive than a 2-D scan lens of similar performance. Downstream from the scan lens 380, the vertical scanner 340 is a flat reflector and simply reflects the beam to the screen 101 and scans vertically to place each horizontally scanned beam at different vertical positions on the screen 101 for scanning different horizontal lines. The dimension of the reflector on the vertical scanner 340 along the horizontal direction is sufficiently large to cover the spatial extent of each scanning beam coming from the polygon scanner 350 and the scan lens 380. The system in FIG. 3B is a post-objective design because the 1-D scan lens 380 is upstream from the vertical scanner 340. In this particular example, there is no lens or other focusing element downstream from the vertical scanner 340.

Notably, in the post-objective system in FIG. 3B, the distance from the scan lens to a location on the screen 101 for a particular beam varies with the vertical scanning position of the vertical scanner 340. Therefore, when the 1-D scan lens 380 is designed to have a fixed focal distance along the straight horizontal line across the center of the elongated 1-D scan lens, the focal properties of each beam must change with the vertical scanning position of the vertical scanner 380 to maintain consistent beam focusing on the screen 101. In this regard, a dynamic focusing mechanism can be implemented to adjust convergence of the beam going into the 1-D scan lens 380 based on the vertical scanning position of the vertical scanner 340.

For example, in the optical path of the one or more laser beams from the lasers to the polygon scanner 350, a stationary lens and a dynamic refocus lens can be used as the dynamic focusing mechanism. Each beam is focused by the dynamic focus lens at a location upstream from the stationary lens. When the focal point of the lens coincides with the focal point of the lens, the output light from the lens is collimated. Depending on the direction and amount of the deviation between the focal points of the lenses, the output light from the collimator lens toward the polygon scanner 350 can be either divergent or convergent. Hence, as the relative positions of the two lenses along their optic axis are adjusted, the focus of the scanned light on the screen 101 can be adjusted. A refocusing lens actuator can be used to adjust the relative position between the lenses in response to a control signal. In this particular example, the refocusing lens actuator is used to adjust the convergence of the beam directed into the 1-D scan lens 380 along the optical path from the polygon scanner 350 in synchronization with the vertical scanning of the vertical scanner 340. The vertical scanner 340 in FIG. 3B scans at a much smaller rate than the scan rate of the first horizontal scanner 350 and thus a focusing variation caused by the vertical scanning on the screen 101 varies with time at the slower vertical scanning rate. This allows a focusing adjustment mechanism to be implemented in the system of FIG. 1 with the lower limit of a response speed at the slower vertical scanning rate rather than the high horizontal scanning rate.

The above example of post-object scanning beam system in FIG. 3B uses a polygon scanner 350 for horizontal scanning as the first beam scanner placed upstream from the scan lens 380 and a vertical scanner 340 such as a galvo mirror as the second beam scanner for vertical scanning downstream from the scan lens 380. In other implementations, the first beam scanner located upstream from the scan lens 380 is a vertical scanner for vertical scanning, such as a galvo mirror, and the second scanner downstream from the scan lens 380 is a polygon scanner for horizontal scanning. This configuration can be designed to use a small galvo reflector and thus avoid a large downstream galvo reflector with a dimension along the horizontal scanning direction of the upstream polygon needed for the post-objective system in FIG. 3B. A large galvo reflector can require more power to operate than a small galvo reflector and its dynamic range may be limited due to the larger mass in comparison with a small galvo reflector. In this system, the distortion pattern is rotated relative to the other one and is preferable for RGB vertical lines because strong distortion in the vertical direction makes the spot rotate which means effectively a wider spot.

Figure 3C:
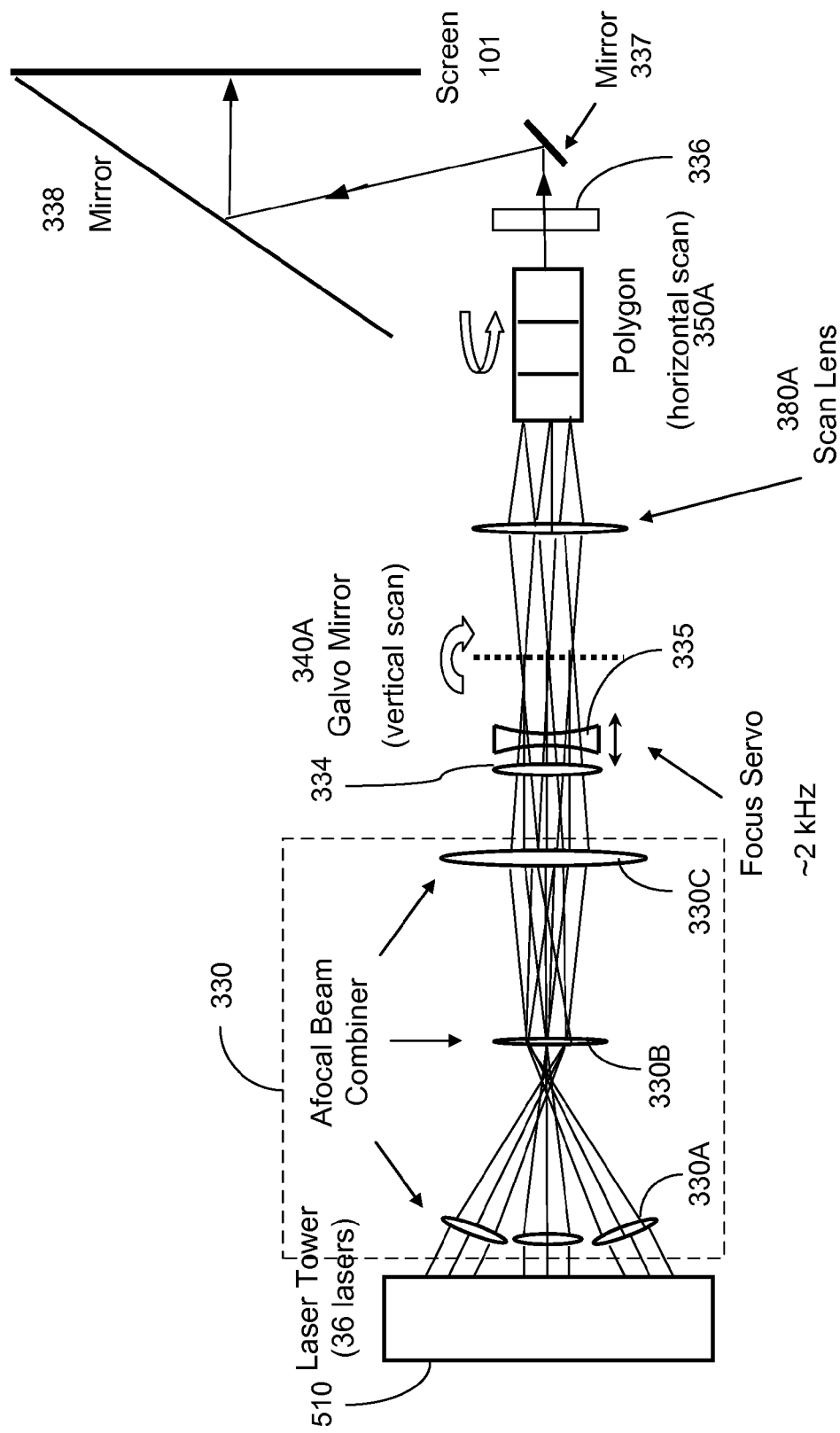

FIG. 3C show an example of a laser scanning display system based on multiple lasers in a laser array 310 in a post-objective configuration where the order of the two scanning devices in FIG. 3B is reversed. This scanning beam display system includes lasers forming a laser array 310 to produce multiple laser beams, respectively, a beam scanning module with two scanners 340A and 350A placed two sides of a scan lens 380A in an optical path of the laser beams to scan the laser beams in two orthogonal directions onto the screen 101; and an afocal optical relay module 330 placed between the lasers 310 and the scanning module to include lenses 330A, 330B and 330C to reduce a spacing between two adjacent laser beams and to overlap the laser beams at the scanning module. In one implementation of the design in FIG. 3C, the scan lens 380 can be designed to image the reflective surface of the vertical scanner 340A onto the reflecting facet of the polygon 350A so that a relatively small polygon facet of a compact polygon can be used to reduce power consumption and the dynamic range of the polygon. Mirrors 337 and 338 are placed in the optical path between the polygon scanner 350A and screen 101 to fold the optical path with a small optical depth.

In one implementation, the afocal optical relay module 330 can include a first lens having a first focal length to receive and focus the laser beams from the lasers; a second lens having a second focal length shorter than the first focal length and spaced from the first lens by the first focal length to focus the laser beams from the first lens; and a third lens having a third focal length longer than the second focal length and spaced from the second lens by the third focal length to focus and direct the laser beams from the second lens to the scanning module. Examples for the afocal optical relay module 330 are described in PCT application No. CT/US2006/041584 entitled "Optical Designs for Scanning Beam Display Systems Using Fluorescent Screens" and filed on Oct. 25, 2006 (PCT publication no. WO 2007/050662) and U.S. patent application Ser. No. 11/510,495 entitled "Optical Designs for Scanning Beam Display Systems Using Fluorescent Screens" and filed on Aug. 24, 2006 (U.S. publication no. US 2007-0206258 A1), which are incorporated by reference as part of the specification of this application.

In FIG. 3C, the laser beams are controlled to overlap in a single plane (i.e., the pupil plane). A single-axis scanning scanner upstream from the scan lens 380A, e.g., a galvo mirror, is located in the pupil plane and is used to scan all beams along one axis, which is the vertical direction in this example. The scan lens 380A can be a multi-function scan lens which is designed to have a sufficiently large field-of-view to accept the full angular range of the scanned beams from the upstream vertical scanner 150 (e.g., the galvo mirror). The scan lens 380A is a converging lens which brings the beams to focus at the screen 101. The scan lens 380A is also used to image the galvo mirror 340A onto the polygon reflecting facet on the downstream polygon scanner 350A. This imaging function allows the polygon 350A to be relatively small. Without imaging, the polygon 350A would be relatively large because the scanned beams naturally spread with increasing distance from the galvo mirror 340A. The scan lens 380A in FIG. 3C can be a single-element lens or can include multiple lens elements in order to perform its functions, e.g., focusing and re-imaging over the scanning range of the galvo mirror 340A.

Downstream from the scan lens 380A, the polygon scanner 350A scans the converging beams from the scan lens 380A onto the screen 101. The foci of the converging beams can, in general, lie on a curved surface. A focus servo is used to refocus the beams dynamically on to a planar surface of the screen 101. In this example, the focus servo includes at least two lens elements 334 and 335 that are separated by an air gap as shown. One of the two lenses (e.g., lens 334) has a positive focal length and the other (e.g., lens 335) has a negative focal length. An actuator is provided to control the relative spacing between the two lenses 334 and 335. The beams entering and exiting the focus servo are nominally collimated when the lenses comprising the focus servo are separated by a prescribed distance (i.e., the neutral or nominal position). In the example shown in FIG. 3C, one lens of the focus servo is stationary and the other is moved axially to allow dynamic refocusing of the beams. The movable lens (e.g., lens 335) is moved about its nominal position by a distance sufficient to bring the beams to focus on the screen 101. In the post-objective system, the output 2-D scanning beam can have optical distortions such as "bow" distortions in the horizontal direction. A distortion correcting optical module 336 with multiple lens elements can be provided in the optical path between the polygon scanner 350A and the screen 101 to reduce the optical distortions.

The stripe design in FIG. 2B for the fluorescent screen 101 in FIGS. 1, 3A, 3B and 3C can be implemented in various configurations. FIG. 2A shows one example which places the fluorescent layer 203 such as a color phosphor stripe layer between two substrates 201 and 202. In a rear projection system, it is desirable that the screen 101 couple as much light as possible in the incident scanning excitation beam 120 into the fluorescent layer with while maximizing the amount of the emitted light from the fluorescent layer that is directed towards the viewer side. A number of screen mechanisms can be implemented, either individually or in combination, in the screen 101 to enhance the screen performance, including efficient collection of the excitation light, maximization of fluorescent light directed towards the viewer side, enhancement of the screen contrast and reduction of the screen glare. The structure and materials of the screen 101 can be designed and selected to meet constraints on cost and other requirements for specific applications.

FIG. 4 illustrates an example screen 101 having a fluorescent stripe layer with fluorescent stripes for emitting red, green and blue colors under optical excitation of the scanning excitation light. A number of screen features are illustrated as examples and can be selectively implemented in specific screens. Hence, a particular fluorescent screen having only some of the features illustrated in FIG. 4 may be sufficient for a particular display application.

The fluorescent screen 101 in FIG. 4 includes at least one substrate layer 424 to provide a rigid structural support for various screen components including a fluorescent layer 400. This substrate layer 424 can be a thin substrate or a rigid sheet. When placed on the viewer side of the fluorescent layer 400 as illustrated in FIG. 4, the substrate layer 424 can be made of a material transparent or partially transparent to the visible colored light emitted by the fluorescent stripes 401, 402, 403. A partial transparent material can have a uniform attenuation to the visible light including the three colors emitted by the fluorescent stripes to operate like an optical neutral density filter. The substrate layer 424 can be made of a plastic material, a glass material, or other suitable dielectric material. For example, the substrate layer 424 may be made of an acrylic rigid sheet. The thickness of the substrate layer 424 may be a few millimeters in some designs. In addition, the substrate layer 424 may be made opaque and reflective to the excitation light of the excitation beam 120 to block the excitation light from reaching the viewer and to recycle the unabsorbed excitation light back to the fluorescent layer 400.

The substrate layer 424 can also be located on the other side of the fluorescent layer 400. Because the excitation beam 120 must transmit through the substrate layer 424 to enter the fluorescent layer 400, the material for the substrate layer 424 should be transparent to the excitation light of the excitation beam 120. In addition, the substrate layer 424 in this configuration may also be reflective to the visible light emitted by the fluorescent layer 400 to direct any emitted visible light coming from the fluorescent layer 400 towards the viewer side to improve the brightness of the displayed images.

The fluorescent layer 400 includes parallel fluorescent stripes with repetitive color patterns such as red, green and blue phosphor stripes. The fluorescent stripes are perpendicular to the horizontal scan direction of the scanning excitation beam 120 shown in FIG. 1. As illustrated in FIG. 4 and in FIG. 2B, each display pixel on the screen includes three subpixels which are portions of adjacent red, green and blue stripes 401, 402 and 402. The dimension of each subpixel along the horizontal direction is defined by the width of each stripe and the dimension along the vertical direction is defined by the beam width along the vertical direction. A stripe divider 404, which can be optically reflective and opaque, or optically absorbent, may be formed between any two adjacent fluorescent stripes to minimize or reduce the cross talk between two adjacent subpixels. As a result, the smearing at a boundary between two adjacent subpixels within one color pixel and between two adjacent color pixels can be reduced, and the resolution and contrast of the screen can be improved. The sidewalls of each stripe divider 404 can be made optically reflective to improve the brightness of each subpixel and the efficiency of the screen. In addition, the facets of the stripe dividers 404 facing the viewer side may be blackened, e.g., by being coated with a blackened absorptive layer, to reduce reflection or glare to the viewer side.

The above basic structure of the substrate layer 424 and the fluorescent layer 400 can be used as a building block to add one or more screen elements to enhance various properties and the performance of the screen. The fluorescent layer 400 is an optically active layer in the context that the excitation light at the excitation wavelength is absorbed by the fluorescent materials and is converted into visible fluorescent light of different colors for displaying the images to the viewer. In this regard, the fluorescent layer 400 is also the division between the "excitation side" and the "viewer side" of the screen where the optical properties of the two sides are designed very differently in order to achieve desired optical effects in each of two sides to enhance the screen performance. Examples of such optical effects include, enhancing coupling of the excitation beam 120 into the fluorescent layer, recycling reflected and scattered excitation light that is not absorbed by the fluorescent layer 400 back into the fluorescent layer 400, maximizing the amount of the emitted visible light from the fluorescent layer 400 towards the viewer side of the screen, reducing screen glare to the viewer caused by reflection of the ambient light, blocking the excitation light from existing the screen towards the viewer, and enhancing the contrast of the screen. Various screen elements can be configured to achieve one or more of these optical effects. Several examples of such screen elements are illustrated in FIG. 4.

Referring to FIG. 4, at the entry side of the screen facing the excitation beam 120, an entrance layer 411 can be provided to couple the excitation beam 120 into the screen 101. For example, a Fresnel lens layer can be used as this entrance layer 411 to control the incidence direction of the scanning excitation beam 120. For another example, a lens array layer having an array of lens elements and a matching pinhole array with multiple lenses in each subpixel or within a width of a fluorescent stripe may be implemented in this entrance layer 411. For yet another example, a prismatic layer or a high-index dielectric layer can also be used as part of the entrance layer 411 to recycle light back into the screen including the excitation light and the emitted visible light by the fluorescent layer. To improve the brightness of the screen to the viewer, a first dichroic layer 412 (D1) may be placed in the path of the excitation beam 120 upstream from the fluorescent layer 400 (e.g., on the excitation side of the fluorescent layer 400) to transmit light at the wavelength of the excitation beam 120 and to reflect visible light emitted by the fluorescent layer 400. The first dichroic layer 412 can reduce the optical loss of the fluorescent light and thus enhances the screen brightness. On the viewer side of the fluorescent layer 400, a second dichroic layer 421 (D2) may be provided to transmit the visible light emitted by the fluorescent layer 400 and to reflect light at the wavelength of the excitation beam 120. Hence, the second dichroic layer 421 can recycle the excitation light that passes through the fluorescent layer 400 back to the fluorescent layer 400 and thus increases the utilization efficiency of the excitation light and the screen brightness.

On the viewer side of the fluorescent layer 400, a contrast enhancement layer 422 can be included to improve the screen contrast. The contrast enhancement layer 422 can include color-selective absorbing stripes that spatially correspond to and align with fluorescent stripes in the fluorescent layer 400 along the direction perpendicular to the screen layers. The color-selective absorbing stripes therefore transmit light in respective colors of the fluorescent stripes and absorb light in colors of other fluorescent stripes, respectively. Alternatively, the contrast enhancement layer 422 can be an optical neutral density filter layer that uniformly attenuates the visible light to reduce the glare of the screen due to the reflection of the ambient light. This neutral density filtering function may also be implemented in one or more other layers on the viewer side of the fluorescent layer 400, including the substrate layer 424.

In addition, the screen can include a screen gain layer 423 on the viewer side of the fluorescent layer 400 to optically enhance the brightness and viewing angle of the screen. The gain layer 423 may include a lenticular layer with lens elements, a diffractive optic layer of diffractive elements, a holographic layer with holographic elements, or a combination of these and other structures. The spatial sequence of the layers 423, 422 and 421 on the viewer side of the fluorescent layer 400 may be different from what is shown in FIG. 4.

Furthermore, an excitation blocking layer 425 can be placed on the viewer side of the fluorescent layer 400 to block any excitation light from exiting the screen to the viewer side. This layer can be implemented by a material that transmits the visible light and absorbs the excitation light. For example, a polyester based color filter can be used as this layer to block the excitation light which may be radiation from 400-415 nm. In some implementations, this blocking filter may have transmission below 410 nm less than 0.01%, while having greater than 50% transmission above 430 nm. The neutral density filtering function can also be incorporated in this layer, e.g., having a uniform attenuation to the visible light between 430 nm and 670 nm. This blocking function can be incorporated into the substrate layer 424.

In FIG. 4, the dichroic layer D2 (421) which blocks the excitation light (e.g., UV) and transmits the visible light and the optical neutral density (ND) filter 422 may be formed on the viewer side of the light-emitting layer. Because the support substrate 424 is positioned on the viewer side, the support substrate 424 can be made of a material transparent or partially transparent to the visible colored light emitted by the light-emitting layer. A partial transparent material having a uniform attenuation to the visible light including the three colors emitted by the light-emitting stripes can be used in the support substrate 424 to operate like an optical neutral density (ND) filter. In addition, the support substrate 424 may be made reflective and opaque to the excitation light of the excitation beam 120 to block the excitation light from reaching the viewer and to recycle the unabsorbed excitation light back to the light-emitting layer.

Figure 5:
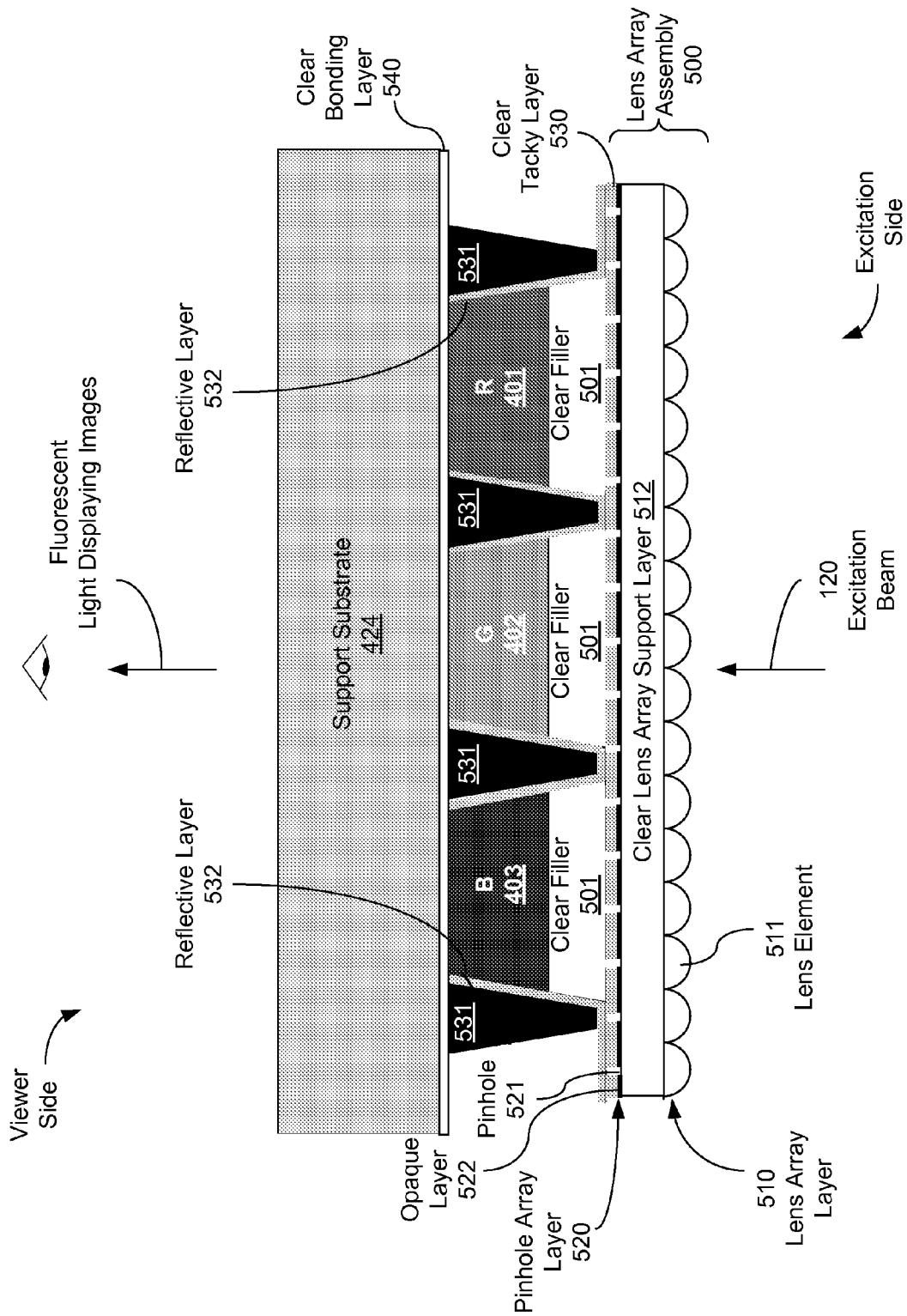
FIG. 5 shows an example of a multilayered screen with parallel light-emitting stripes coupled to a lens array layer.

FIG. 5 shows an example of a multilayered screen with parallel light-emitting stripes coupled to a lens array layer 510. A support substrate 424 is provided on the viewer side of the screen to support various screen layers and can be made of plastic and other materials. The light-emitting layer is engaged to the substrate 424 via a clear bonding layer 540 and includes parallel and separated light-emitting stripes such as the stripes 401, 402 and 403 in FIG. 4. Each stripe absorbs excitation light 120 to emit visible light at a visible wavelength different from the excitation wavelength. In this example, each light-emitting stripe includes a stripe of a light-emitting material 401, 402 or 403 that absorbs the excitation light to emit visible light and a stripe of a transparent material 501 such as a clear filler located between the stripe of the light-emitting material and the pinhole array layer 520. Parallel stripe dividers are interleaved with the light-emitting stripes with each stripe divider located between two adjacent light-emitting stripes. Each stripe divider is optically reflective and opaque to optically isolate two adjacent light-emitting stripes for enhanced color purity and image contrast. In this example, each stripe divider includes an optically opaque core 531 such as a black optically absorbent material and an optically reflective layer 532 formed on two sides of the optically opaque core 531 which interface with the two adjacent light-emitting stripes, respectively.

The lens array layer 510 is formed on a clear lens array support layer 512 to form two dimensional array of lenses 511 and is located on the excitation side of the light-emitting layer to direct the excitation light 120 to the light-emitting layer. Each lens 511 has a dimension less than a width of each light-emitting stripe and there are multiple lenses within the width of each light-emitting stripe, e.g., four lenses 511 per stripe.

The screen in FIG. 5 include a pinhole array layer 520 in a combination with the lens array layer. The pinhole array layer 520 is formed between the lens array layer 510 and the light-emitting layer to include a reflective and opaque layer 522 that overlays the lens array layer 510 and is patterned with a two-dimensional array of pinholes 521 that align with the lenses 511, respectively, so that the excitation light 120 that is focused by each lens 511 to the respective pinhole 521 for that lens 511 can pass through the reflective and opaque layer 522 to reach the light-emitting layer while the excitation light in other directions that misses a pinhole 521 is blocked and reflected by the reflective and opaque layer 522. Each stripe can cover multiple lenses 511, e.g., micro lenses with a diameter in a range of about tens of microns (e.g., 20 microns) and the excitation light 120 received by each stripe or subpixel is transformed into multiple convergent mini excitation beams by the lenses 511. The focusing of each lens 511 directs most of the optical power through a respective pinhole 521 to increase the throughput of the excitation light 120 to the light-emitting layer. The lens array layer 510 can be designed to have a fill factor of 100% or nearly 100% to generate a high efficiency in coupling light through the reflective and opaque layer 522. This design ensures that the excitation light 120 that is received by the lens array layer 510 is transmitted through the pinhole array layer 520 to reach the light-emitting layer. In this regard, this combination of the lens array layer 510 and the pinhole array layer 520 provides functions of an entrance layer 411 in FIG. 4.

In addition, the pinhole array layer 520 uses the reflective and opaque layer 522 as a blocker for light directed from the light-emitting layer to the pinhole array layer 520 because, in absence of a lens between the light-emitting layer and the pinhole array layer 520, such light towards the pinhole array layer 520 is diffused in all directions. In particular, the visible light emitted by the light-emitting layer is in all directions. The clear filler stripe 501 is placed between the light-emitting material 401, 402 or 403 and the pinhole array layer 520 to create a propagation space for the visible light emitted by the light-emitting material to allow sufficient divergence of the emitted visible light that travels towards the pinhole array layer 520 before reaching any pinhole 511. For example, the clear filler stripe 501 can have a thickness of tens of microns to create sufficient divergence in the emitted visible light. The minimum thickness of the clear stripe 501 may be set at one half of the focal length of each lens 511. As a result, only a small fraction of such light can pass through the pinholes 521 in the pinhole array layer 520 and the majority of the visible light and the unabsorbed excitation light is reflected by the reflective and opaque layer 522 back towards the light-emitting layer. Such reflected light is "recycled" to improve the brightness and optical efficiency of the screen. In this regard, this combination of the lens array layer 510 and the pinhole array layer 520 also operates like the dichroic layer D1 (411) in FIG. 4.

The combination of the lens array layer 510 and the pinhole array layer 520 is a lens array assembly 500 as shown in FIG. 5. A tacky layer 530 may be placed between the light-emitting layer and the pinhole array layer 520 to engage the lens array assembly 500 to the light-emitting layer. The tacky layer 530 may be, e.g., a clear adhesive layer.

FIGS. 6A, 6B and 6C show additional details of the lens array assembly 500. FIG. 6A shows a top view along a direction from the excitation side to the viewer side. In this particular example, each lens 511 has a hexagon shape and is butted side by side with six adjacent lenses 511 without any gap to have a fill factor of 100%. Other lens shapes may also be used. FIG. 6B shows a perspective view of the lens array assembly 500. FIG. 6C shows a cross sectional view of a lens 511 along the same direction of the sectional view shown in FIG. 5.

Figure 7A:
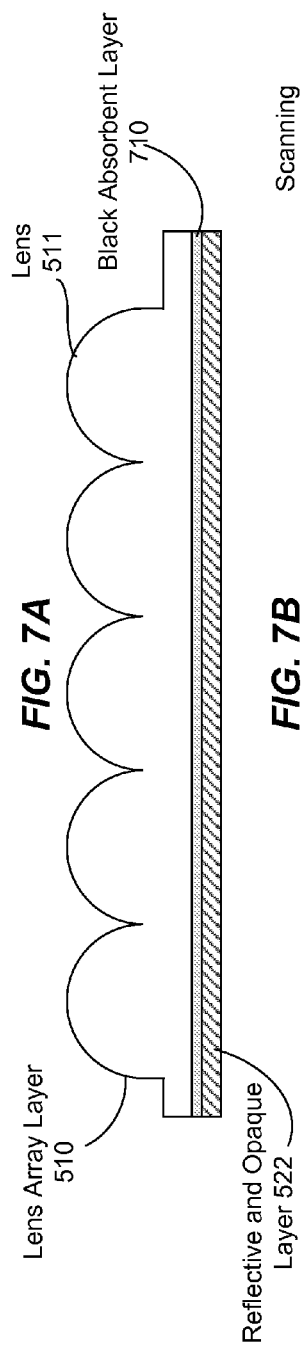
FIGS. 7A, 7B and 7C illustrate an example of a laser ablation fabrication process for making pinholes in the lens array assembly in FIG. 5 to automatically align each pinhole with a respective lens.
Figure 7B:
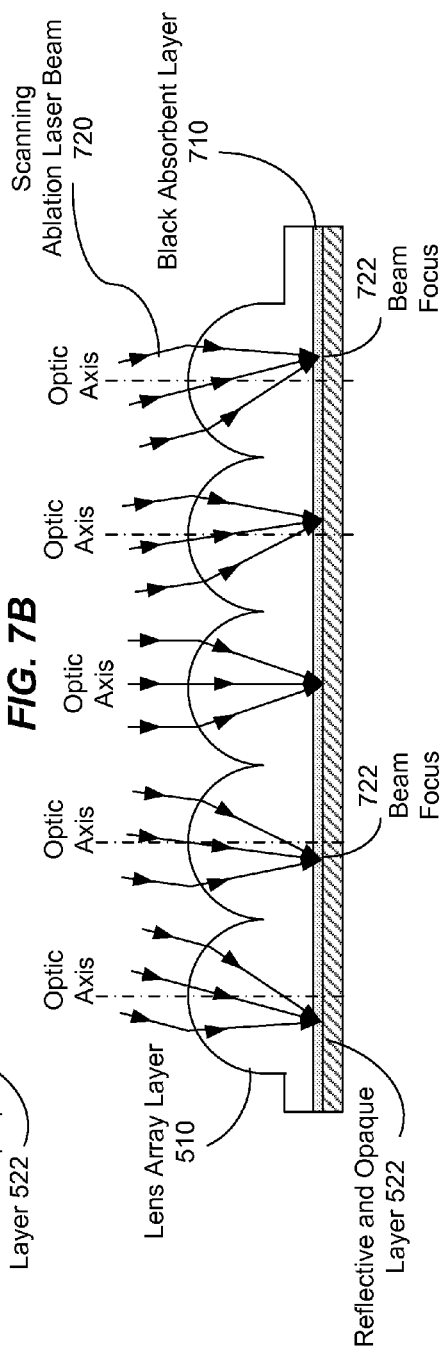
Figure 7C:
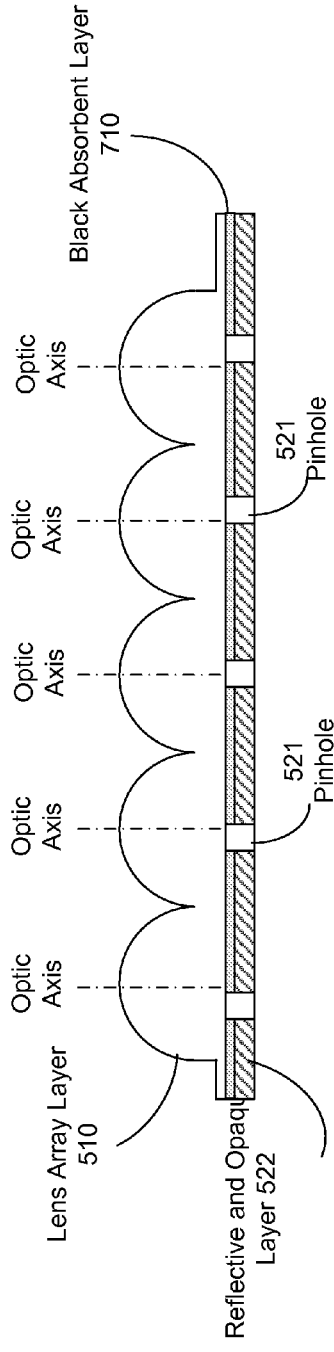

FIGS. 7A, 7B and 7C illustrate an example of a laser ablation fabrication process for making pinholes 521 in the lens array assembly 500 to automatically align each pinhole 521 with a respective lens 511. The lens array layer 510 has one side that is a flat surface. A black absorbent layer 710 can be formed on the flat surface and absorbs the excitation light. This absorption can facilitate the laser ablation. The thickness of the layer 710 may be, e.g., around 100 nm. On top of the black absorbent layer 710, the reflective and opaque metal layer 522 is formed with a desired thickness to be optically opaque. An evaporated aluminum layer with a thickness of 400 nm to 700 nm may be used as the layer 522. FIG. 7B shows the laser ablation process. A scanning ablation laser beam 720 is directed from a laser source and is scanned in the same manner as the excitation beam 120 in the display system shown in FIG. 1, 3A, 3B or 3C so that the ablation laser beam 720 traces the scanning path and direction of the excitation beam 120 at each and every location on the screen. Under this scanning mode, the focus point 722 of the ablation beam 720 on the metal layer 522 changes its location from one lens 511 to another lens 511 with respect to the focal point on the optic axis of each lens 511 due to the varying incident directions of the scanning ablation laser beam 720 with respect to the normal incidence. Therefore, the positions of the pinholes 521 for the lenses 511 are determined by the directions of the scanning ablation beam 720 when entering the lenses 511, respectively. FIG. 7B illustrates this relation between the scanning ablation beam 720 and the beam focus location with respect to the optic axis of each of 5 lenses at the center of the screen along the horizontal scanning direction. The shift of the beam focus location due to scanning of the beam 720 is along both the horizontal and vertical directions. FIG. 7C shows the resultant pinholes 521.

Therefore, the array of pinholes 521 in the pinhole array layer 520 is not exactly matching in position with the array of the lenses 511 in the lens array layer 510. The lenses 511 in the lens array layer 510 are a periodic array with a uniform lens-to-lens spacing across the array. The pinholes 521 in the pinhole array layer 520 are not periodic and have varying hole-to-hole spacings along both directions. Each pinhole 521 corresponds to only one lens 511 and is not aligned with the center of the corresponding lens 521 along the optic axis of the lens 511 except at a location of the screen where the scanning beam is at the normal incident direction. This design of the pinhole array layer 520 provides an automatic alignment between each pinhole and the scanning excitation beam 120 when the screen is used in the actual display system. As a result, the optical loss in the excitation light at the lens array assembly 500 is reduced.

The metal at the focus location 722 in each lens 511 is ablated and removed to form a throughhole as the pinhole 521. This ablation process is assisted by the absorption of the laser light in the black absorbent layer 710 at the focus location 722 and also produces a matching hole in the black absorbent layer 710. The pinhole 521 can be made to be larger than the beam spot size at the surface 522 to provide tolerance for the manufacturing tolerance and for the variation in beam focusing due to the difference in wavelength between the ablation laser beam 720 (e.g., 520 nm) and the excitation laser beam 120 (e.g., less than 420 nm).

Notably, the above and other screen designs in this application essentially eliminate any fine optical alignment between different screen layers. The lens array layer 510 and the pinhole array layer 520 are fabricated as a single assembly 500 through above self-aligned laser ablation process. This assembly 500 is engaged to the light-emitting layer to overlay with each other. Each lens 511 and its corresponding pinhole 521 are not required to be precisely align with any stripe or any other feature in the light-emitting layer. Therefore, these and other different screen layers can be relatively easy to assemble together to form a final screen.

Figure 8:
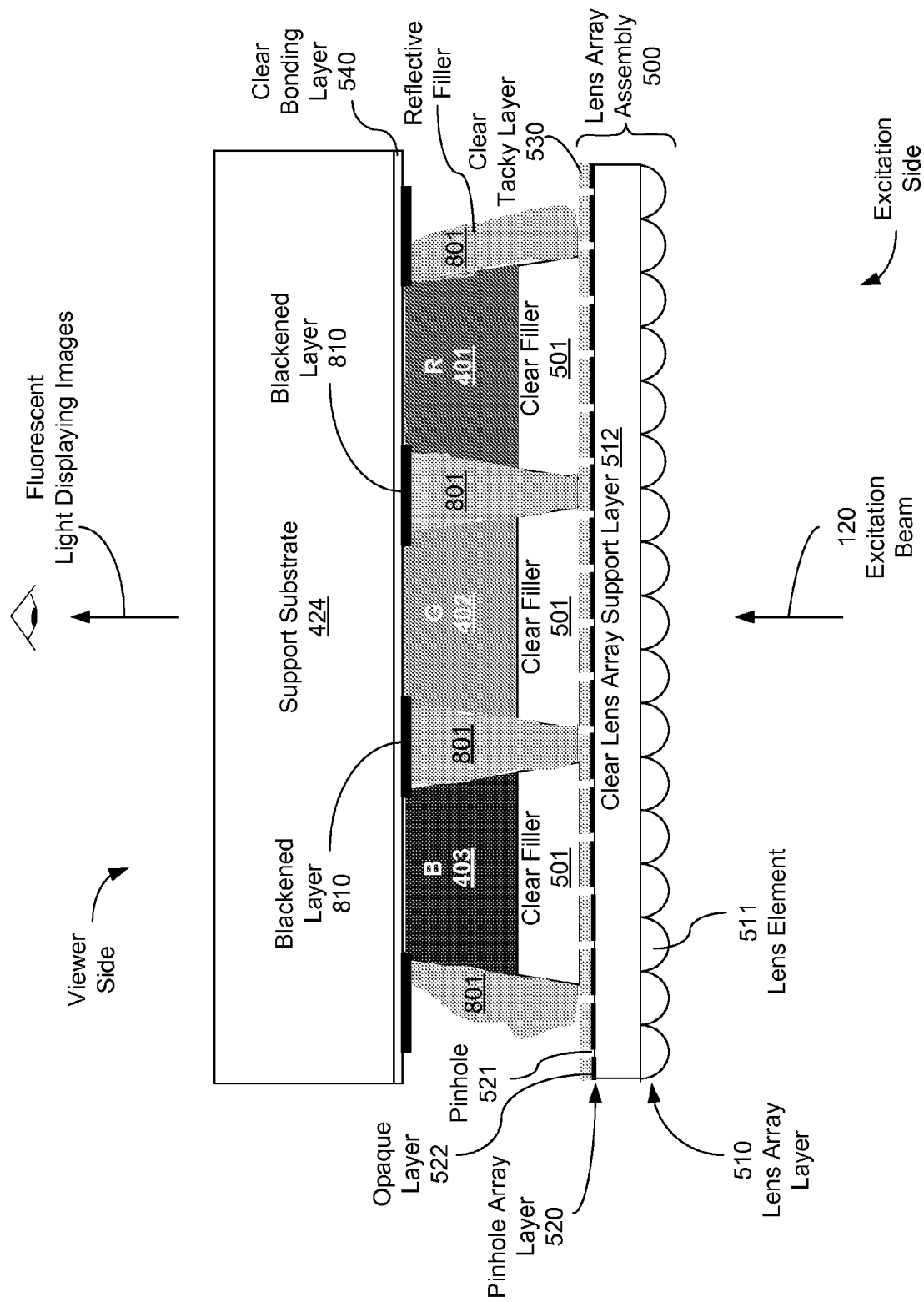
FIG. 8 shows another example of a multilayered screen with parallel light-emitting stripes coupled to a lens array assembly.

FIG. 8 shows another example of a multilayered screen with parallel light-emitting stripes coupled to a lens array assembly 500. In this example, stripe dividers 801 that are interleaved with the light-emitting stripes are made of an optically reflective and opaque material such as a metal, a mixture of reflective beads and a binder material, and a white paint material (e.g., a $TiO_2$-filled resin or a barium sulfate-filled resin). The beads can be made of a dielectric material with a refractive index greater than the refractive index of the bead binder material to effectuate optical reflection and can be in various sizes, e.g., from several microns to tens of microns, or hundreds of microns. Each bead may be partially or entirely coated with a metal coating. The reflectivity of a white paint material can be grater than 90% from 400 nm to 650 nm. In addition, a blackened absorbent stripe layer 810 can be formed on a facet of each stripe divider which faces the viewer side (i.e., away from the lens array layer 510) to reduce reflection or glare at the dividers.

Figure 9:
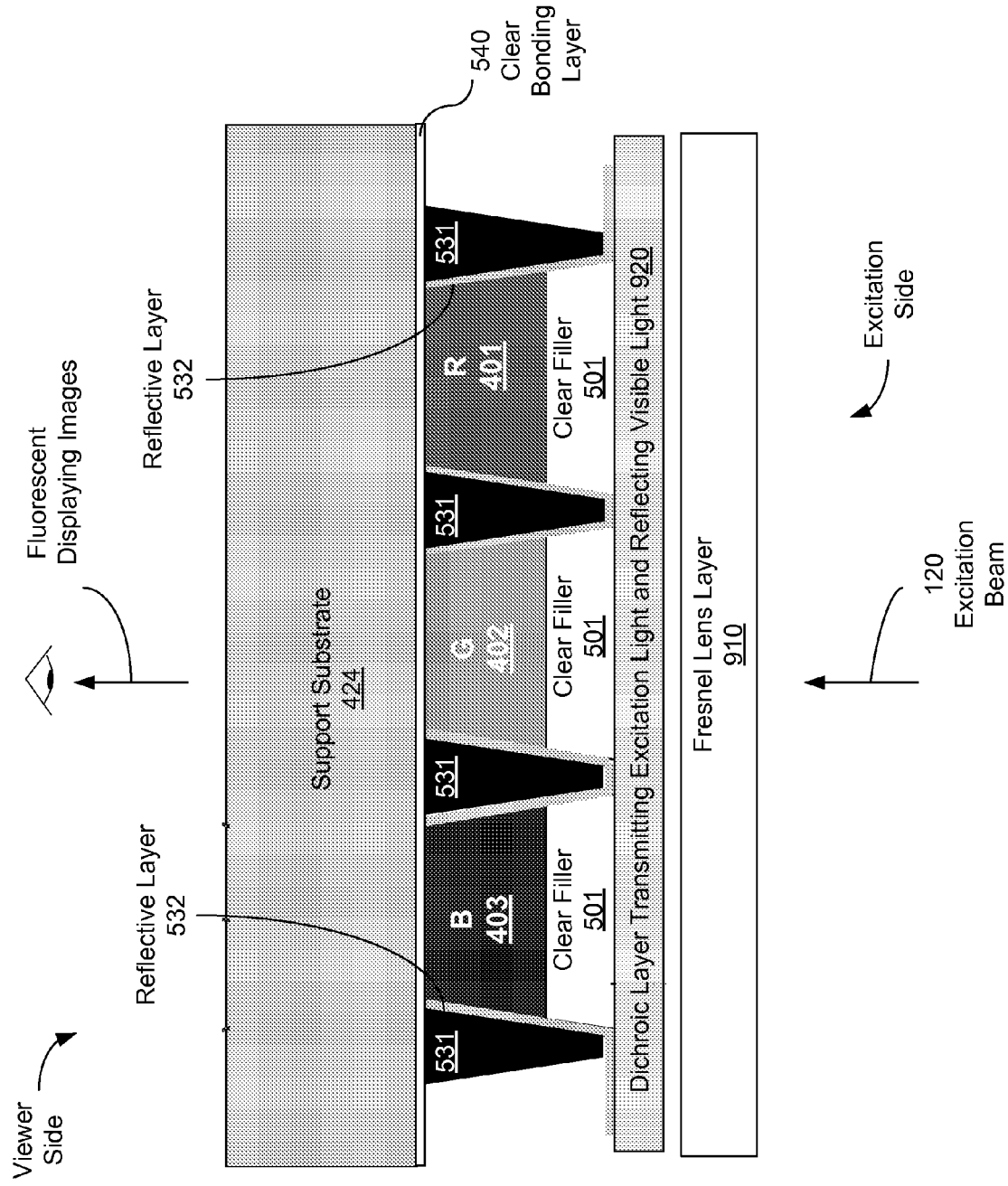
FIGS. 9 and 10 show two screens that use a combination of a Fresnel lens layer and a dichroic layer to replace the lens array assembly in the screens in FIGS. 5 and 8, respectively.
Figure 10:
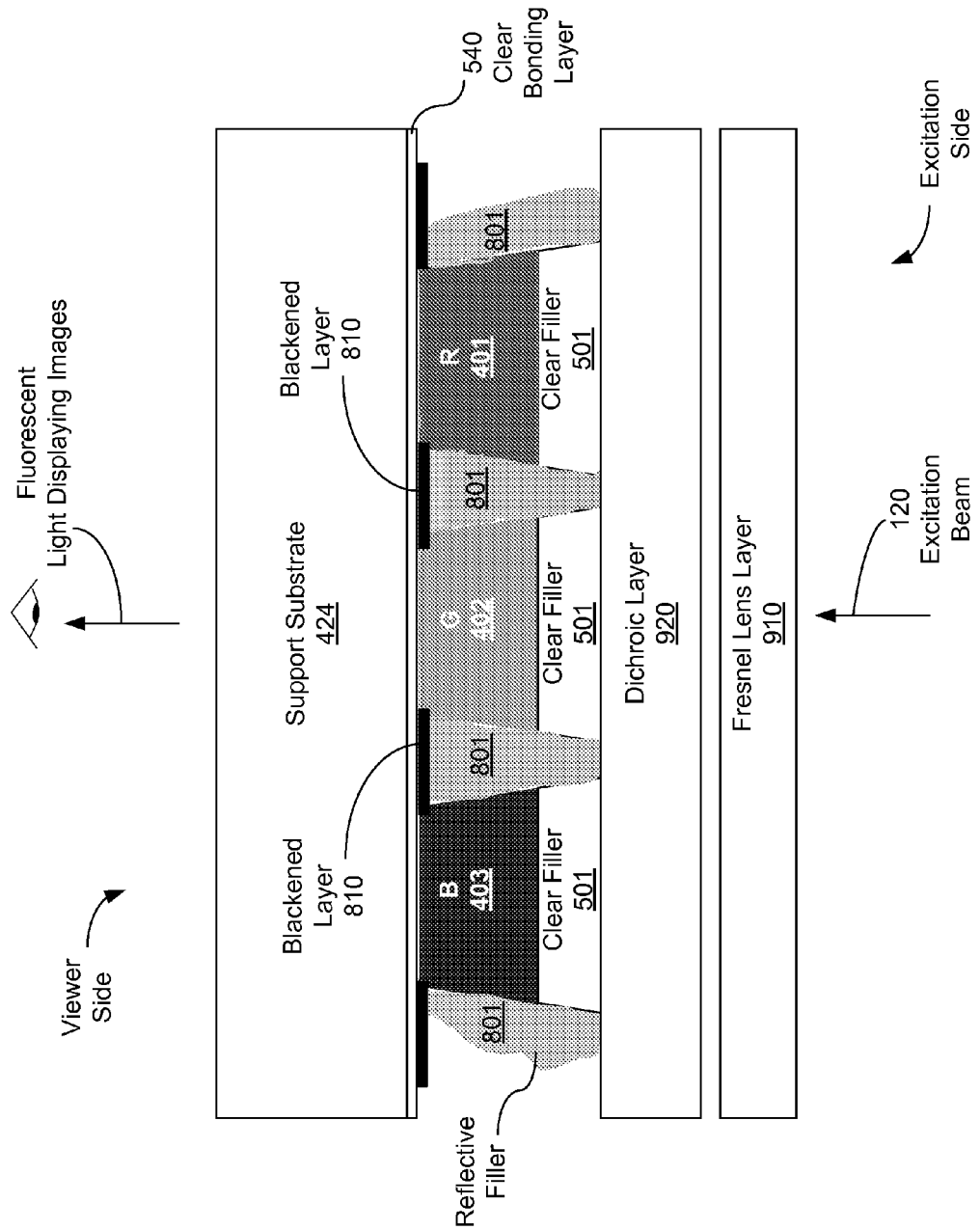

FIGS. 9 and 10 show two screens that use a combination of a Fresnel lens layer 910 and a dichroic layer 920 to replace the lens array assembly in the screens in FIGS. 5 and 8, respectively. The Fresnel lens layer 910 is placed at the excitation side of the screen as the entrance layer to cover the entire area of the screen that receives the excitation beam 120. The Fresnel lens layer 910 can be formed in a dielectric substrate that may be made of, e.g., a glass or a plastic material. An acrylic plastic material, for example, may be used to form the Fresnel lens layer 910. A dielectric layer with a different index than the Fresnel lens layer 910 can be formed between the Fresnel lens layer 910 and the remaining portion of the screen to create a difference in the refractive index from the Fresnel lens layer 910 to the next layer of the screen, e.g., the dichroic layer 920. This layer can be an air gap or a dielectric material transparent to the excitation light. The Fresnel lens layer 910 has Fresnel rings and can be configured to redirect the incident scanning excitation beam 120 via optical diffraction, refraction or both as the incident excitation beam that is approximately normal to the screen. The Fresnel lens layer 910 can be in a telecentric configuration for the incident scanning excitation beam 120.

The dichroic layers 910 may be implemented in various configurations. For large format displays, such a dichroic layer may be made of relatively inexpensive materials and be relatively easy to manufacture. Multiple dielectric layers can be designed to construct various wavelength-selective optical filters by controlling the refractive indices and the physical thickness values of the layers. For example, multiple layers of alternating high and low index dielectric layers may be designed to achieve desired wavelength-selective reflection and transmission spectra. Multiple sheets of films with different refractive indices may be laminated or fused together to construct a composite sheet as the D1 or D2 dichroic layer. In some implementations, multiple layers of two different materials with different indices may be used to form a composite film stack by placing the two materials in an alternating manner. In other implementations, three or more different materials with different indices may be stacked together to form the composite film stack the dichroic layer 920. Such a composite sheet for the dichroic layer 920 is essentially an optical interference reflector that transmits the excitation light (e.g., UV light) and reflects the colored visible light. The materials for the composite sheets may be organic materials, inorganic materials or a combination of organic and inorganic materials that can be rigid or flexible.

A flexible multi-layer composite sheet may be formed from polymeric, non-polymeric materials, or polymeric and non-polymeric materials. Exemplary films including a polymeric and non-polymeric material are disclosed in U.S. Pat. No. 6,010,751 entitled "Method for forming a multicolor interference coating" and U.S. Pat. No. 6,172,810 entitled "Retroreflective articles having polymer multilayer reflective coatings," which are incorporated by reference in their entirety as part of the specification of this application. An all-polymer construction for a composite sheet can offer manufacturing and cost benefits. High temperature polymers with high optical transmission and large index differentials can be used to construct the interference filter that is environmentally stable, thin and flexible. Coextruded multilayer interference filters as disclosed in U.S. Pat. No. 6,531,230 entitled "Color shifting film" can be used to provide precise wavelength selection and can be made as a filter film in a large area at a relatively low cost. The entire disclosure of U.S. Pat. No. 6,531,230 is incorporated by reference as part of the specification of this application. The use of polymer pairs having high index differentials allows the construction of thin, highly reflective mirrors that are freestanding without a substrate and can be easily processed for constructing large screens. Such a composite sheet is functionally a piece of a multi-layer optical film (MOF) which can be, e.g., a stack of alternating layers of PET and co-PMMA to exhibit a normal-incidence reflection band suitable for screen applications. As an example, an enhanced specular reflector (ESR) made out of a multilayer polyester-based film from 3M Corporation may be configured to produce the desired dichroic reflection and transmission bands for the present application. Examples for various features of multi-layer films are described in U.S. Pat. No. 5,976,424 entitled "Method for making multilayer optical films having thin optical layers," U.S. Pat. No. 5,080,467 entitled "Biphenyl derivatives for photostabilization in pulsed optical darkening apparatus and method" and U.S. Pat. No. 6,905,220 entitled "Backlight system with multilayer optical film reflector," all of which are incorporated by reference as part of the specification of this application.

In the above examples, each light-emitting stripe includes a stripe of a light-emitting material (e.g., 401, 402 or 403) that absorbs the excitation light to emit visible light and a stripe of a transparent material 501. This structure can be fabricated by various processes including directly printing light-emitting phosphor stripes on a screen layer. The following describes an example of a molding and transfer process shown in FIGS. 11A, 11B and 11C, where the light-emitting phosphor stripes are initially formed in a mold and are then removed from the mold and transferred to a screen layer.

FIG. 11A shows a mold suitable for making the light-emitting layer. The mold includes a mold base 1101 and parallel grooves 1120 formed between groove dividers 1130 on the mode base 1101. Dimensional integrity of the mold can be achieved with known precision machining methods such as diamond turning. The inner surfaces of the grooves 1120 in the mold can be treated prior to applying the light-emitting materials to facilitate separation of each light-emitting stripe from the mold. For example, the inner surfaces of each groove 1120 can be electroplated with a nickel layer or coated with a layer of a surface lubrication material (e.g., Teflon).

After the mold is prepared, light-emitting materials such as phosphor materials are applied into parallel grooves 1120 of the mold (FIGS. 11B and 11C) so that two adjacent grooves 1120 are applied with two different light-emitting materials that emit light at two different wavelengths. A printing process such as a screenprinting process can be used to print phosphor inks into the mold. The volume of each light-emitting material in each respective groove is controlled during the printing process to partially fill each groove 1120. This can be achieved by, e.g., controlling screenprinting parameters, such as the squeegee speed, the angle of attack, the ink viscosity, stencil mask opening width, etc. Alternatively, the phosphor volume may also be controlled by mixing volatile agents in the ink which evaporate and allow phosphor to settle to bottom of each mold groove. Inks may have a concave top surface after evaporation of volatiles (FIG. 11C).

After the phosphor materials are applied, a liquid material is applied in each groove 1120 on top of a respective light-emitting material to fill up the groove 1120. For example, an optically clear liquid material such as the Norland 61 UV curing compound or Addison Clear Wave AC A109-TR UV molding compound can be dispensed to fill the mold. A squeegee is used to scrape off excess material from top of the mold.

Figure 11D:
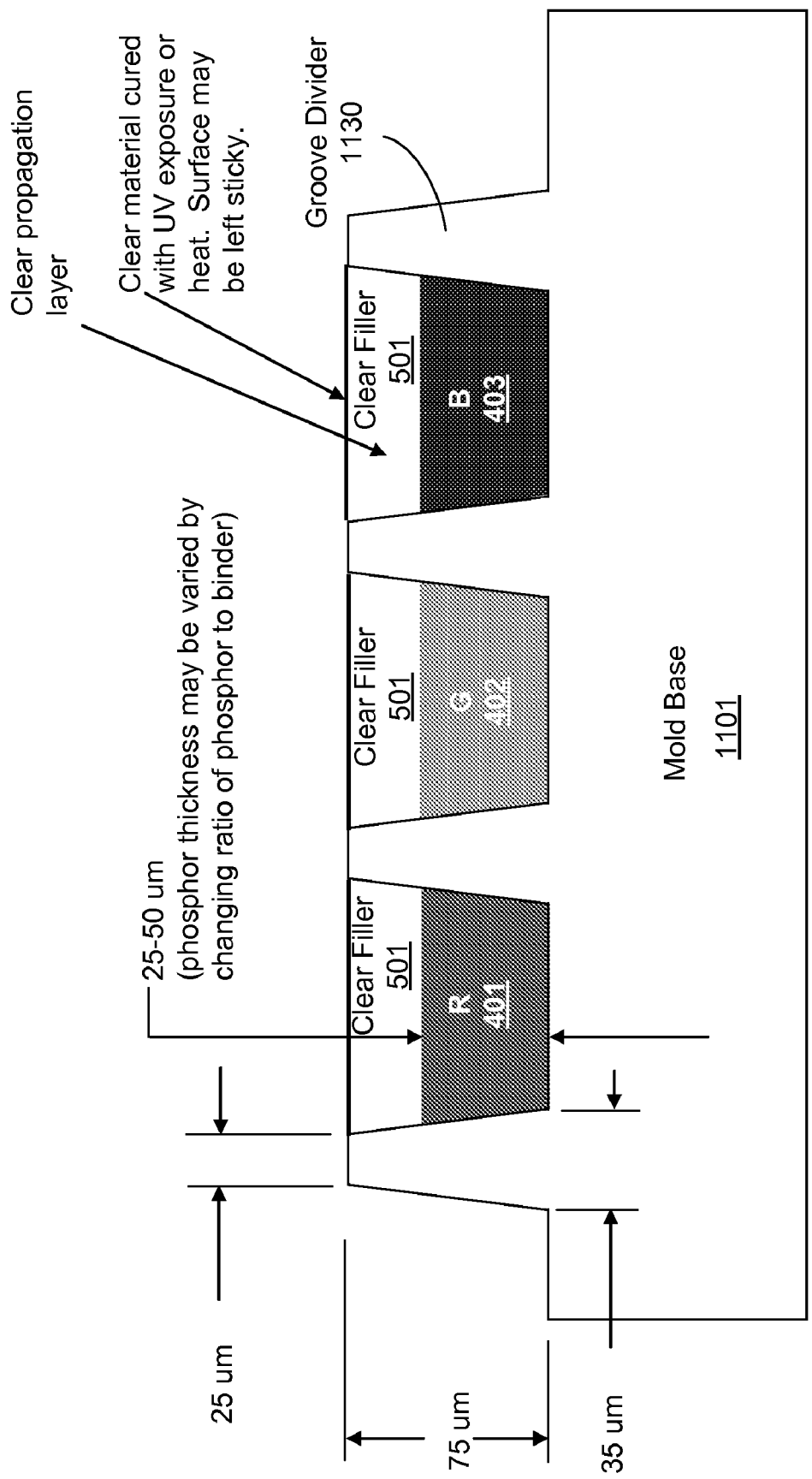

Subsequently, the liquid material is transformed into a transparent solid material 501 that attaches to each light-emitting material in each groove 1120. For example, the clear material 501 can be cured fully or partially by exposing to UV light or heat to assist removal from the mold. The top surface of the clear material 501 may be left sticky after the transformation for easy engagement to another screen layer. FIG. 11D shows an example of a mold with specific dimensions.

The above molded light-emitting layer is subsequently removed from the mold and is attached to another screen layer. In this process, the screen layer is placed on the mold to be in contact with and to engage to the transparent solid material. The screen layer is lifted to lift a stripe formed by the transparent solid material 501 and each light-emitting material out of the mold to form a light-emitting layer of parallel light-emitting stripes and is attached to another screen layer.

FIGS. 12A and 12B illustrate lifting the light-emitting layer by using the lens array assembly 500. First, the pre-assembled lens array assembly 500 is oriented so that the clear tacky layer 530 faces the exposed clear fillers 501 in the grooves 1120 of the mold shown in FIG. 11D. The pre-assembled lens array assembly 500 is pressed against the mold to allow the clear tacky layer 530 and the clear fillers 501 to engage to one another (FIG. 12A). Next, as shown in FIG. 12B, the lens array assembly 500 is lifted to move away from the mold base 1101 of the mold to remove the stripes of clear fillers 501 and the phosphor stripes (401, 402, 403, etc.) attached to the clear fillers 501 out of the grooves 1120. This lifting process is facilitated by the adhesion between the clear tacky layer 530 and the clear fillers 501 and the pre-treatment of the inner surfaces of the grooves 1120 in the mold to facilitate separation of each light-emitting stripe from the mold.

FIGS. 13A through 13D illustrate the remaining process for making the screen in FIG. 5. After lifting the light-emitting layer of parallel light-emitting stripes out of the mold, a metal reflective layer is coated over the light-emitting stripes to cover exposed surfaces of the light-emitting material and the transparent solid material and a surface over the screen layer between two adjacent light-emitting stripes (FIG. 13A). The part of this layer on the side surfaces is the reflective layer 532 in FIG. 5 and the part of the layer on the top surface of the light-emitting material (e.g., phosphor) is shown as the layer 1310 which is later removed. A filler material 531 is added to fill gaps between two adjacent light-emitting stripes and the material 531 can be a material that absorbs light such as a black pigment. Next, the part of the filler material 531, the metal layer 1310 on top of the light-emitting material (e.g., phosphor) and a part of the light-emitting material are removed to form a flat surface that exposes the light-emitting material in each light-emitting stripe. FIG. 13C shows the exposed top phosphor surface 1330 and the top filler surface to form a flat surface. At this time, another screen layer can be placed over the flat surface. FIG. 13D shows that the support substrate 424 can be attached to the flat surface by using a clear bonding layer 540.

FIGS. 14A, 14B and 14C show a use of a lifting layer 1401 to remove the molded light-emitting layer out of the mold and to engage to another screen layer such as the lens array assembly 500. This lifting layer 1401 becomes a part of the screen and can be designed to achieve a desired propagation length between the pinhole array layer 520 and the phosphors. This lifting layer 1401 can be made of various transparent materials including thin plastic or polyester films such as a Mylar film with a thickness from 6 microns to 25 microns. First, the lifting layer 1401 is pressed against the mold to allow the lifting layer 1401 and the clear fillers 501 to engaged to one another (FIG. 14A). A thin adhesive layer may be applied on other the lifting layer 1401 or the exposed surfaces of the clear fillers 501 to assist the engagement between the lifting layer 1401 and the clear fillers 501. Next, as shown in FIG. 14B, the lifting layer 1401 is lifted to move away from the mold base 1101 of the mold to remove the stripes of clear fillers 501 and the phosphor stripes (401, 402, 403, etc.) attached to the clear fillers 501 out of the grooves 1120. FIG. 14C further shows that the assembling process of engaging the lens array assembly 500 in FIG. 5 to the lifting layer 1401 as one part of the screen. The pre-assembled lens array assembly 500 is oriented so that the clear tacky layer 530 faces the lifting layer 1401. The pre-assembled lens array assembly 500 and the lifting layer 1401 are pressed against each other to allow the clear tacky layer 530 and the lifting layer 1401 to engage to each another. Additional screen layers are then placed over the phosphor stripes (401, 402, 403, etc.) to complete the screen.

Referring to FIG. 13C, the top phosphor surface 1330 in each stripe faces the viewer side of the screen. An air gap or a low-index dielectric layer can be formed between the phosphor surface 1330 and the support substrate layer 424 to enhance transmission of emitted visible light to the viewer through the support substrate 424. In one implementation, surface textures on the exposed surface 1330 of the light-emitting material can be formed during the removal process or in a separate surface treatment process to form air gaps between the light-emitting material and the screen layer engaged on the flat surface 1330. The lifting layer 1401 can be a low index material with an index less than that of the phosphors.

A different molding process can be used to screen with a similar and slightly different multilayer structure. FIGS. 15A through 15J illustrate this different molding process.

FIG. 15A shows a mold suitable for making a light-emitting layer for a screen. The mold includes a mold base 1501 and narrow parallel mold grooves 1510 formed between wide mode dividers 1520 on the mode base 1501. The groves 1510 are used to form stripe dividers between adjacent light-emitting stripes in the screen and the space occupied by the mold dividers 1520 is used to form the light-emitting stripes in the screen. Dimensional integrity of the mold can be achieved with known precision machining methods such as diamond turning. The inner surfaces of the mold grooves 1510 and the top surfaces of mold dividers 1520 of the mold can be treated to facilitate separation of the molded structure from the mold. For example, the inner surfaces of each groove 1510 and the top surfaces of mold dividers 1520 can be electroplated with a nickel layer or coated with a layer of a surface lubrication material (e.g., Teflon). A stripe divider material such as an optically opaque material (e.g., a black ink) is applied into parallel grooves 1510 of the mold to fill up the grooves 1510. A printing process such as a screenprinting process can be used to print the stripe divider material into the mold. The stripe divider material can be a UV cured black material that absorbs light. The excessive stripe divider material is removed to form a flat surface with the top surfaces of the mold dividers 1520.

FIG. 15B shows forming a UV curable clear layer 1540 on top of the exposed surfaces of the filled stripe divider material 1530 and the top surfaces of the mold dividers 1520. First, the UV curable material for the clear layer 1540 is applied on and is placed in direct contact with the top exposed surfaces of the filled stripe divider material 1530 and the top surfaces of the mold dividers 1520. Next, the UV curable material for the clear layer 1540 is exposed to the UV light to cure the material so that the UV curable material is bounded with the stripe divider material 1530. This UV curable clear layer 1540 may be used in some screens and may be eliminated in other screens.

Figure 15C:
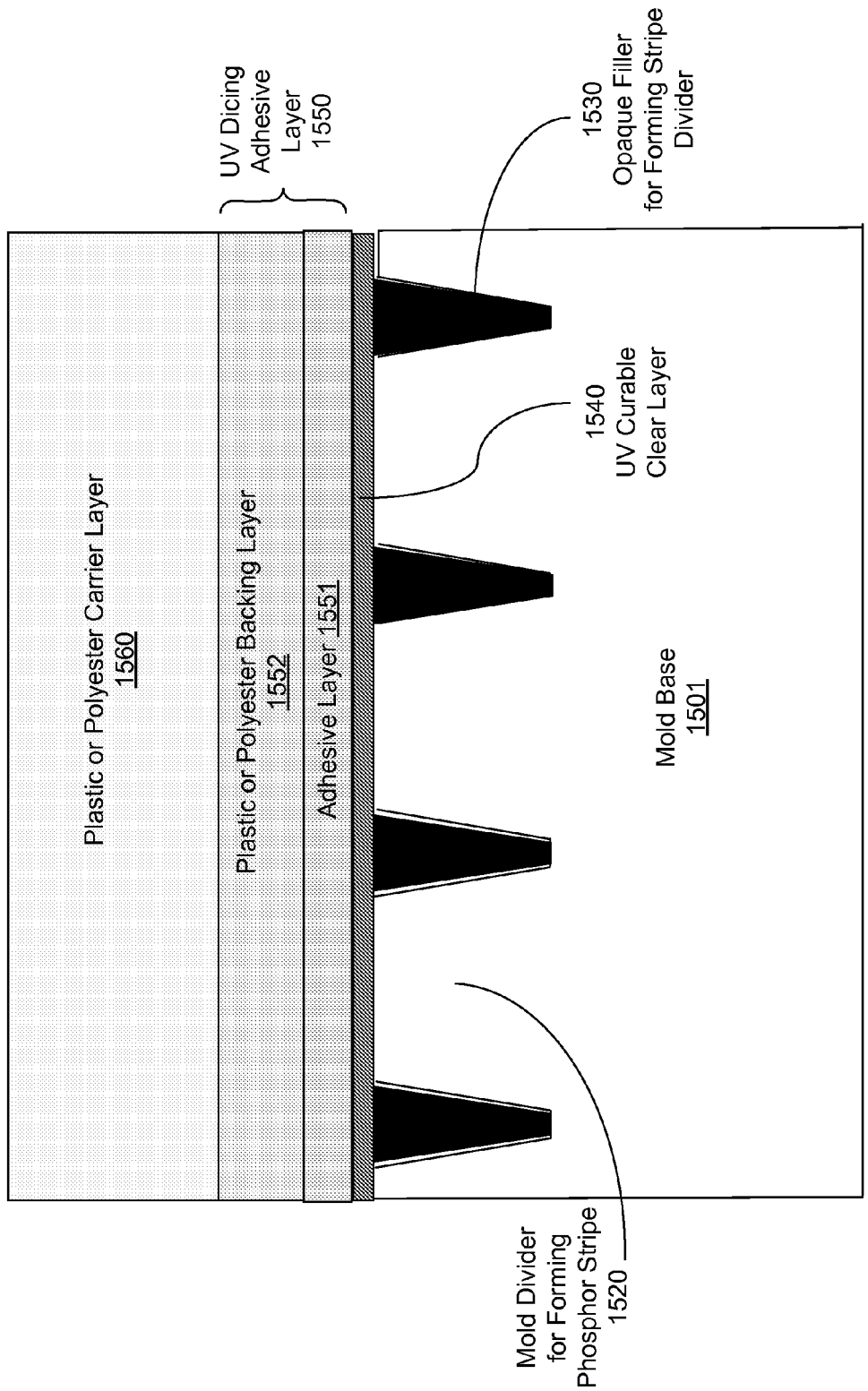
Figure 15D:
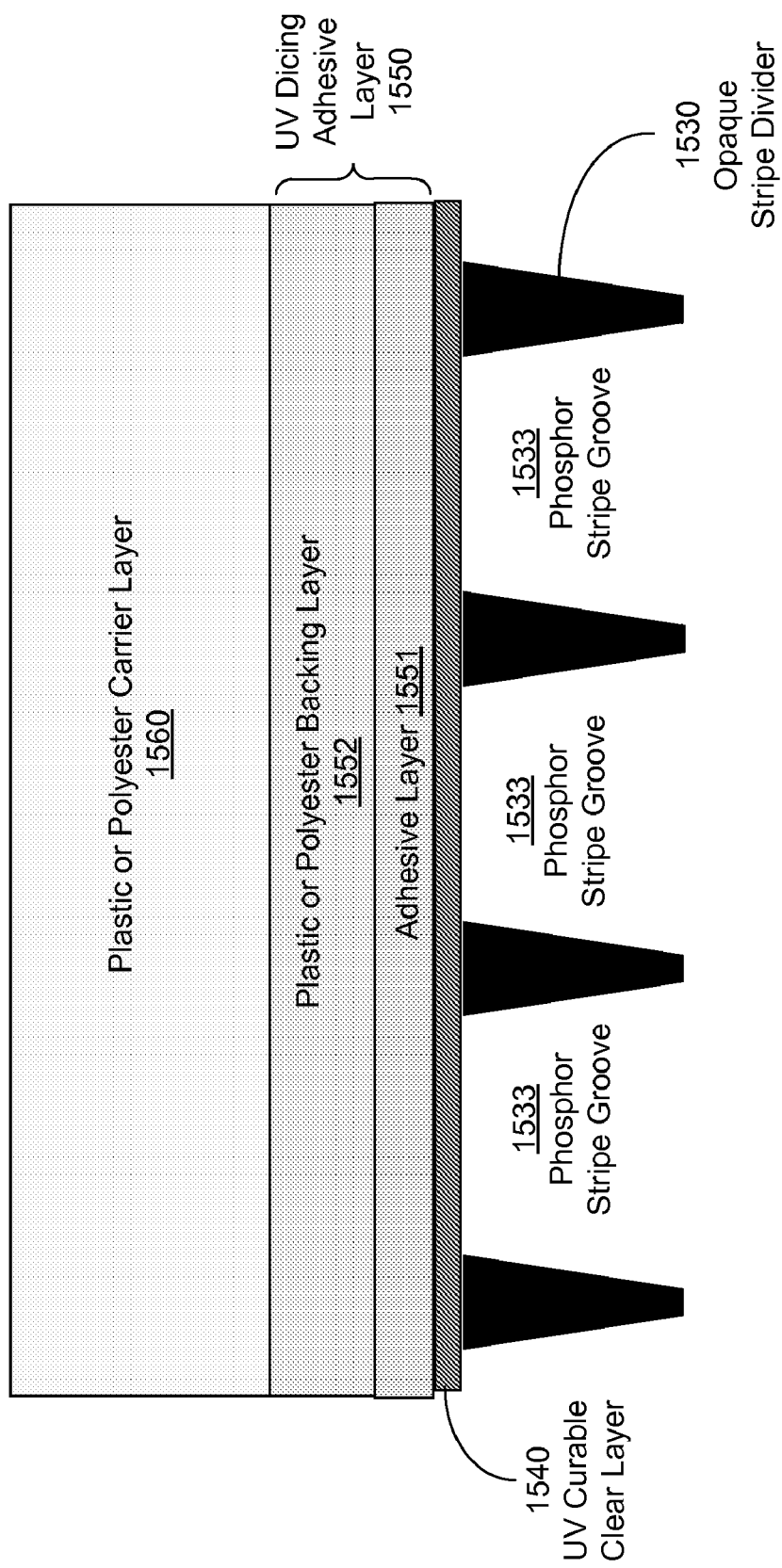

Next, a carrier layer 1560 and an adhesive layer 1550 are attached to the top surface of the top of the exposed surfaces of the filled stripe divider material 1530 and the top surfaces of the mold dividers 1520 in absence of the UV curable clear layer 1540. When the UV curable clear layer 1540 is present, the carrier layer 1560 and the adhesive layer 1550 are attached to the top surface of the UV curable clear layer 1540. The adhesive layer 1550 can be a UV dicing adhesive layer having a bottom adhesive layer 1551 which adheres to the UV curable clear layer 1540 and a top plastic or polyester backing layer 1552 that is attached to the carrier layer 1560. One example of the adhesive layer 1550 is the UV dicing adhesive tape used in wafer dicing and the adhesive surface becomes non-sticky when exposed to UV light. This process bonds the carrier layer 1560 to the UV curable clear layer 1540 via the adhesive layer 1550 (FIG. 15C). The carrier layer 1560 is then lifted away from the mold to remove the stripe dividers 1530 out of the mold grooves 1510 to form a parallel array of phosphor Stripe grooves 1533 between adjacent stripe dividers 1530 (FIG. 15D).

Figure 15E:
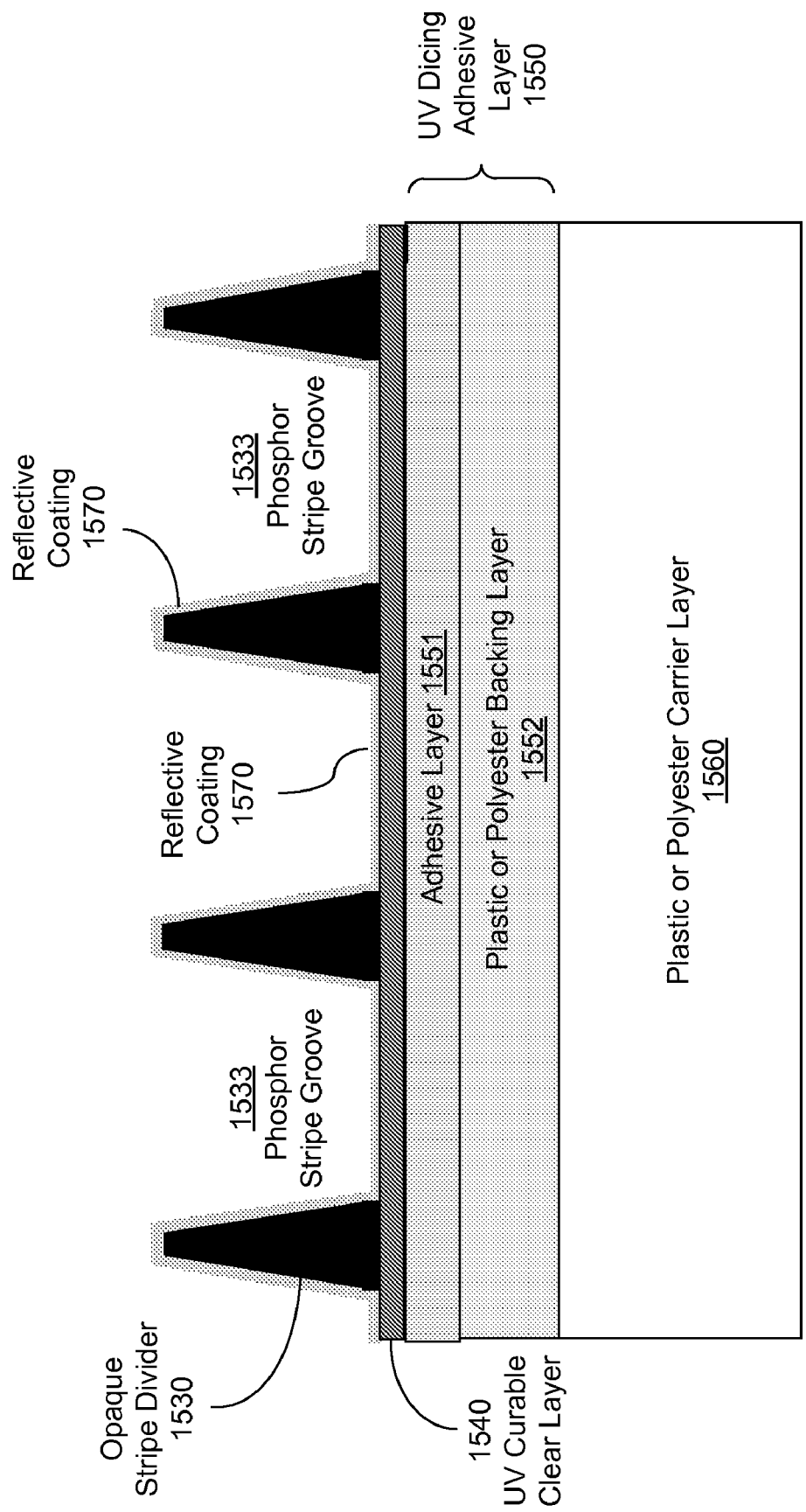
Figure 15F:
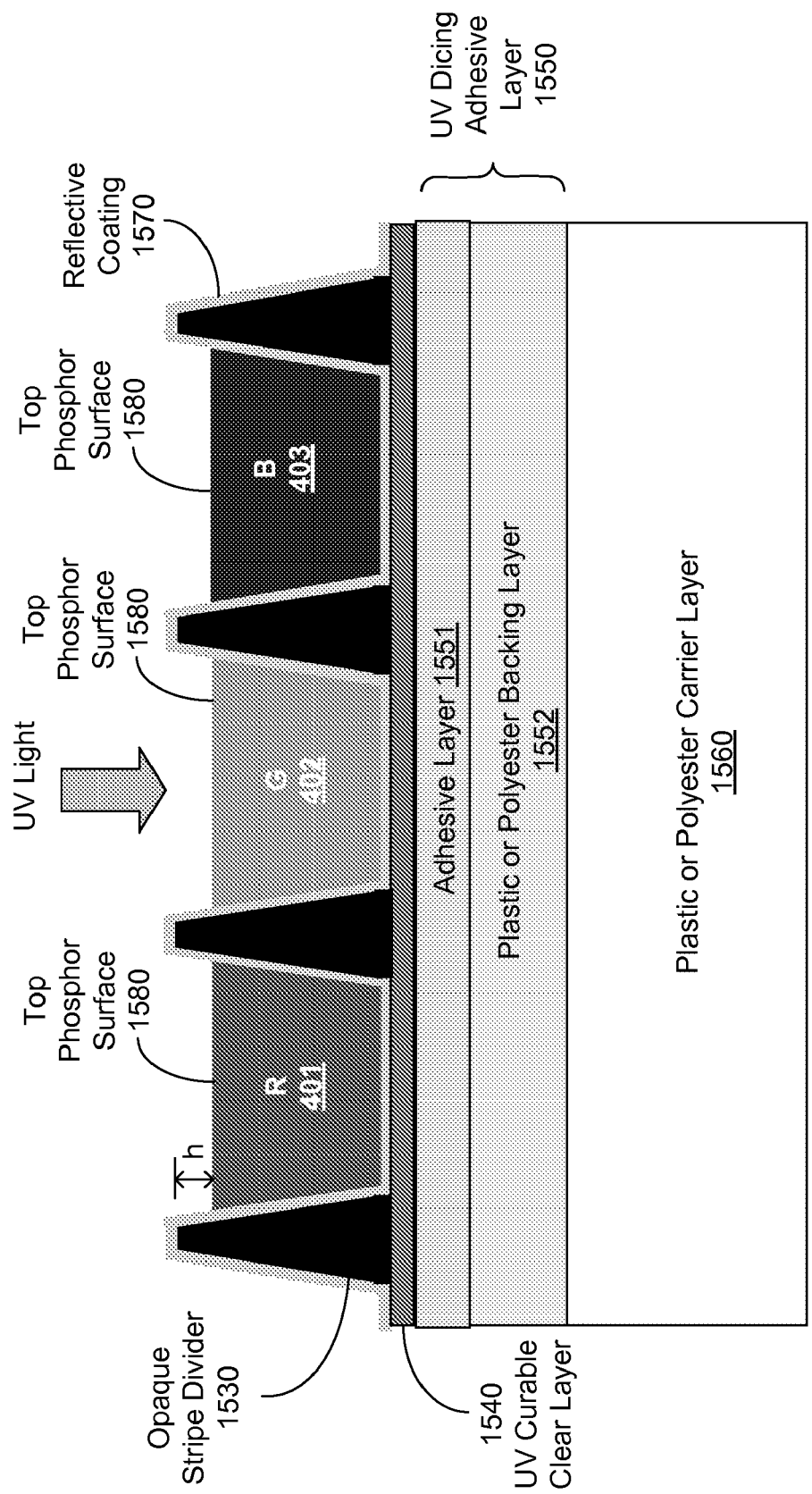

Next, a reflective coating 1570 such as a metal layer (e.g., aluminum) is deposited over the surfaces of the stripe dividers 1530 and the bottom surfaces of the phosphor stripe grooves 1533 (FIG. 15E). This reflective layer is in part to recycle light to increase the optical efficiency of the screen. Subsequently, light-emitting materials such as phosphor materials are applied into parallel grooves 1533 so that two adjacent grooves 1533 are applied with two different light-emitting materials that emit light at two different wavelengths. A printing process such as a screenprinting process can be used to print phosphor inks into the grooves 1533. The volume of each light-emitting material in each respective groove 1533 is controlled during the printing process to partially fill each groove 1533 below the top surface of the strip dividers 1530 by a selected distance h (FIG. 15F). This forms the phosphor stripes (401, 402, 403, etc.) with top surfaces 1580. UV light can be used to illuminate the filled phosphor materials to cure the materials. The UV light does not penetrate the reflective metal layer 1570 so that the adhesion of the UV-released adhesive layer 1550 remains intact. The space above the phosphor materials can be left empty or filled with an optically clear liquid material such as the Norland 61 UV curing compound or Addison Clear Wave AC A109-TR UV molding compound which is transformed into a transparent solid material that attaches to each light-emitting material in each groove 1533.

Figure 15G:
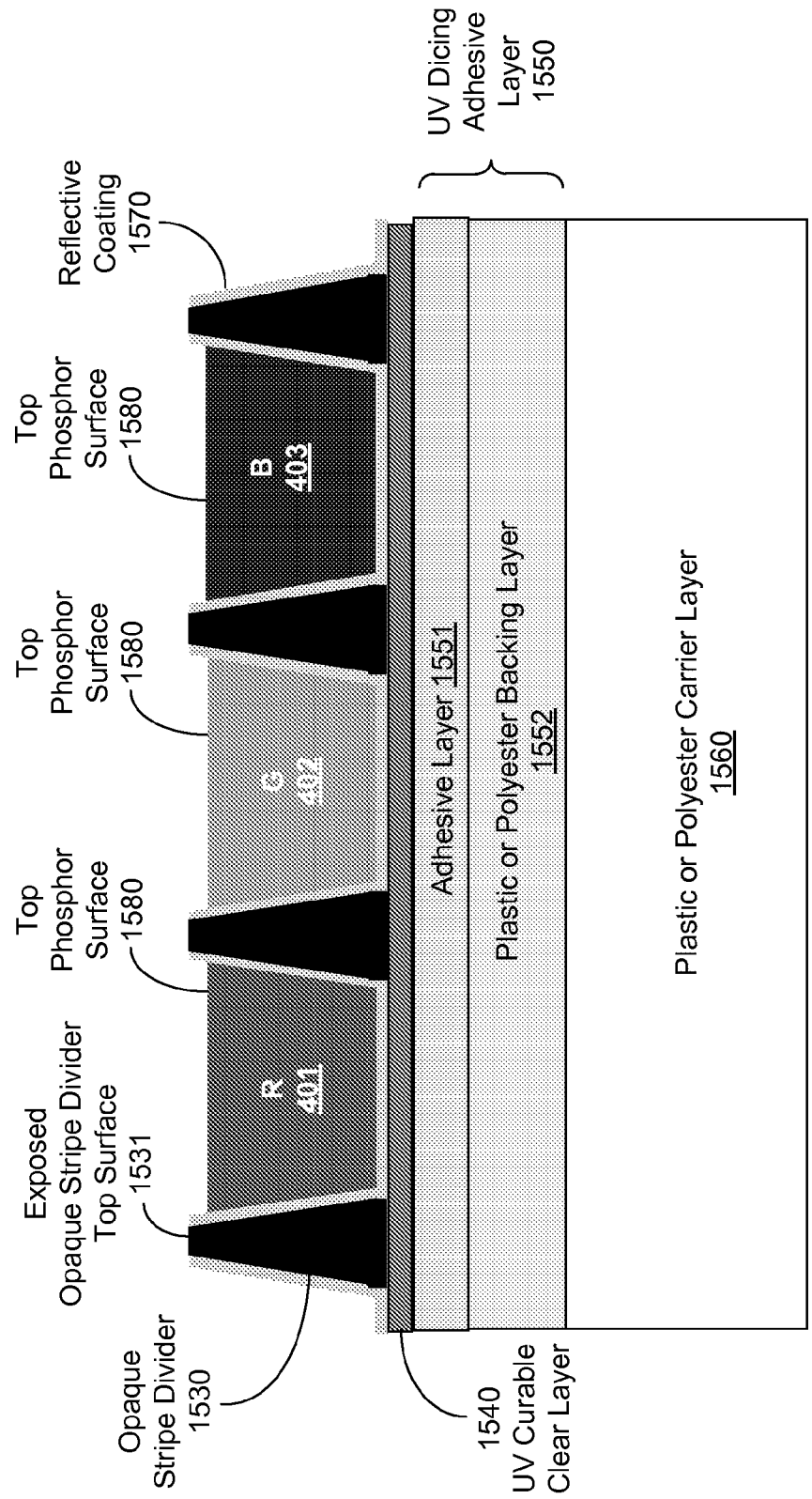

In this design, the top surfaces of the stripe dividers 1530 are oriented to face the viewer side of the final screen. Hence, the portions of the reflective coating 1570 on the top surfaces stripe dividers 1530 should be removed to reduce reflection or glare to the viewer side of the screen. This can be achieved by removing the top layer of the reflective coating 1570 until the opaque filler material of the stripe dividers 1530 is exposed as an opaque top surface 1531 (FIG. 15G). This removal process can be achieved using various techniques, including but not limited to polishing and sandblasting.

Figure 15I:
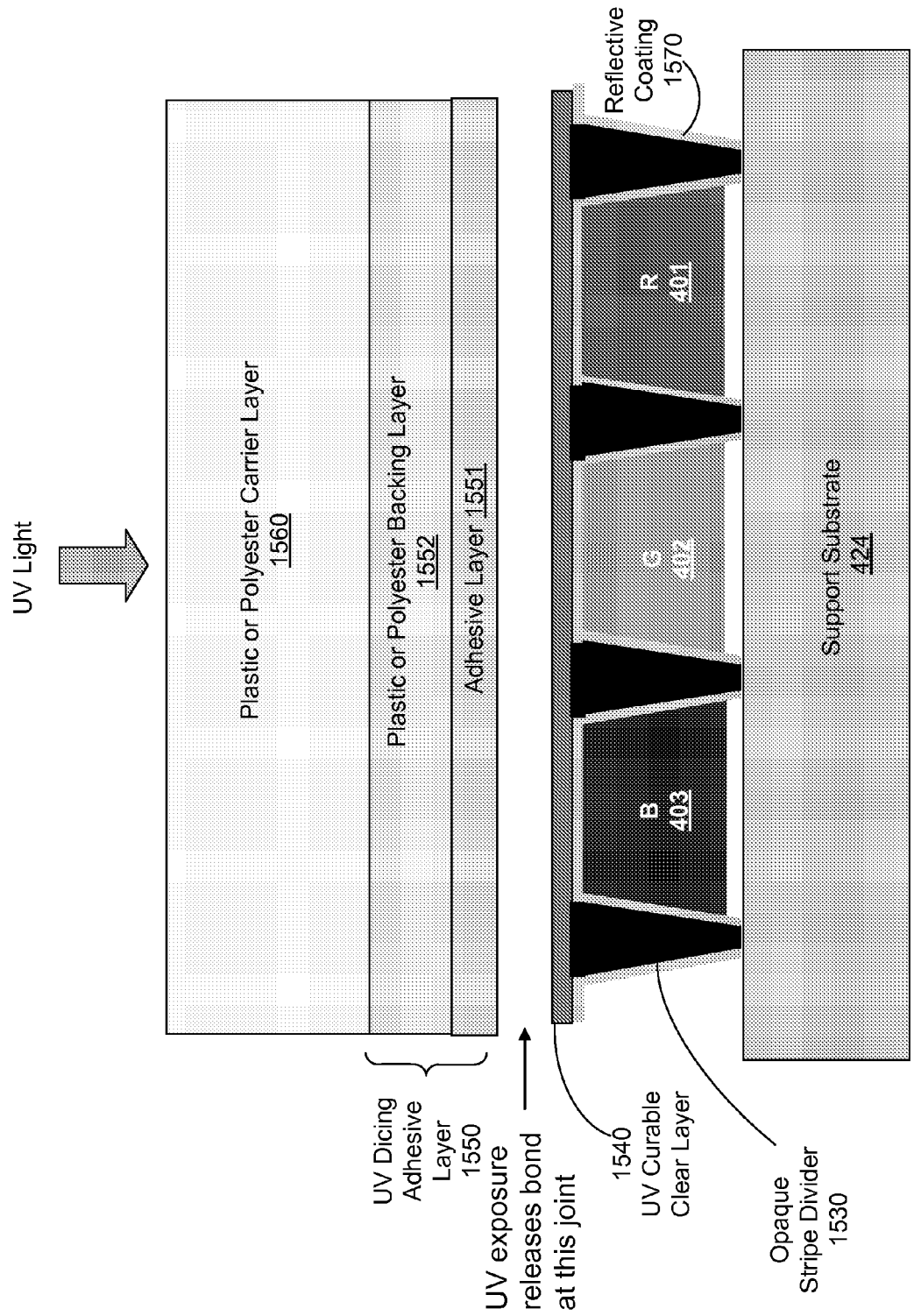

Next, a support substrate 424 is attached to the top surfaces 1531 and the top surfaces of the clear fillers 501 by an adhesive layer (FIG. 15H). At this time, UV light can be directed through the carrier layer 1560 and the adhesive layer 1550 to cause the UV dicing adhesive layer 1550 to lose its adhesion and thus to release the screen structure as shown in FIG. 15I. The UV clear layer 1540 can be removed (FIG. 15J).

Figure 15J:
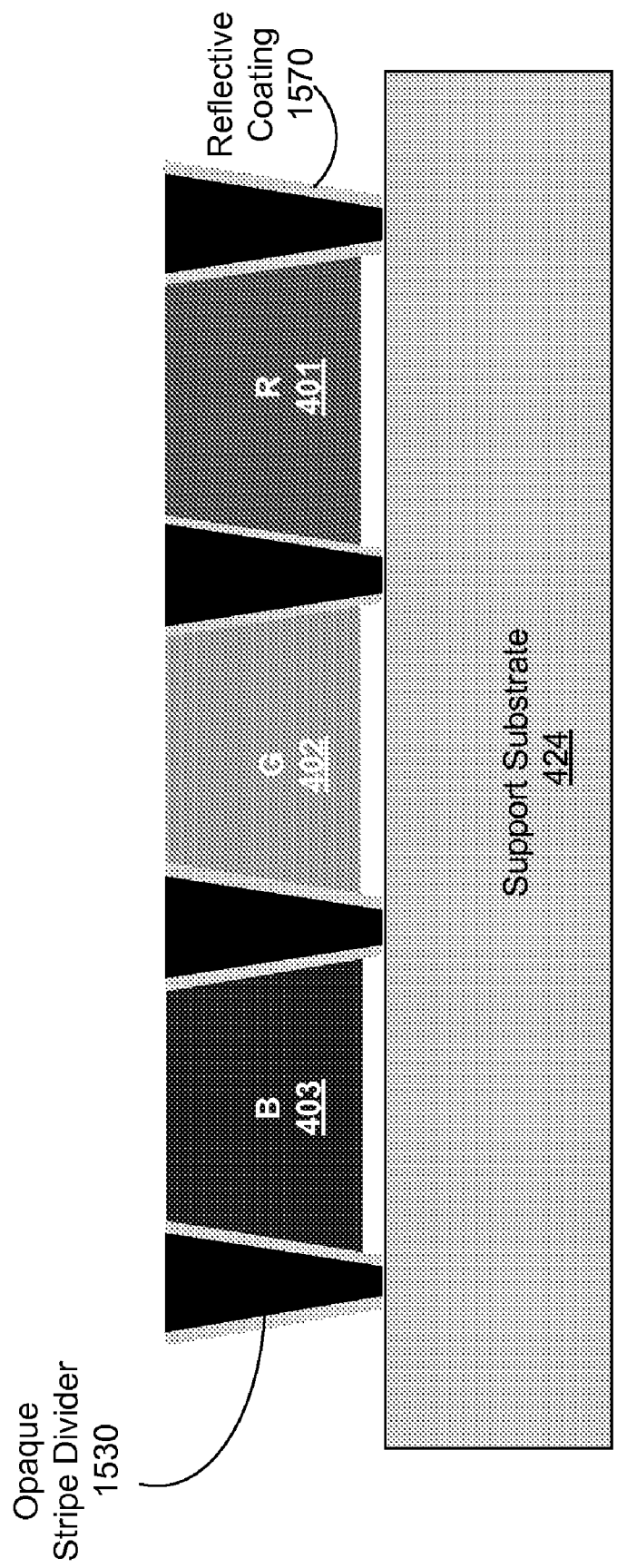
Figure 16:
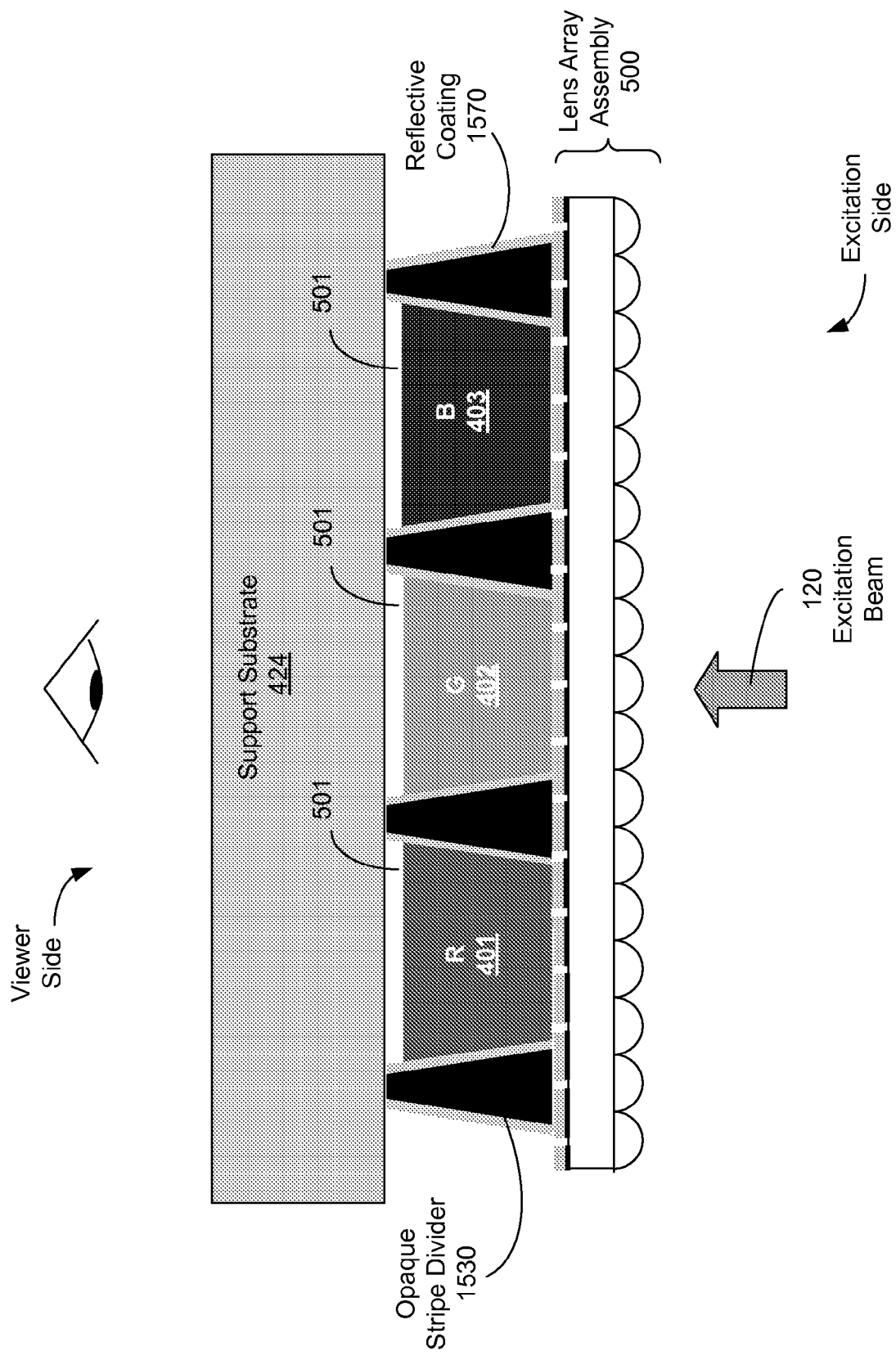
FIGS. 16 and 17 show two screen structures based on the process in FIGS. 15A through 15J.
Figure 17:
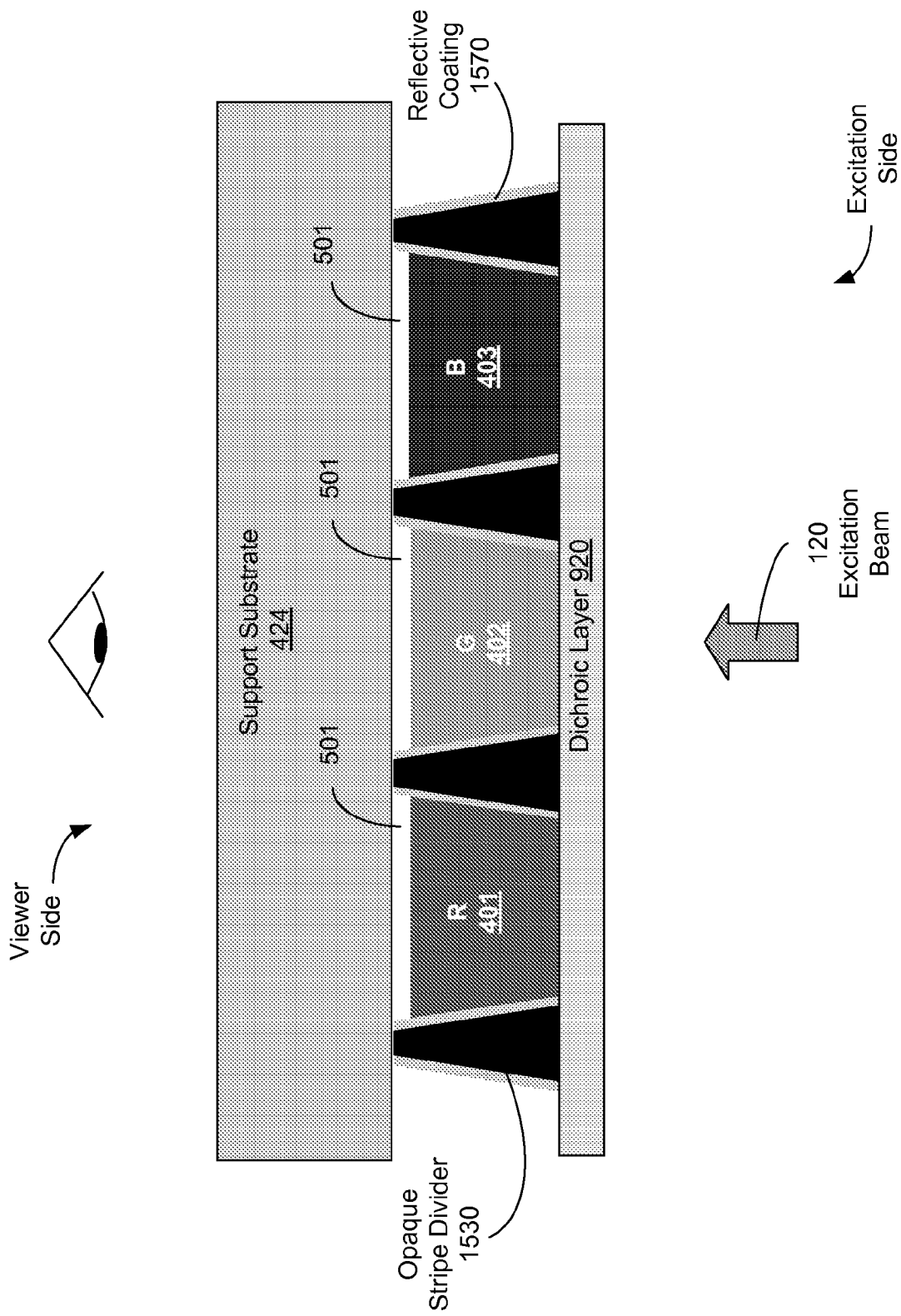

FIGS. 16 and 17 further show two examples of screens based on the screen structure in FIG. 15J. In FIG. 16, the lens array assembly 500 in FIG. 5 is attached to the screen structure in FIG. 15J on the excitation side. In FIG. 17, the dichroic layer 920 in FIG. 9 is attached to the screen structure in FIG. 15J on the excitation side.

Figure 18:
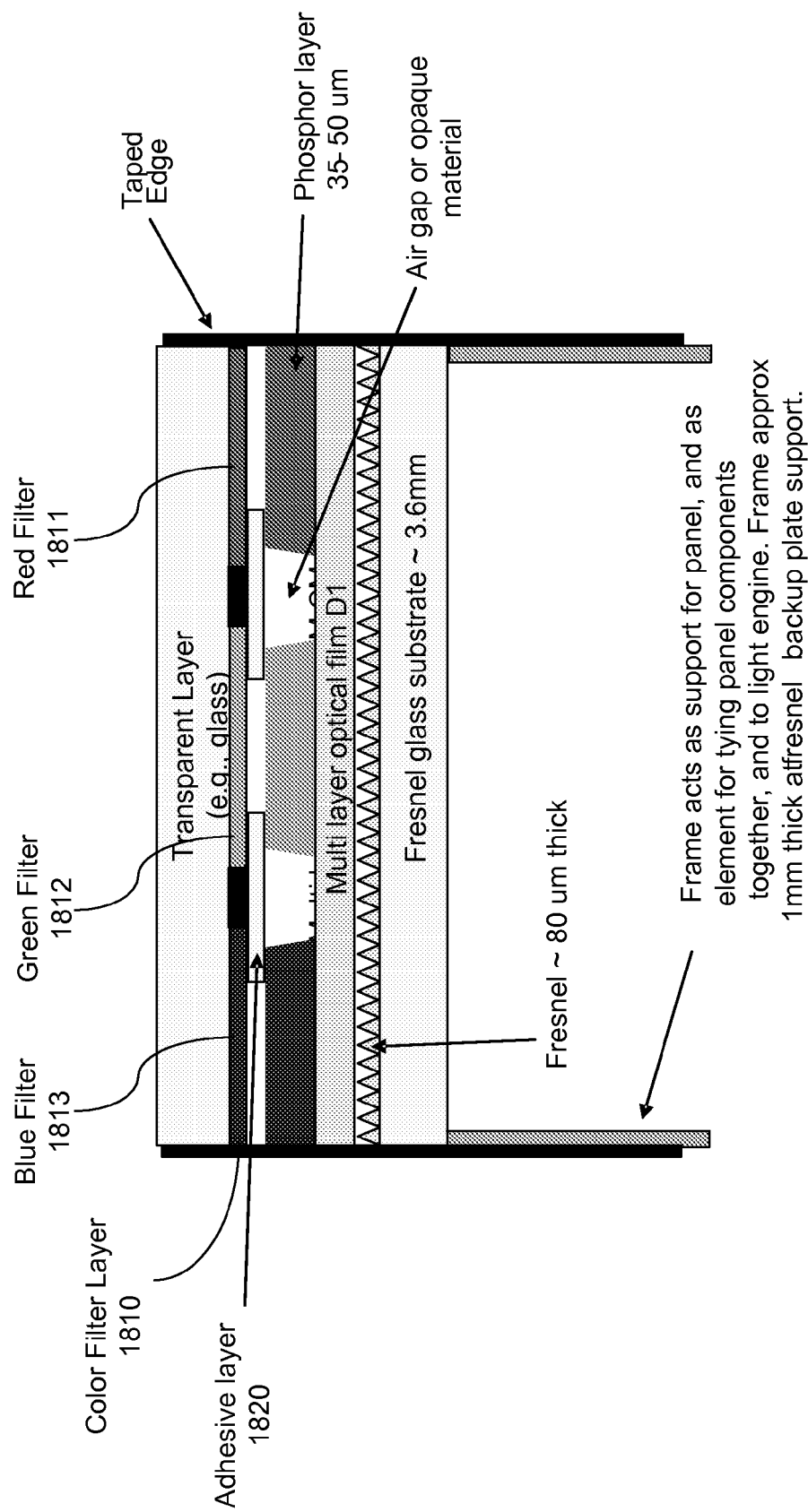
FIG. 18 shows another example screen structure with a Fresnel lens layer.

FIG. 18 shows another example screen structure with a Fresnel lens layer. In this example, the contrast enhancement layer 422 in FIG. 4 is implemented as a color filter layer 1810 with red, green and blue filers 1811, 1812 and 1813 that spatially correspond to and align with fluorescent stripes in the fluorescent layer along the direction perpendicular to the screen layers. The color-selective absorbing stripes 1811, 1812 and 1813 therefore transmit light in respective colors of the fluorescent stripes and absorb light in colors of other fluorescent stripes, respectively. An adhesive layer. An opaque region can be formed between two adjacent filters 1811, 1812 and 1813 to optically isolate the filters to reduce color mixing. This filter layer 1810 can be used in other screen designs to enhance the contrast of the display images.

In FIG. 18, an adhesive layer 1820 is formed between the color filter layer 1810 and the phosphor layer. This adhesive layer 1820 produces standoffs to create an air gap between the phosphor stripes and the color filters. This air gap reduces the undesired image halo, enables the UV to be recycled back to the phosphor layer to increase the optical efficiency. This air gap can be set in various thickness values, e.g., 10 to 20 microns. In fabrication, a thin layer of adhesive is spread over the mold and laminate the multi layer optical film D1 to the adhesive layer 1820. Then the phosphors are peeled out of the mold. This example show air gaps between different phosphor stripes and may be filled with an opaque reflective material, such as TiO2, or silver flake, or plated and planarized before assembly.

While this specification contains many specifics, these should not be construed as limitations on the scope of an invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, it is understood that variations, enhancements and other implementations can be made based on what is described and illustrated in this patent application.

What is claimed is:

1. A method for making a display screen, comprising:
   applying light-emitting materials, that absorb excitation light at an excitation wavelength to emit visible light at wavelengths different from the excitation wavelength, into parallel grooves of a mold so that two adjacent grooves are applied with two different light-emitting materials that emit at two different wavelengths;
   controlling a volume of each light-emitting material in each respective groove during the process of applying the light-emitting materials into the mold to partially fill each groove;

applying a liquid material in each groove on top of a respective light-emitting material to fill the groove;
transforming the liquid material into a transparent solid material that attaches to each light-emitting material in each groove;
placing a screen layer on the mold to be in contact with and to engage to the transparent solid material;
lifting the screen layer to lift a stripe formed by the transparent solid material and each light-emitting material out of the mold to form a light-emitting layer of parallel light-emitting stripes; and
applying one or more additional screen layers to the light-emitting layer to form a display screen.

2. The method as in claim 1, wherein:
the liquid material is a UV-curable material, and
UV light is directed to the liquid material to cure the liquid material in forming the transparent solid material.

3. The method as in claim 1, wherein:
the liquid material is a heat-curable material, and
heat is applied to the liquid material to cure the liquid material in forming the transparent solid material.

4. The method as in claim 1, comprising:
after lifting the light-emitting layer of parallel light-emitting stripes out of the mold, coating a metal layer over the light-emitting stripes to cover exposed surfaces of the light-emitting material and the transparent solid material and a surface over the screen layer between two adjacent light-emitting stripes; and
applying a filler material to fill gaps between two adjacent light-emitting stripes;
removing part of the filler material, the metal layer on top of the light-emitting material and a part of the light-emitting material to form a flat surface that exposes the light-emitting material in each light-emitting stripe; and
applying another screen layer over the flat surface.

5. The method as in claim 4, wherein:
the part of the filler material, the metal layer on top of the light-emitting material and the part of the light-emitting material are removed to leave surface textures on an exposed surface of the light-emitting material so that air gaps are formed between the light-emitting material and the screen layer engaged on the flat surface.

6. The method as in claim 4, wherein:
the filler material is a black material that absorbs light.

7. The method as in claim 1, comprising:
after lifting the light-emitting layer of parallel light-emitting stripes out of the mold, filing gaps between adjacent light-emitting stripes with a reflective material to cover exposed surfaces of the light-emitting material and the transparent solid material; and
removing part of the reflective material on top of the light-emitting material and a part of the light-emitting material to form a flat surface that exposes the light-emitting material in each light-emitting stripe; and
applying another screen layer over the flat surface.

8. The method as in claim 7, wherein:
the part of the reflective material on top of the light-emitting material and the part of the light-emitting material are removed to leave surface textures on an exposed surface of the light-emitting material so that air gaps are formed between the light-emitting material and the screen layer engaged on the flat surface.

9. The method as in claim 1, comprising:
treating inner surfaces of the grooves in the mold prior to applying the light-emitting materials to facilitate separation of each light-emitting stripe from the mold.

10. The method as in claim 9, wherein:
the inner surfaces of each groove are coated with a layer of nickel.

11. The method as in claim 9, wherein:
the inner surfaces of each groove are coated with a layer of a surface lubrication material.

12. The method as in claim 9, wherein:
the inner surfaces are coated with a layer of nickel.

* * * * *